(12) United States Patent
Lee et al.

(10) Patent No.: US 8,234,325 B2
(45) Date of Patent: Jul. 31, 2012

(54) METHOD OF GENERATING RANDOM ACCESS PREAMBLES IN WIRELESS COMMUNICATION SYSTEM

(75) Inventors: Hyun Woo Lee, Anyang-si (KR); Seung Hee Han, Anyang-si (KR); Min Seok Noh, Anyang-si (KR); Jin Sam Kwak, Anyang-si (KR); Dragan Vujcic, Anyang-si (KR); Dong Cheol Kim, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 841 days.

(21) Appl. No.: 12/050,023

(22) Filed: Mar. 17, 2008

(65) Prior Publication Data

US 2008/0235314 A1    Sep. 25, 2008

Related U.S. Application Data

(60) Provisional application No. 60/895,412, filed on Mar. 16, 2007, provisional application No. 60/895,703, filed on Mar. 19, 2007, provisional application No. 60/896,237, filed on Mar. 21, 2007, provisional application No. 60/955,830, filed on Aug. 14, 2007, provisional application No. 60/976,125, filed on Sep. 28, 2007, provisional application No. 60/980,293, filed on Oct. 16, 2007, provisional application No. 60/972,257, filed on Sep. 14, 2007.

(30) Foreign Application Priority Data

| Jun. 25, 2007 | (KR) | .......................... 10-2007-0062371 |
| Sep. 7, 2007 | (KR) | .......................... 10-2007-0091198 |
| Dec. 5, 2007 | (KR) | .......................... 10-2007-0125290 |

(51) Int. Cl.
*G06F 17/10* (2006.01)
*G06F 17/15* (2006.01)

(52) U.S. Cl. .......................... 708/426; 455/130; 708/300

(58) Field of Classification Search .................. 708/300, 708/426; 455/130
See application file for complete search history.

(56) References Cited

U.S. PATENT DOCUMENTS 6,549,564 B1    4/2003    Popovic
6,574,212 B1    6/2003    Jurgensen et al.
(Continued)

FOREIGN PATENT DOCUMENTS
KR    10-0626668    9/2006

OTHER PUBLICATIONS

Panasonic et al., "Uplink Reference Signal Structure and Allocation for E-UTRA," R1-070190, TSG-RAN WG1 Meeting #47bis, Jan. 2007, XP-050104232.
LG Electronics, "Ways to Mitigate Frequency Offset with CAZAC Cyclic Shift," R1-070227, 3GPP TSG RAN WG1 Meeting #47bis, Jan. 2007, XP-050104266.

(Continued)

*Primary Examiner* — Lewis A Bullock, Jr.
*Assistant Examiner* — Kevin G Hughes
(74) *Attorney, Agent, or Firm* — Lee, Hong, Degerman, Kang & Waimey

(57) ABSTRACT

A method of generating random access preambles includes receiving information on a source logical index and generating random access preambles in the order of increasing cyclic shift from root ZC sequences with the consecutive logical indexes from the beginning of the source logical index until a predetermined number of the random access preambles are found, wherein the consecutive logical indexes are mapped to root indexes of the root ZC sequences.

6 Claims, 31 Drawing Sheets

U.S. PATENT DOCUMENTS

| | | | |
|---|---|---|---|
| 6,791,963 B1 * | 9/2004 | Hwang et al. | 370/342 |
| 2006/0050799 A1 | 3/2006 | Hou et al. | |
| 2006/0068830 A1 | 3/2006 | Klomsdorf et al. | |
| 2006/0126573 A1 | 6/2006 | Dick et al. | |
| 2007/0230600 A1 * | 10/2007 | Bertrand et al. | 375/260 |
| 2008/0049690 A1 * | 2/2008 | Kuchibhotla et al. | 370/338 |
| 2008/0049851 A1 * | 2/2008 | Nangia et al. | 375/260 |
| 2008/0075184 A1 * | 3/2008 | Muharemovic et al. | 375/260 |
| 2008/0075195 A1 * | 3/2008 | Pajukoski et al. | 375/298 |
| 2008/0101306 A1 * | 5/2008 | Bertrand et al. | 370/336 |
| 2008/0139237 A1 * | 6/2008 | Papasakellariou | 455/522 |
| 2008/0165903 A1 * | 7/2008 | Hooli et al. | 375/343 |
| 2008/0170608 A1 * | 7/2008 | Guey | 375/220 |
| 2008/0205375 A1 * | 8/2008 | Onggosanusi et al. | 370/350 |
| 2008/0225785 A1 * | 9/2008 | Wang et al. | 370/329 |

OTHER PUBLICATIONS

Nokia, "Restricted Sets of RACH Preamble Signatures for Environments with High Doppler Shifts," R1-070377, 3GPP TSG RAN WG1 #47bis, Jan. 2007, XP-050104409.

Panasonic et al., "RACH Zadoff-Chu Sequence Definition and Allocation," R1-070934, TSG-RAN WG1 Meeting #48, Feb. 2007, XP-050104944.

Panasonic et al., "RACH Zadoff-Chu sequence definition and allocation", R1-071111, TSG-RAN WG1 Meeting #48, Feb. 2007.

Panasonic et al., "Zadoff-Chu sequence allocation on RACH for complexity reduction", R1-070189, TSG-RAN WG1 Meeting #47bis, Jan. 2007.

Texas Instruments, "Primary SCH (P-SCH) Code Design and Performance", R1-070722, 3GPP TSG RAN WG1 48, Feb. 2007.

* cited by examiner

METHOD OF GENERATING RANDOM ACCESS PREAMBLES IN WIRELESS COMMUNICATION SYSTEM

CROSS-REFERENCE TO RELATED APPLICATIONS

This application claims the benefit of priority of Korean Patent Application No. 10-2007-0062371 filed on Jun. 25, 2007, Korean Patent Application No. 10-2007-0091198 filed on Sep. 7, 2007, Korean Patent Application No. 10-2007-0125290 filed on Dec. 5, 2007, U.S. Provisional application Ser. No. 60/895,412 filed on Mar. 16, 2007, U.S. Provisional application Ser. No. 60/895,703 filed on Mar. 19, 2007, U.S. Provisional application Ser. No. 60/896,237 filed on Mar. 21, 2007, U.S. Provisional application Ser. No. 60/955,830 filed on Aug. 14, 2007, U.S. Provisional application Ser. No. 60/972,257 filed on Sep. 14, 2007, U.S. Provisional application Ser. No. 60/976,125 filed on Sep. 28, 2007 and U.S. Provisional application Ser. No. 60/980,293 filed on Oct. 16, 2007, which are incorporated by reference in its entirety herein.

BACKGROUND

1. Technical Field

The present invention relates to wireless communication and, in particular, to a method of generating random access preambles in a wireless communication system.

2. Related Art

The 3GPP (3rd Generation Partnership Project) mobile communication system based on WCDMA (Wideband Code Division Multiple Access) radio access technologies is widely deployed all over the world. An HSDPA (High Speed Downlink Packet Access), which could be defined as the first evaluation phase of the WCDMA, provides radio access technologies that are highly competitive in the mid-term future. However, because radio access technologies are being constantly advanced to meet the increasing demands and expectations of users and providers, new technological evolution is required in the 3GPP to ensure competitiveness in the future.

One of the systems that are considered to follow the 3rd generation systems is an OFDM (Orthogonal Frequency Division Multiplexing) system that attenuates inter-symbol interference (ISI) with low complexity. In the OFDM, serially inputted data symbols are converted into the N number of parallel data symbols, transmitted on the N number of orthogonal subcarriers. The subcarriers maintain orthogonality in frequency domain. Respective orthogonal channels experience mutually independent frequency selective fading, and when the interval between symbols is long enough, ISI can be canceled. An OFDMA (Orthogonal Frequency Division Multiple Access) refers to a multiple access method using the OFDM as modulation scheme. In the OFDMA, the frequency resources, namely, the subcarriers, are provided to each user. In this case, because each frequency resource is independently provided to a plurality of users, the frequency resources do not overlap with each other. Namely, the frequency resources are allocated to the users exclusively.

In order to transmit or receive a data packet, control information needs to be transmitted. For example, uplink control information includes ACK (Acknowledgement)/NACK (Negative-Acknowledgement) signals indicating successful transmission of downlink data, a CQI (Channel Quality Indicator) indicating quality of a downlink channel, a PMI (Pre-coding Matrix Index), an RI (Rank Indicator), etc. In addition, a random access preamble needs to be transmitted to perform a random access procedure.

A sequence is commonly used to transmit the uplink control information or the random access preamble. The sequence is transmitted in the form of a spreading code, a user equipment identifier, or a signature via a control channel or a random access channel.

FIG. 1 is an exemplary view showing a method for performing a random access procedure in a WCDMA system. The random access procedure is performed to allow a user equipment to acquire uplink synchronization with a network or acquire uplink radio resources for transmitting uplink data.

Referring to FIG. 1, a user equipment transmits a preamble via a PRACH (Physical Random Access Channel) which is an uplink physical channel. The preamble is transmitted during the access slot of 1.33 ms. The preamble is randomly selected from sixteen preambles.

Upon receiving the preamble from the user equipment, a base station transmits a response via an AICH (Acquisition Indicator Channel) which is a downlink physical channel. The base station transmits an acknowledgement (ACK) or a negative acknowledgement (NACK) to the user equipment via the AICH. If the user equipment receives ACK, the user equipment transmits a message having a length of 10 ms or 20 ms by using an OVSF (Orthogonal Variable Spreading Factor) code corresponding to the preamble. If the user equipment receives NACK, the user equipment transmits the preamble again in a suitable time. If the user equipment fails to receive a response corresponding to the previously transmitted preamble, the user equipment transmits a new preamble with power level higher than that of the previous preamble after a determined access slot.

The user equipment acquire information on sixteen preambles (namely, sequences), and uses one selected from the sixteen preambles as a preamble in the random access procedure. If the base station informs the user equipment of information regarding every available sequence, signaling overhead may be increased. So, generally, the base station previously designates sets of sequences and transfers an index of the sets of sequences to the sixteen preambles. For this purpose, the user equipment and the base station should store the sets of sequences according to the index in their buffer, respectively. This may be burdensome if the number of sequences belonging to the sequence sets is increased or the number of sets of sequences is increased.

In order to enhance performance of data detection in a receiver and increase capability, correlation or CM (Cubic Metric) characteristics of the sequences should be guaranteed to a degree. This means that the sequences belonging to the sequence sets used for the random access procedure should have correlation or CM characteristics guaranteed by more than a certain level. In particular, a sequence used for a high speed environment in which the user equipment is moved by a speed of 30 km/h or faster and a sequence used for a low speed environment need to be separately used in order to guarantee sequence characteristics in consideration of Doppler effect.

A method is sought for guaranteeing the characteristics of sequences used for transmission of the uplink control information with smaller amount of signaling overhead.

SUMMARY

A method of generating logical indexes of root Zadoff-Chu (ZC) sequences to facilitate sequence generation is provided.

A method of performing a random access procedure in a wireless communication system using the logical indexes of root ZC sequences is provided.

A method of generating random access preambles using the logical indexes of root ZC sequences is provided.

In an aspect, a method of generating logical indexes of root Zadoff-Chu (ZC) sequences is provided. The method includes dividing a plurality of root indexes of root ZC sequences into one or more subgroups according to predetermined cyclic shift parameters, a subgroup including at least one root index of a root ZC sequence and mapping the root indexes of the root ZC sequences in the subgroup to consecutive logical indexes.

In another aspect, a method of performing random access procedure in a wireless communication system is provided. The method includes selecting a random access preamble from a plurality of random access preambles, the plurality of random access preambles being generated from available cyclic shifts of root ZC sequences with consecutive logical indexes, wherein the consecutive logical indexes are mapped to root indexes of the root ZC sequences, transmitting the selected random access preamble and receiving a random access response including the identifier of the selected random access preamble.

In still another aspect, a method of performing random access procedure in a wireless communication system is provided. The method includes transmitting a source logical index for generating a plurality of random access preambles and a predetermined cyclic shift parameter, receiving a random access preamble selected from the plurality of random access preambles, the plurality of random access preambles being generated from available cyclic shifts of root ZC sequences with the source logical index and at least one consecutive logical index of the source logical index and transmitting a random access response including the identifier of the random access preamble.

In still another aspect, a method of generating random access preambles is provided. The method includes generating random access preambles in the order of increasing cyclic shift from a first root ZC sequence with a first root index mapped to a first logical index and generating additional random access preambles in the order of increasing cyclic shift from a second root ZC sequence with a second root index mapped to a second logical index when a predetermined number of random access preambles cannot be generated from the first root ZC sequence, the second logical index being consecutive to the first logical index.

In still another aspect, a method of generating random access preambles includes receiving information on a source logical index and generating random access preambles in the order of increasing cyclic shift from root ZC sequences with the consecutive logical indexes from the beginning of the source logical index until a predetermined number of the random access preambles are found, wherein the consecutive logical indexes are mapped to root indexes of the root ZC sequences.

DESCRIPTION OF EXEMPLARY EMBODIMENTS

Figure 1:
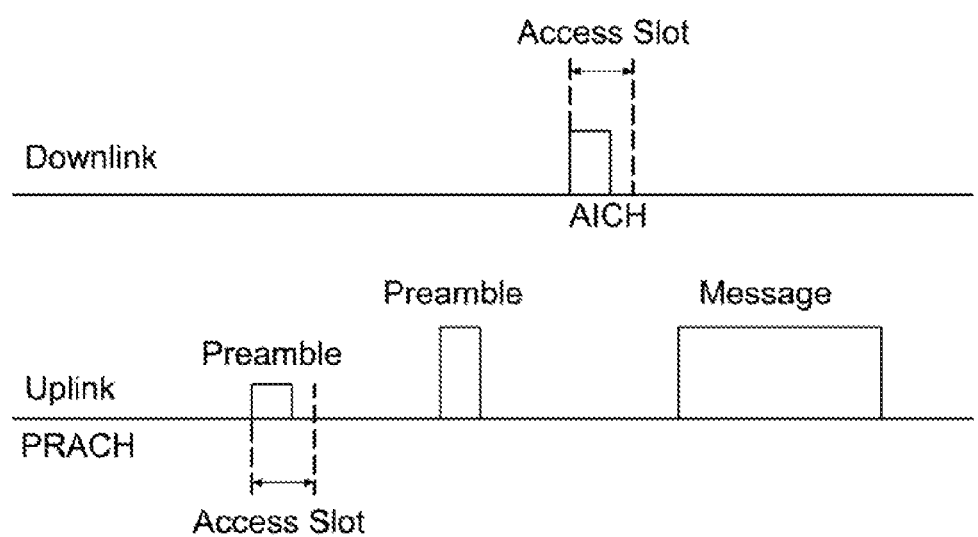
FIG. 1 is an exemplary view showing a method of performing a random access procedure in a WCDMA system.
Figure 2:
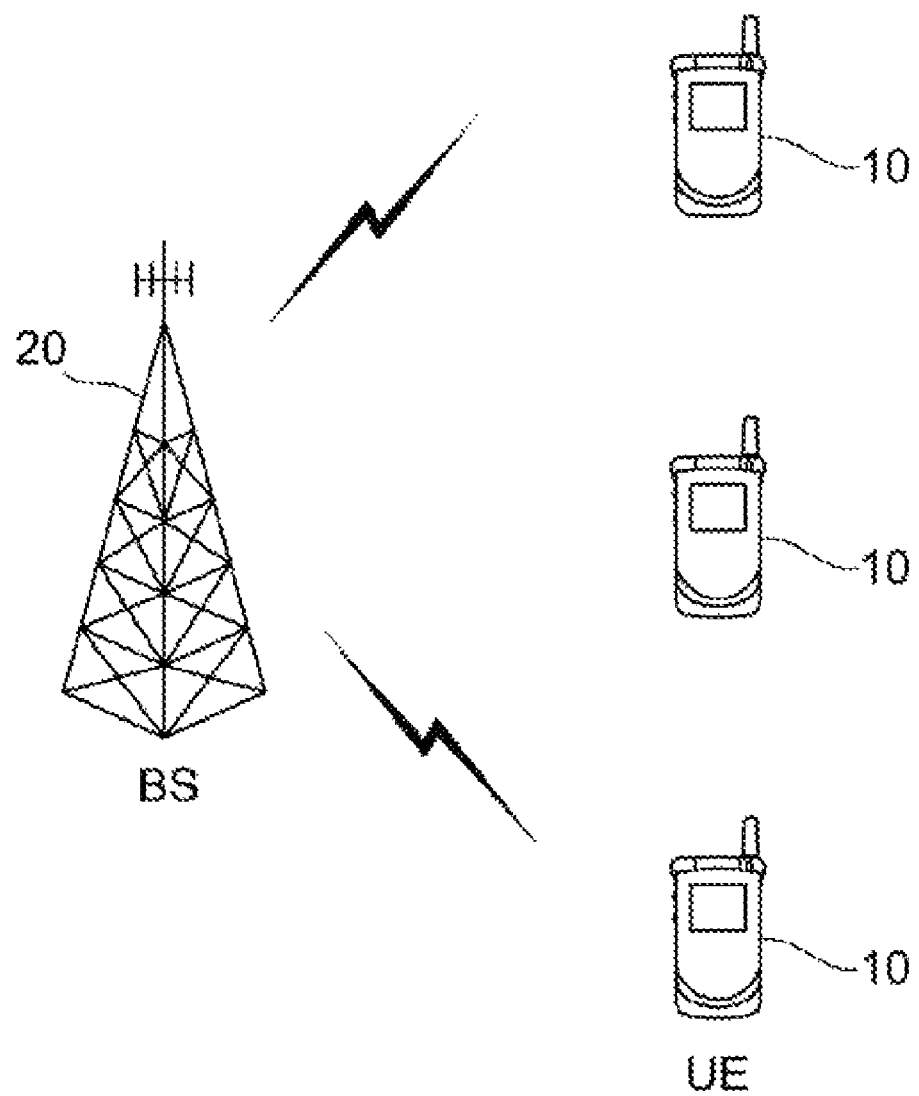
FIG. 2 is a view showing a wireless communication system.

FIG. 2 illustrates a wireless communication system. The wireless communication system can widely be deployed to provide various communication services such as voice and packet data, etc.

Referring to FIG. 2, a wireless communication system includes a user equipment (UE) 10 and a base station (BS) 20. The UE 10, which may be fixed or mobile, may be called other terms such as an MS (Mobile Station), a UT (User Terminal), an SS (Subscriber Station), a wireless device, and so on. The BS 20 refers to a fixed station that communicates with the UE 10, and may be also called a Node-B, a BTS (Base Transceiver System), an AP (Access Point), and so on. One or more cells may exist in a BS 20.

Hereinafter, downlink refers to communication from the BS 20 to the UE 10, and uplink refers to communication from the UE 10 to the BS 20. In the downlink, a transmitter may be a part of the BS 20, and a receiver may be a part of the UE 10. In the uplink, a transmitter may be a part of the UE 10 and a receiver may be a part of the BS 20.

There is no limitation in multiple access techniques applied to the wireless communication system. For example, various multiple access techniques such as CDMA (Code Division Multiple Access), TDMA (Time Division Multiple Access), FDMA (Frequency Division Multiple Access), SC-FDMA (Single Carrier-FDMA), and OFDMA (Orthogonal Frequency Division Multiple Access) can be used. For clarification, the OFDMA-based wireless communication system will now be described hereinafter.

The OFDM uses a plurality of orthogonal subcarriers. The OFDM uses orthogonality between IFFT (Inverse Fast Fourier Transform) and FFT (Fast Fourier Transform). A transmitter performs IFFT on data and transmits the same. A receiver performs FFT on a received signal to restore the original data. The transmitter uses IFFT to combine multiple subcarriers and the receiver uses corresponding FFT to split the combined multiple subcarriers. According to the OFDM, the complexity of the receiver in a frequency selective fading environment of a broadband channel can be reduced and a spectral efficiency can be improved through selective scheduling in a frequency domain by utilizing different channel characteristics of subcarriers. The OFDMA is a multiple access scheme based on the OFDM. According to the OFDMA, different subcarriers can be allocated to a plurality of users, thereby improving the efficiency of radio resources.

There may be various types of control information such as an ACK (Acknowledgement)/NACK (Negative Acknowledgement) signal indicating whether or not re-transmission should be performed, a CQI (Channel Quality Indicator) indicating quality of a downlink channel, a random access preamble for a random access procedure, and MIMO control information such as a PMI (Precoding Matrix Index), an RI (Rank Indicator), etc.

An orthogonal sequence may be used to transmit control information. The orthogonal sequence refers to a sequence having good correlation characteristics. The orthogonal sequence may include, for example, a CAZAC (Constant Amplitude Zero Auto-Correction) sequence.

Regarding a ZC (Zadoff-Chu) sequence, one of the CAZAC sequences, the k-th element c(k) of a root ZC sequence which corresponds to a root index M may be expressed as shown:

$$c(k) = \exp\left\{-\frac{j\pi Mk(k+1)}{N}\right\}, \text{ for } N \text{ odd} \quad \text{[Equation 1]}$$

$$c(k) = \exp\left\{-\frac{j\pi Mk^2}{N}\right\}, \text{ for } N \text{ even}$$

where N is the length of the root ZC sequence, the root index M is relatively prime to N. If N is a prime number, the number of root indexes of the ZC sequence would be N−1.

The ZC sequence c(k) has the following three characteristics.

$$|c(k)|=1 \text{ for all } k,N,M, \quad \text{[Equation 2]}$$

$$R_{M;N}(d) = \begin{cases} 1, & \text{for } d = 0 \\ 0, & \text{for } d \neq 0 \end{cases} \quad \text{[Equation 3]}$$

$$R_{M_1,M_2;N}(d) = \text{const for all } M_1, M_2 \quad \text{[Equation 4]}$$

Equation 2 means that the size of the ZC sequence is always 1, and Equation 3 means that auto-correlation of the ZC sequence is expressed as a Dirac-delta function. Here, the auto-correlation is based on circular correlation. Equation 4 means that cross correlation is always a constant.

In the wireless communication system, if it is assumed that cells are discriminated by the root indexes of the ZC sequence, the user equipment would need to know a root index or a group of root indexes that can be used within a cell and the base station should broadcast an available root index or an available group of root indexes to the user equipment.

If the length of the ZC sequence is N, the number of root indexes would be to the number of relative prime numbers to N among the natural numbers smaller than N. If N is a prime number, the number of root indexes would be N−1. In this case, in order for the base station to inform the user equipment about one of the N−1 number of root indexes, ceil(log$_2$(N−1)) bits are required. Ceil(x) indicates the smallest integer greater than x.

Each cell may use various number of root indexes according to a cell radius. If the cell radius increases, the number of ZC sequences that can maintain orthogonality through cyclic shift may be reduced due to an influence of propagation delay or a round trip delay and/or a delay spread. Namely, if the cell radius increases, although the length of the ZC sequence is fixed (regular, uniform), the number of available cyclic shifts in a corresponding root index may be reduced. Because the sequences created by the cyclic shifts in the root index have orthogonality to each other, so they are also called ZCZ (Zero Correlation Zone) sequences. The minimum number of ZC sequences allocated to user equipments in each cell should be guaranteed. Thus, if the cell radius increases, the number of root indexes used in each cell is increased to secure the minimum number of ZC sequences.

It is assumed that a group of available root ZC indexes in each cell is Ri, and the M number of groups of root ZC indexes in all is set. This can be expressed as $R_1, R_2, \ldots, R_M$. If $R_i$=10, it can be said that cells in which $R_i$ is set use 10 root ZC indexes. It is assumed that N=839, M=7, $R_1$=1, $R_2$=2, $R_3$=4, $R_4=8$, $R_5=16$, $R_{6=32}$, and $R_7=64$ according to each cell radius. Then, if the cell radius is large, minimum 7 bits (ceil(log$_2$(7))+ceil(log$_2$(838/64))=7 bits) is required to transmit control information, and if the cell radius is small, maximum 13 bits (ceil(log$_2$(7))+ceil(log$_2$(838/1))=13 bits) are required to transmit control information.

As wireless communication systems are advanced, demands for a higher transfer rate are increasing and cells having a smaller radius are increasing. Because such cells having a small radius use only a single root ZC index, more bits are required to transmit control information, possibly causing a signal overhead. Thus, a technique for reducing the number of bits required for signaling is necessary in each cell. In particular, it is important to reduce the number of signaling bits in the cells having the small cell radius.

Figure 3:
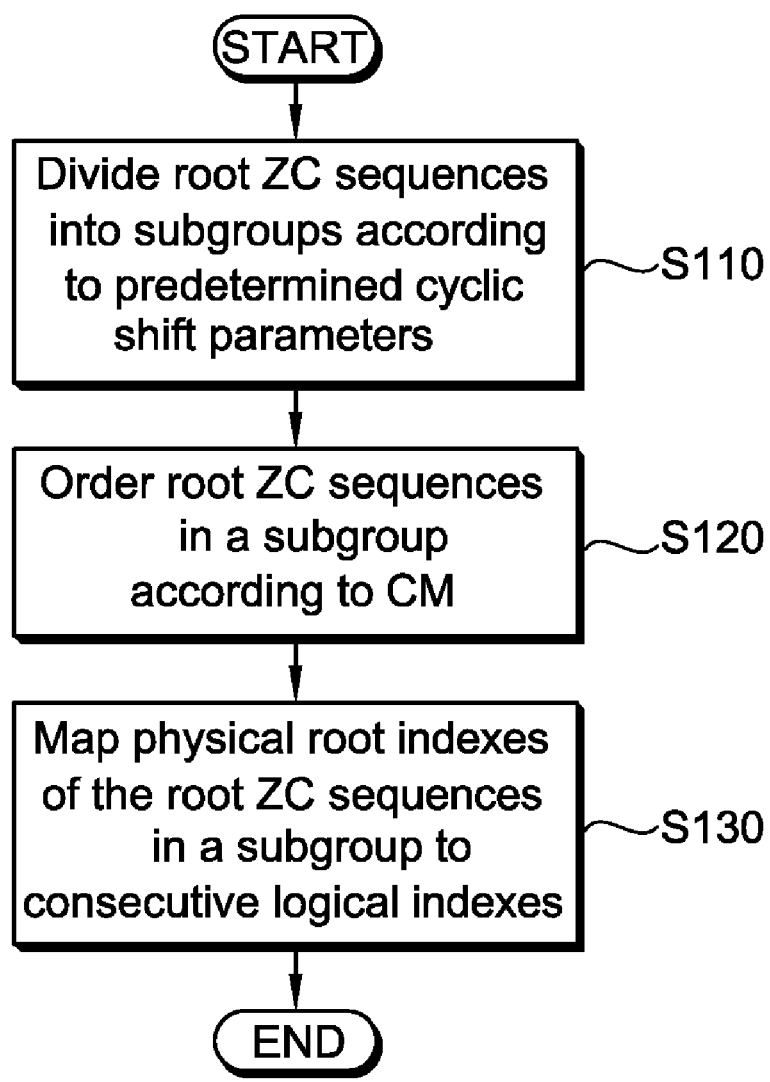
FIG. 3 is a flow chart illustrating the process of a method of generating sequences according to one exemplary embodiment of the present invention.

FIG. 3 is a flow chart illustrating the process of a method of generating sequences according to one exemplary embodiment of the present invention.

Referring to FIG. 3, a plurality of root ZC sequences is divided into one or more subgroups according to a predetermined cyclic shift parameter (S110). The subgroups include at least one root ZC sequence. If the cyclic shift parameter is Ncs, a root ZC sequence has zero correlation zones of length of Ncs−1. The cyclic shift parameter is a parameter for obtaining a cyclic shift unit of the root ZC sequence, and the subgroups may be ordered according to the cyclic shift parameter. Because the Doppler effect is strong in high speed environment, the cyclic shift unit is obtained by using the cyclic shift parameter according to each maximum supportable cell radius and a Doppler shift of detection stage. The cyclic shift unit is a unit for cyclic-shifting the root ZC sequence. The cyclic shift parameter of the root ZC sequence is smaller than or equal to the predetermined cyclic shift parameter of the subgroup of the root ZC sequence. The value of cyclic shift of the root ZC sequence is greater than the cyclic shift parameter of the root ZC sequence.

The root ZC sequences are ordered according to CM (Cubic Metric) in a subgroup (S120). The ordering of the root ZC sequences according to the CM characteristics refers to ordering the root ZC sequences according to the CM characteristics of the ZC sequences according to combination of the root ZC indexes. As the metric of ordering the root ZC sequences in a subgroup, cross-correlation, PAPR (Peak-to-Average Power Ratio), a Doppler frequency, etc, as well as the CM, may be used. The ordering according to the cross-correlation characteristics refers to ordering the root ZC sequences according to cross-correlation of ZC sequences according to combinations of the root ZC indexes. The ordering according to the PAPR characteristics refers to ordering the root ZC sequences according to PAPR characteristics of the ZC sequences according to combinations of the root ZC indexes. The ordering according to the Doppler frequency characteristics refers to ordering the root ZC sequences according to a robust degree of the root indexes to the Doppler frequency.

A gain can be obtained by using root indexes having a robust Doppler frequency in a relatively high mobility cell or high speed cell. In case of using restricted cyclic shifts in a high mobility cell, the root indexes of root ZC sequences can be ordered (or grouped) according to a maximum supportable cell radius or a maximum supportable cyclic shift characteristics. The root indexes of root ZC sequences can be divided into subgroups by comparing maximum supportable cyclic shift parameters and predetermined cyclic shift parameters of the respective root ZC cyclic sequences, whereby root ZC sequences in each subgroup can have similar characteristics.

Physical root indexes of root ZC sequences belonging to one subgroup are mapped to consecutive logical indexes (S130). The physical root indexes refer to root indexes of ZC sequences which are actually used for the base station and/or the user equipment to transmit control information or a random access preamble. The logical indexes refer to logical root indexes to which the physical root indexes are mapped.

In case that the root ZC sequences are divided into subgroups according to the predetermined cyclic shift parameters and the consecutive logical indexes are allocated in the subgroups as described above, the base station may inform the user equipment about only at least one logical index to provide information about a plurality of ZC sequences having similar characteristics. For example, it is assumed that the root ZC sequences are ordered in a subgroup according to the CM and a single logical index is informed to the user equipment. Then, the user equipment generates root ZC sequences from the physical root indexes to which the received single logical index is mapped. If the number of ZC sequences (e.g., the number of available cyclic shifts of the ZC sequences) generated from the single logical index is insufficient, the user equipment would generates new root ZC sequences from physical root indexes mapped to a logical index adjacent to the received logical index. Because the adjacent (consecutive) logical indexes have the similar CM characteristics, even if only one logical index is given, the user equipment can generate a plurality of ZC sequences having the similar CM characteristics.

Example of Ordering According to CM Characteristics

Figure 4:
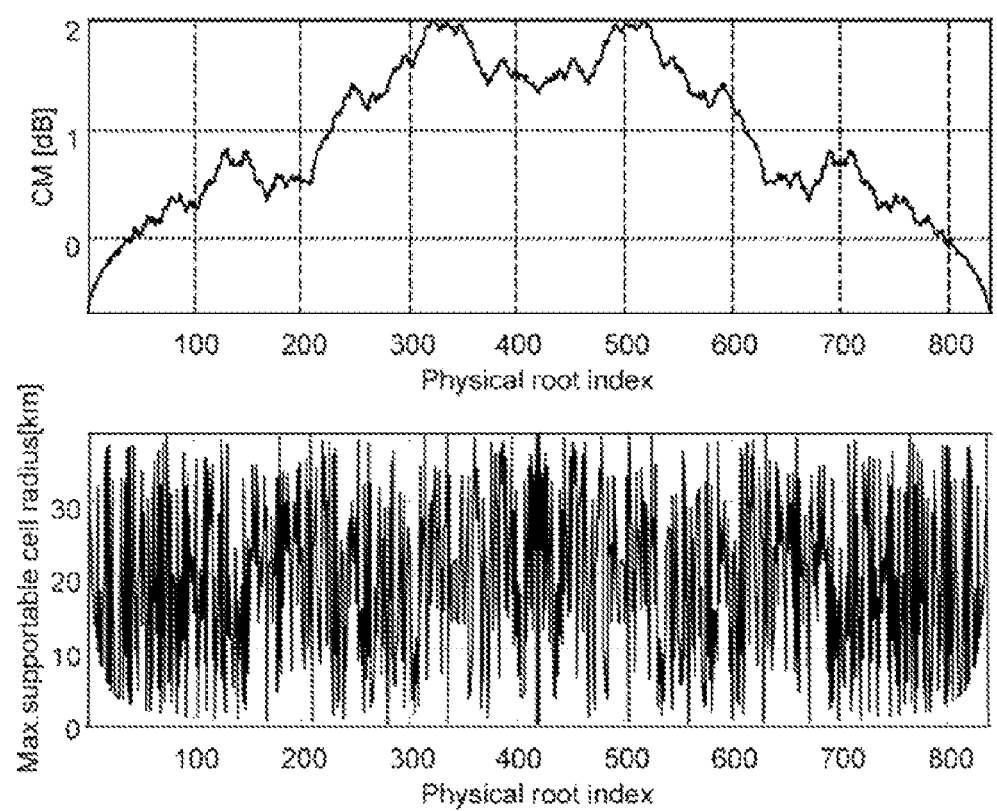
FIG. 4 is a graph showing CM (Cubic Metric) characteristics and maximum supportable cell radius characteristics according to physical root indexes according to one exemplary embodiment of the present invention.
Figure 5:
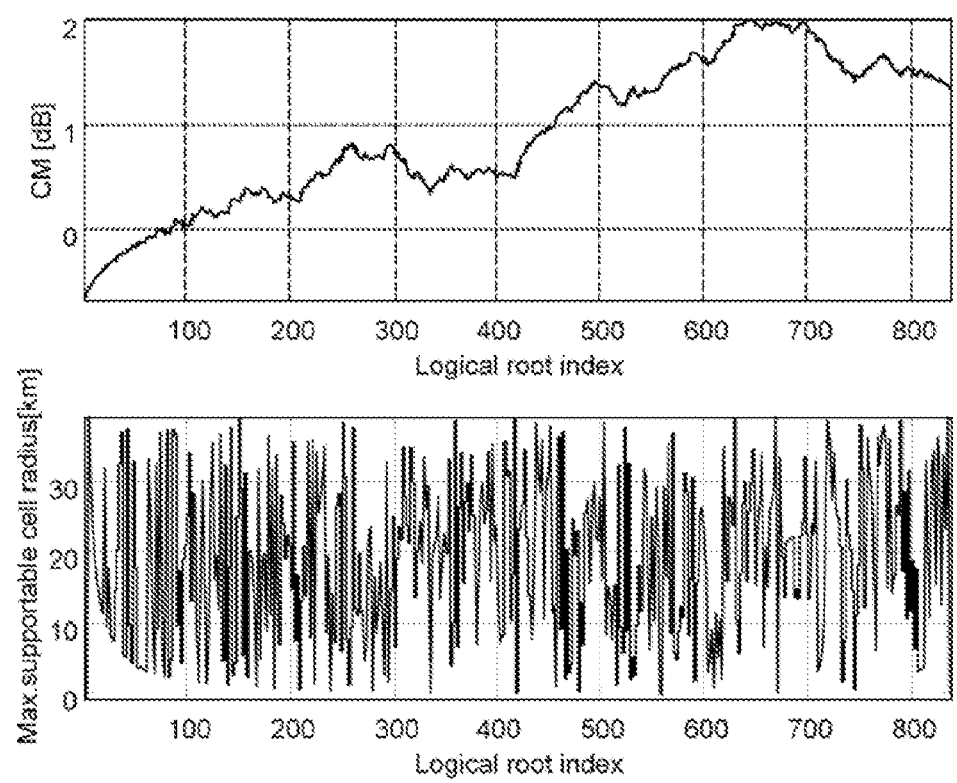
FIG. 5 is a graph showing CM characteristics and maximum supportable cell radius characteristics according to logical root indexes according to one exemplary embodiment of the present invention.
Figure 6:
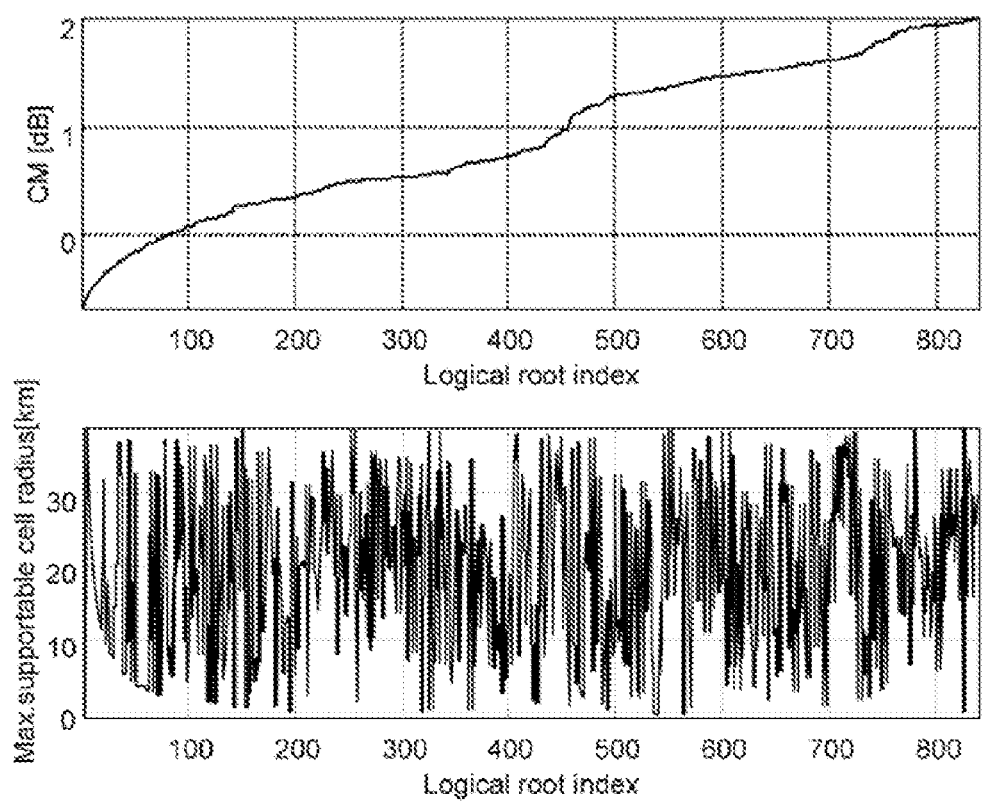
FIG. 6 is a graph showing CM characteristics and maximum supportable cell radius characteristics according to logical root indexes according to another exemplary embodiment of the present invention.

FIG. 4 is a graph showing CM (Cubic Metric) characteristics and maximum supportable cell radius characteristics according to physical root indexes according to one exemplary embodiment of the present invention. FIG. 5 is a graph showing the CM characteristics and maximum supportable cell radius characteristics according to logical root indexes according to one exemplary embodiment of the present invention. FIG. 6 is a graph showing the CM characteristics and maximum supportable cell radius characteristics according to logical root indexes according to another exemplary embodiment of the present invention.

If 'N' is the length of a ZC sequence, the physical root indexes in FIG. 4 may be expressed as $U_P$=1, 2, 3, N−3, N−2, N−1. FIG. 5 shows the results obtained by alternately picking up the physical root indexes from the start and from the end, one by one, and re-ordering them as $U_L$=1, N−1, 2, N−2, 3, N−3, 4 .... FIG. 6 shows the results obtained by ordering the physical indexes in FIG. 4 as CM values corresponding to the logical indexes.

Table 1 shows an example of CM-based ordering of the physical root indexes and logical indexes.

TABLE 1

| Logical index | Physical root index | | | | | | | | | | | | | | | | | |
|---|---|---|---|---|---|---|---|---|---|---|---|---|---|---|---|---|---|---|
| 1~50 | 1 | 838 | 2 | 837 | 836 | 3 | 4 | 835 | 834 | 5 | 833 | 6 | 832 | 7 | 8 | 831 | 9 | 830 |
| | 10 | 829 | 828 | 11 | 12 | 827 | 826 | 13 | 14 | 825 | 15 | 824 | 823 | 16 | 822 | 17 | 19 | 820 |
| | 18 | 821 | 818 | 189 | 21 | 20 | 23 | 817 | 816 | 22 | 815 | 26 | 813 | 24 | | | | |

TABLE 1-continued

| Logical index | Physical root index | | | | | | | | | | | | | | | | | | |
|---|---|---|---|---|---|---|---|---|---|---|---|---|---|---|---|---|---|---|---|
| 51~100 | 25 | 814 | 29 | 812 | 810 | 809 | 27 | 811 | 30 | 28 | 808 | 31 | 804 | 33 | 805 | 32 | 34 | 35 |
| | 807 | 806 | 799 | 36 | 40 | 803 | 797 | 42 | 798 | 38 | 801 | 41 | 37 | 39 | 802 | 800 | 796 | 790 |
| | 43 | 44 | 49 | 789 | 795 | 52 | 50 | 788 | 787 | 51 | 793 | 47 | 791 | 46 | | | | |
| 101~150 | 48 | 792 | 794 | 786 | 53 | 45 | 64 | 774 | 55 | 775 | 785 | 54 | 65 | 784 | 64 | 776 | 69 | 783 |
| | 773 | 56 | 779 | 772 | 769 | 770 | 771 | 70 | 60 | 67 | 61 | 66 | 59 | 780 | 777 | 68 | 778 | 57 |
| | 62 | 782 | 781 | 71 | 58 | 768 | 93 | 746 | 72 | 767 | 764 | 75 | 104 | 763 | | | | |
| 151~200 | 94 | 76 | 735 | 745 | 105 | 734 | 92 | 73 | 766 | 103 | 747 | 765 | 736 | 74 | 95 | 737 | 744 | 101 |
| | 102 | 748 | 738 | 91 | 99 | 740 | 90 | 749 | 762 | 77 | 98 | 741 | 100 | 755 | 743 | 84 | 96 | 739 |
| | 757 | 82 | 78 | 761 | 83 | 756 | 106 | 733 | 168 | 671 | 754 | 85 | 97 | 753 | | | | |
| 201~250 | 86 | 742 | 89 | 750 | 758 | 81 | 732 | 107 | 88 | 751 | 79 | 80 | 759 | 760 | 670 | 167 | 672 | 169 |
| | 87 | 752 | 731 | 108 | 669 | 170 | 673 | 109 | 166 | 730 | 171 | 674 | 165 | 668 | 172 | 667 | 728 | 111 |
| | 665 | 174 | 186 | 729 | 675 | 110 | 653 | 164 | 175 | 187 | 666 | 664 | 173 | 652 | | | | |
| 251~300 | 163 | 676 | 209 | 679 | 116 | 630 | 185 | 727 | 112 | 160 | 631 | 723 | 208 | 639 | 655 | 654 | 200 | 207 |
| | 206 | 721 | 635 | 118 | 722 | 632 | 204 | 117 | 633 | 184 | 651 | 680 | 188 | 201 | 638 | 205 | 681 | 159 |
| | 663 | 634 | 119 | 720 | 158 | 114 | 725 | 176 | 161 | 650 | 641 | 113 | 678 | 115 | | | | |
| 301~350 | 189 | 193 | 677 | 198 | 202 | 724 | 637 | 726 | 656 | 636 | 194 | 640 | 645 | 203 | 162 | 646 | 199 | 183 |
| | 629 | 210 | 642 | 197 | 195 | 192 | 180 | 120 | 657 | 644 | 719 | 179 | 190 | 647 | 191 | 662 | 649 | 659 |
| | 157 | 177 | 648 | 182 | 660 | 181 | 682 | 196 | 643 | 658 | 178 | 661 | 718 | 121 | | | | |
| 351~400 | 156 | 717 | 683 | 211 | 122 | 628 | 685 | 154 | 124 | 715 | 716 | 694 | 140 | 123 | 155 | 699 | 684 | 145 |
| | 137 | 700 | 704 | 686 | 141 | 627 | 135 | 701 | 212 | 139 | 134 | 698 | 702 | 138 | 153 | 705 | 714 | 695 |
| | 125 | 144 | 142 | 143 | 697 | 696 | 146 | 213 | 693 | 626 | 136 | 133 | 703 | 706 | | | | |
| 401~450 | 152 | 687 | 151 | 688 | 214 | 713 | 625 | 126 | 128 | 711 | 132 | 692 | 147 | 712 | 624 | 215 | 707 | 150 |
| | 689 | 127 | 709 | 690 | 691 | 130 | 148 | 129 | 149 | 710 | 623 | 708 | 216 | 131 | 622 | 217 | 621 | 218 |
| | 219 | 620 | 220 | 619 | 223 | 616 | 221 | 618 | 617 | 222 | 615 | 224 | 613 | 226 | | | | |
| 451~500 | 227 | 612 | 225 | 614 | 611 | 228 | 229 | 610 | 230 | 609 | 231 | 608 | 236 | 603 | 607 | 232 | 235 | 604 |
| | 606 | 233 | 234 | 602 | 605 | 237 | 601 | 238 | 262 | 261 | 239 | 577 | 578 | 580 | 260 | 579 | 600 | 259 |
| | 581 | 258 | 263 | 576 | 582 | 599 | 257 | 240 | 269 | 570 | 256 | 583 | 571 | 575 | | | | |
| 501~550 | 270 | 598 | 241 | 268 | 569 | 264 | 242 | 272 | 567 | 274 | 244 | 597 | 565 | 595 | 265 | 566 | 573 | 596 |
| | 243 | 267 | 564 | 276 | 574 | 271 | 275 | 563 | 572 | 568 | 584 | 562 | 255 | 561 | 277 | 278 | 253 | 266 |
| | 420 | 419 | 560 | 279 | 254 | 573 | 586 | 585 | 587 | 252 | 245 | 594 | 588 | 421 | | | | |
| 551~600 | 589 | 249 | 250 | 418 | 590 | 251 | 246 | 417 | 593 | 422 | 416 | 423 | 248 | 280 | 559 | 591 | 247 | 424 |
| | 415 | 373 | 466 | 592 | 426 | 413 | 414 | 425 | 412 | 427 | 411 | 428 | 281 | 430 | 374 | 558 | 465 | 376 |
| | 407 | 463 | 409 | 432 | 410 | 372 | 467 | 462 | 557 | 429 | 282 | 436 | 403 | 395 | | | | |
| 601~650 | 464 | 377 | 433 | 375 | 406 | 431 | 444 | 402 | 283 | 371 | 404 | 556 | 408 | 437 | 443 | 468 | 435 | 396 |
| | 369 | 471 | 445 | 394 | 470 | 446 | 461 | 442 | 378 | 368 | 434 | 284 | 405 | 397 | 555 | 469 | 370 | 393 |
| | 401 | 447 | 398 | 554 | 392 | 438 | 367 | 472 | 459 | 285 | 380 | 441 | 400 | 287 | | | | |
| 651~700 | 552 | 439 | 440 | 286 | 553 | 460 | 379 | 381 | 399 | 458 | 551 | 291 | 288 | 448 | 548 | 290 | 537 | 391 |
| | 549 | 366 | 302 | 473 | 547 | 289 | 457 | 292 | 550 | 536 | 382 | 383 | 456 | 303 | 449 | 365 | 390 | 304 |
| | 300 | 474 | 363 | 476 | 535 | 539 | 538 | 546 | 534 | 540 | 293 | 305 | 301 | 299 | | | | |
| 701~750 | 450 | 477 | 364 | 388 | 389 | 541 | 455 | 362 | 384 | 475 | 451 | 453 | 298 | 386 | 478 | 387 | 361 | 454 |
| | 452 | 545 | 294 | 385 | 479 | 544 | 542 | 360 | 543 | 297 | 295 | 306 | 296 | 533 | 307 | 532 | 308 | 531 |
| | 530 | 359 | 309 | 480 | 358 | 481 | 310 | 357 | 482 | 529 | 527 | 355 | 312 | 311 | | | | |
| 751~800 | 484 | 485 | 528 | 356 | 483 | 354 | 313 | 526 | 525 | 353 | 314 | 486 | 487 | 343 | 495 | 496 | 352 | 344 |
| | 351 | 497 | 488 | 342 | 511 | 328 | 345 | 329 | 510 | 327 | 494 | 315 | 350 | 524 | 512 | 340 | 489 | 498 |
| | 499 | 316 | 318 | 500 | 513 | 521 | 341 | 339 | 523 | 493 | 501 | 508 | 319 | 326 | | | | |
| 801~838 | 317 | 346 | 338 | 506 | 522 | 331 | 337 | 332 | 325 | 507 | 490 | 492 | 348 | 502 | 491 | 520 | 333 | 330 |
| | 349 | 334 | 347 | 514 | 509 | 505 | 336 | 504 | 503 | 335 | 321 | 519 | 324 | 515 | 320 | 322 | 518 | 516 |
| | 517 | 323 | | | | | | | | | | | | | | | | |

Because the physical root indexes are ordered according to the CM characteristics and then mapped to the logical indexes, the CM characteristics of the ZC sequences corresponding to the consecutive logical indexes can be similarly maintained and a CM-based cell planning can be possibly performed. The base station may plan the CM-based cell in a power-limited environment such as in a cell where a channel environment is not good or in a cell having a large cell radius, etc. In addition, the base station may use indexes having good CM characteristics as dedicated preambles for handover or the like. A user equipment in a bad channel environment already uses its maximum power, so it can hardly obtain a power ramping effect. Then, the base station can allocate an index with good CM characteristics to the user equipment to increase a detection probability.

Figure 7:
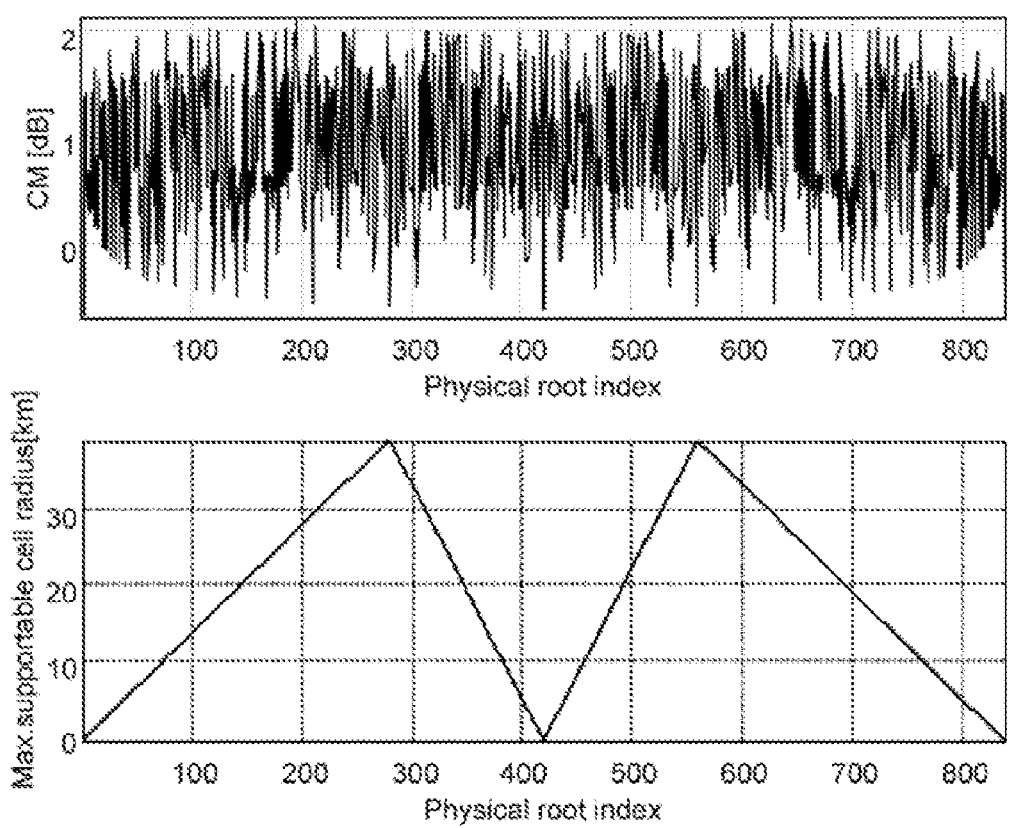
FIGS. 7 to 14 are graphs showing CM characteristics and maximum supportable cell radius characteristics according to logical root indexes according to still another exemplary embodiment of the present invention.
Figure 8:
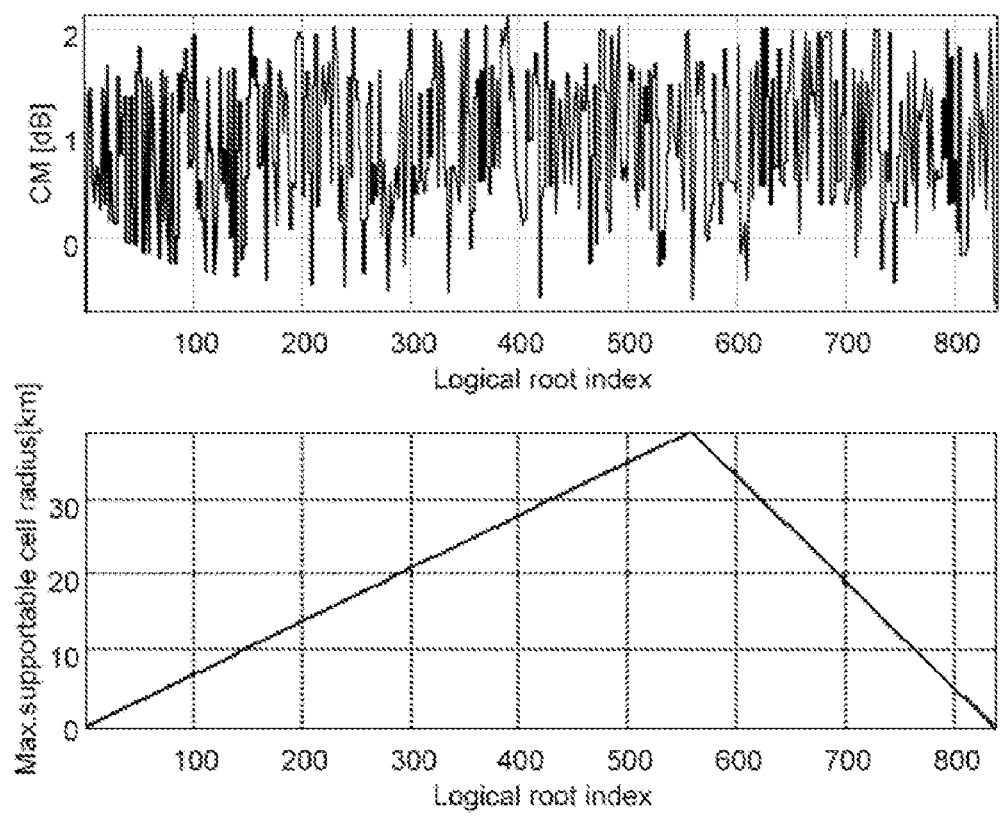
Figure 9:
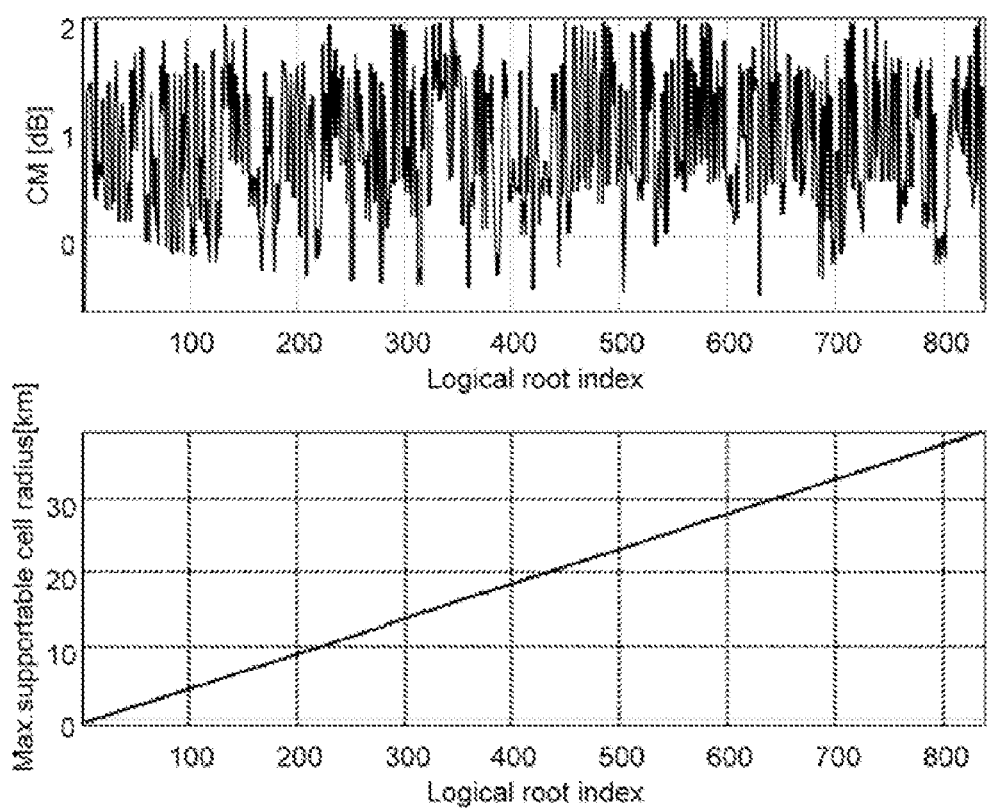

Example of Ordering According to Maximum Supportable Cell Radius Characteristics FIG. 7 is a graph showing CM characteristics and maximum supportable cell radius characteristics according to physical root indexes according to another exemplary embodiment of the present invention. FIG. 8 is a graph showing CM characteristics and maximum supportable cell radius characteristics according to logical root indexes according to another exemplary embodiment of the present invention. FIG. 9 is a graph showing CM characteristics and maximum supportable cell radius characteristics according to logical root indexes according to still another exemplary embodiment of the present invention.

Referring to FIGS. 7 to 9, FIG. 7 shows the ordering of ZC sequences used in FIG. 4 according to the maximum supportable cell radius. If 'N' is the length of the ZC sequence, the physical root indexes $U_P$=1, 2, 3, . . . , N−3, N−2, N−1 in FIG. 7 are re-ordered by $(1/U_P)$ mod N. In this case, performing $(1/U_P)$ mod N on the ZC sequence indexes generated in time domain refers to mapping the ZC sequence indexes generated in the time domain to ZC sequence indexes generated in a frequency domain. In other words, such conversion refers to reordering the characteristics of ZC sequence indexes generated in a time domain as the ZC sequence indexes generated in a frequency domain. FIG. 8 shows the results obtained by alternately picking up the indexes, which have been converted from the physical indexes $U_P$ into $(1/U_P)$ mod N, from the start and from the end, one by one, and re-ordering them as 1, N−1, 2, N−2, 3, N−3, 4, . . . . FIG. 9 shows the results obtained by accurately re-ordering according to the maximum supportable cell radius corresponding to the physical indexes.

Table 2 shows an example of the maximum supportable cell radius-based ordering.

logical indexes ordered according to the maximum supportable cell radius characteristics, but such ordering according to the maximum supportable cell radius characteristics may fail to obtain a gain in the CM characteristics.

TABLE 2

| Logical index | Physical root index |
|---|---|
| 1~50 | 1, 2, 837, 838, 419, 429, 279, 280, 559, 560, 210, 629, 168, 336, 503, 671, 140, 699, 120, 240, 599, 719, 105, 734, 93, 373, 466, 746, 84, 755, 229, 305, 534, 610, 70, 769, 129, 258, 581, 710, 60, 779, 56, 112, 727, 783, 367, 472, 148, 296 |
| 51~100 | 543, 691, 233, 606, 265, 309, 530, 574, 42, 797, 40, 80, 759, 799, 267, 572, 73, 146, 693, 766, 35, 804, 235, 302, 537, 604, 355, 484, 31, 404, 435, 808, 30, 809, 29, 405, 434, 810, 28, 811, 27, 406, 433, 812, 236, 603, 178, 356, 483, 661 |
| 101~150 | 74, 765, 24, 48, 791, 815, 303, 536, 68, 136, 703, 771, 287, 552, 43, 86, 753, 796, 21, 818, 266, 307, 532, 573, 20, 819, 39, 78, 761, 800, 286, 553, 261, 317, 522, 578, 383, 456, 125, 357, 482, 714, 402, 437, 137, 274, 565, 702, 151, 688 |
| 151~200 | 181, 329, 510, 658, 242, 597, 95, 190, 649, 744, 202, 637, 61, 122, 717, 778, 15, 824, 103, 368, 471, 736, 217, 622, 128, 256, 583, 711, 14, 825, 55, 110, 729, 784, 203, 636, 253, 293, 546, 586, 118, 721, 142, 284, 555, 697, 89, 750, 263, 288 |
| 201~250 | 551, 576, 37, 802, 231, 304, 535, 608, 12, 827, 130, 260, 579, 709, 268, 571, 23, 46, 793, 816, 34, 805, 179, 358, 481, 660, 276, 563, 207, 316, 523, 632, 398, 441, 223, 308, 531, 616, 409, 430, 145, 290, 549, 694, 133, 706, 91, 374, 465, 748 |
| 251~300 | 10, 829, 227, 306, 533, 612, 400, 439, 135, 270, 569, 704, 143, 696, 66, 132, 707, 773, 289, 550, 83, 378, 461, 756, 228, 611, 9, 415, 424, 830, 241, 598, 53, 106, 733, 786, 201, 638, 173, 346, 493, 666, 351, 488, 161, 339, 500, 678, 344, 495 |
| 301~350 | 108, 216, 623, 731, 255, 584, 57, 391, 448, 782, 121, 718, 8, 16, 823, 831, 372, 467, 149, 345, 494, 690, 101, 738, 254, 331, 508, 585, 389, 450, 257, 325, 514, 582, 412, 427, 245, 297, 542, 594, 184, 655, 197, 321, 518, 642, 311, 528, 251, 294 |
| 351~400 | 545, 588, 64, 775, 141, 282, 557, 698, 7, 832, 104, 208, 631, 735, 392, 447, 191, 382, 457, 648, 318, 521, 47, 396, 443, 792, 273, 566, 218, 403, 436, 621, 59, 780, 13, 26, 813, 826, 71, 768, 269, 301, 538, 570, 375, 464, 82, 164, 675, 757 |
| 401~450 | 144, 695, 87, 174, 665, 752, 401, 438, 49, 98, 741, 790, 152, 687, 169, 338, 501, 670, 6, 833, 119, 238, 601, 720, 65, 774, 88, 176, 663, 751, 134, 705, 81, 162, 677, 758, 408, 431, 234, 371, 468, 605, 17, 822, 107, 366, 473, 732, 330, 509 |
| 451~500 | 50, 100, 739, 789, 138, 701, 170, 340, 499, 669, 158, 681, 249, 341, 498, 590, 199, 640, 171, 342, 497, 668, 154, 685, 248, 343, 496, 591, 215, 624, 99, 370, 469, 740, 347, 492, 175, 350, 489, 664, 353, 486, 239, 300, 539, 600, 187, 652, 211, 417 |
| 501~550 | 422, 628, 5, 834, 139, 278, 561, 700, 153, 686, 157, 314, 525, 682, 200, 639, 97, 194, 645, 742, 352, 487, 163, 326, 513, 676, 348, 491, 237, 365, 474, 602, 33, 806, 75, 150, 689, 764, 275, 564, 51, 394, 445, 788, 189, 650, 243, 298, 541, 596 |
| 551~600 | 114, 725, 195, 322, 517, 644, 212, 627, 166, 332, 507, 673, 299, 540, 182, 364, 475, 657, 393, 446, 123, 246, 593, 716, 319, 520, 213, 313, 526, 626, 333, 506, 185, 327, 512, 654, 244, 595, 115, 362, 477, 724, 250, 589, 156, 312, 527, 683, 172, 667 |
| 601~650 | 96, 192, 647, 743, 54, 785, 62, 124, 715, 777, 292, 547, 221, 397, 442, 618, 224, 615, 77, 381, 458, 762, 359, 480, 277, 281, 558, 562, 4, 835, 167, 334, 505, 672, 186, 653, 193, 323, 516, 646, 247, 592, 160, 320, 519, 679, 369, 470, 58, 116 |
| 651~700 | 723, 781, 127, 712, 272, 295, 544, 567, 225, 614, 205, 410, 429, 634, 291, 548, 79, 380, 459, 760, 206, 633, 220, 399, 440, 619, 271, 568, 85, 377, 462, 754, 92, 747, 11, 414, 425, 828, 259, 580, 69, 385, 454, 770, 264, 575, 18, 36, 803, 821 |
| 701~750 | 147, 692, 25, 407, 432, 814, 32, 807, 177, 354, 485, 662, 349, 490, 165, 337, 502, 674, 416, 423, 94, 188, 651, 745, 52, 787, 183, 328, 511, 656, 196, 643, 113, 363, 476, 726, 324, 515, 214, 411, 428, 625, 159, 684, 198, 641 |
| 751~800 | 117, 361, 478, 722, 283, 556, 63, 388, 451, 776, 109, 730, 102, 204, 635, 737, 390, 449, 111, 222, 617, 728, 413, 426, 230, 379, 460, 609, 384, 455, 45, 90, 749, 794, 285, 554, 67, 386, 453, 772, 607, 19, 38, 801, 820, 41, 798, 22, 44 |
| 801~838 | 795, 817, 72, 767, 131, 262, 577, 708, 376, 463, 226, 387, 452, 613, 219, 620, 126, 525, 587, 713, 395, 444, 180, 360, 479, 659, 76, 763, 209, 315, 524, 630, 335, 504, 3, 418, 421, 836 |

The method of reordering according to the maximum supportable cell radius can be applicable in case of using restricted cyclic shifts in a high speed cell environment. In using the restricted cyclic shifts, a value of a supportable cyclic shift parameter Ncs may vary according to indexes. If the physical root indexes as shown in FIG. 4 are used as it is, it may be difficult to use the consecutive physical indexes in a single cell. Thus, indexes that are not repeated for each cell should be allocated in an overall network, but this may cause a problem: Reuse factors of a sequence are reduced to make cell planning difficult. This problem can be solved by using Example of Ordering According to CM Characteristics and Maximum Supportable Cell Radius Characteristics The ordering according to the CM characteristics and the ordering according to the maximum supportable cell radius characteristics may have the opposite characteristics. A method for achieving both gains of the CM characteristics and the maximum supportable cell radius characteristics will now be described.

The method of ordering by combining various characteristics follows the following procedures.

Step 1. The entire indexes are ordered according to specific (particular) characteristics.

Step 2. The entire indexes are divided into sections (or groups) based on relevant values (grouping).

Step 3. The indexes of the sections are ordered according to respective different characteristics in each section (or group).

Step 4. The steps 2 and 3 are repeated. In this case, in dividing the indexes into sections, a subsequent section may be associated with a preceding section, or the subsequent section may not have any relation with the preceding section and a new rule may be applied to the subsequent section.

Figure 10:
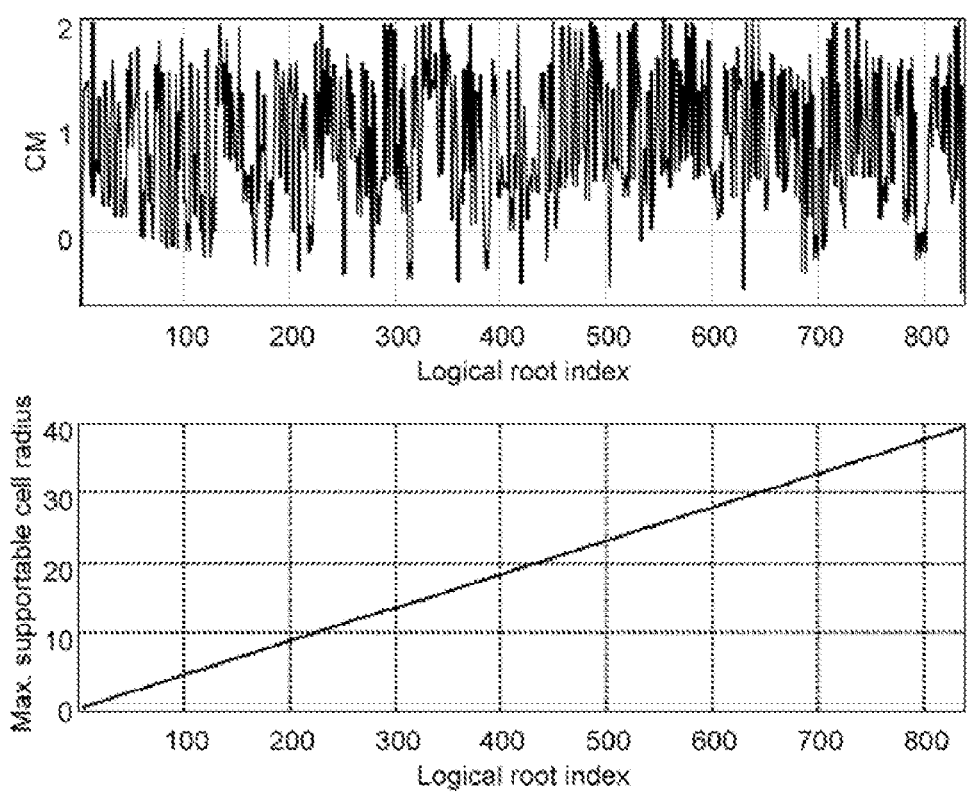
Figure 11:
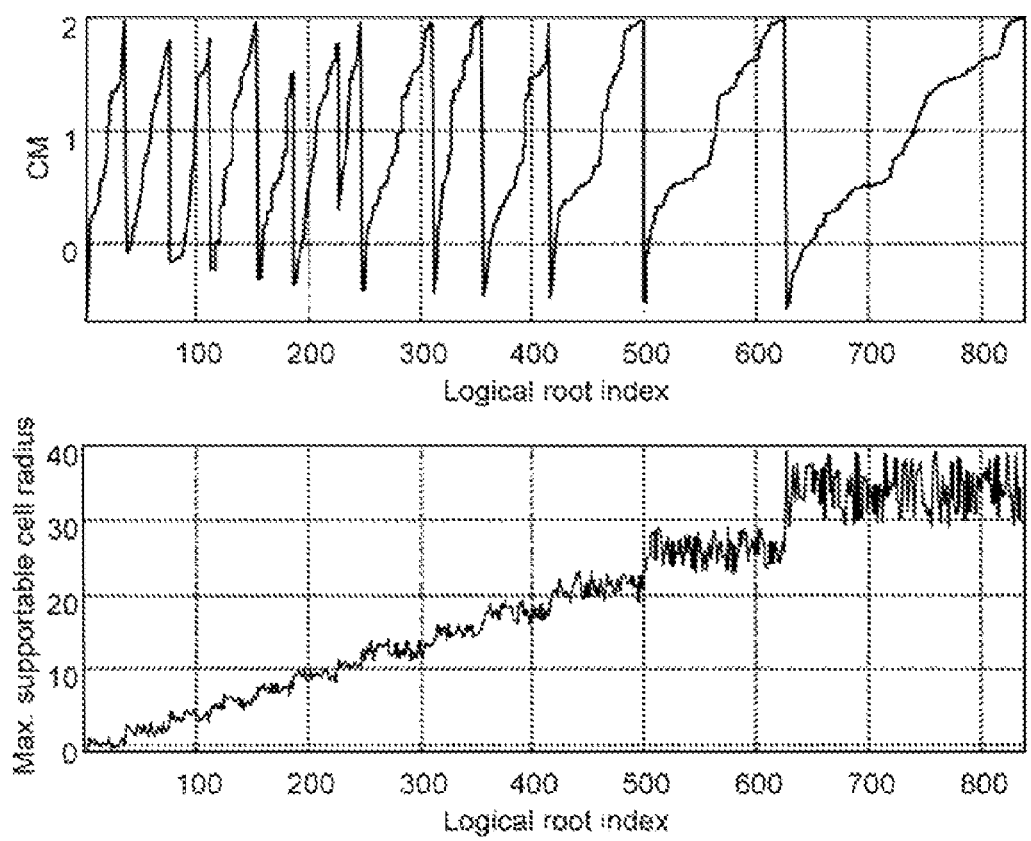

FIG. 10 is a graph showing CM characteristics and maximum supportable cell radius characteristics according to logical root indexes according to still another exemplary embodiment of the present invention. Namely, FIG. 10 shows ordering according to the maximum supportable cell radius characteristics and sections of the maximum supportable cell radius set according to particular values Ncs (predetermined cyclic shift parameters). FIG. 11 is a graph showing ordering according to CM characteristics within set sections in FIG. 10.

Referring to FIGS. 10 and 11, first, the entire indexes are ordered according to the maximum supportable cell radius and divided into sections according to the cyclic shift parameters Ncs or the maximum supportable cell radio values. The cyclic shift parameters Ncs are to obtain a cyclic shift unit supported per ZC sequence.

Table 3 shows examples of cyclic shift parameters Ncs.

TABLE 3

| Configuration No. | No. of ZC sequence per cell (no cyclic shift restrictions) | No. of cyclic shift per ZC sequence (no cyclic shift restrictions) | Cyclic shift [samples] | Max. supportable cell radius [km] | |
|---|---|---|---|---|---|
| | | | | No guard sample | 2 guard samples |
| 1 | 1 | 64 | 13 | 1.1 | 0.8 |
| 2 | 2 | 32 | 26 | 2.9 | 2.6 |
| 3 | 3 | 22 | 38 | 4.5 | 4.2 |
| 4 | 4 | 16 | 52 | 6.5 | 6.2 |
| 5 | 5 | 13 | 64 | 8.1 | 7.8 |
| 6 | 6 | 11 | 76 | 9.8 | 9.5 |
| 7 | 7 | 10 | 83 | 10.8 | 10.5 |
| 8 | 8 | 8 | 104 | 13.7 | 13.4 |
| 9 | 10 | 7 | 119 | 15.8 | 15.5 |
| 10 | 11 | 6 | 139 | 18.6 | 18.3 |
| 11 | 13 | 5 | 167 | 22.4 | 22.1 |
| 12 | 16 | 4 | 209 | 28.3 | 28.0 |
| 13 | 22 | 3 | 279 | 38.0 | 37.7 |
| 14 | 32 | 2 | 419 | 57.4 | 57.1 |
| 15 | 64 | 1 | 0 | 115.8 | 115.5 |
| 16 | reserved | reserved | reserved | reserved | Reserved |

If the physical indexes have such characteristics as shown in FIG. 4, the entire indexes can be ordered according to the maximum supportable cell radius as shown in FIG. 9. When the sections are divided by the maximum supportable cell radius value with respect to the cyclic shift parameters Ncs, results as shown in FIG. 10 are obtained. Here, the values 'No guard sample' were used.

When the root indexes are ordered according to the CM characteristics in each divided section, results as shown in FIG. 11 are obtained. In this case, hybrid ordering that considers both the CM and the maximum supportable cell radius is applied to the mapping from the physical indexes to the logical indexes as shown in Table 4.

TABLE 4

| Logical index | Physical root index | | | | | | | | | | | | | | | | | | |
|---|---|---|---|---|---|---|---|---|---|---|---|---|---|---|---|---|---|---|---|
| 1~50 | 1 | 838 | 2 | 837 | 769 | 70 | 93 | 746 | 105 | 734 | 755 | 84 | 168 | 671 | 629 | 210 | 120 | 719 |
| | 140 | 699 | 129 | 229 | 610 | 599 | 240 | 420 | 419 | 560 | 279 | 280 | 559 | 373 | 466 | 534 | 305 | 336 |
| | 503 | 804 | 35 | 799 | 40 | 797 | 42 | 783 | 56 | 779 | 60 | 73 | 766 | 80 | | | | |
| 51~100 | 759 | 727 | 112 | 146 | 693 | 691 | 148 | 710 | 235 | 604 | 606 | 233 | 581 | 258 | 265 | 267 | 574 | 572 |
| | 367 | 472 | 537 | 302 | 543 | 296 | 530 | 309 | 355 | 815 | 24 | 29 | 812 | 810 | 809 | 27 | 811 | 30 |
| | 28 | 808 | 31 | 791 | 48 | 771 | 68 | 765 | 74 | 178 | 661 | 136 | 703 | 236 | | | | |
| 101~150 | 603 | 433 | 406 | 404 | 435 | 434 | 405 | 287 | 536 | 303 | 484 | 356 | 483 | 818 | 819 | 21 | 20 | 39 |
| | 800 | 796 | 43 | 78 | 761 | 753 | 86 | 181 | 658 | 137 | 702 | 714 | 125 | 151 | 688 | 261 | 578 | 242 |
| | 274 | 565 | 266 | 573 | 402 | 437 | 552 | 286 | 553 | 383 | 456 | 307 | 532 | 357 | | | | |
| 151~200 | 482 | 329 | 510 | 317 | 522 | 14 | 825 | 15 | 824 | 55 | 784 | 61 | 778 | 103 | 736 | 95 | 744 | 729 |
| | 110 | 202 | 637 | 636 | 203 | 190 | 649 | 717 | 122 | 128 | 711 | 622 | 217 | 256 | 583 | 597 | 253 | 471 |
| | 368 | 12 | 827 | 23 | 816 | 805 | 34 | 37 | 802 | 793 | 46 | 89 | 750 | 721 | | | | |
| 201~250 | 118 | 179 | 660 | 142 | 697 | 709 | 130 | 231 | 608 | 260 | 579 | 263 | 576 | 571 | 268 | 276 | 586 | 284 |
| | 555 | 551 | 288 | 304 | 535 | 546 | 293 | 358 | 481 | 91 | 207 | 632 | 694 | 145 | 133 | 706 | 223 | 616 |
| | 563 | 430 | 409 | 398 | 441 | 290 | 549 | 308 | 531 | 316 | 523 | 9 | 830 | 10 | | | | |

TABLE 4-continued

| Logical index | Physical root index | | | | | | | | | | | | | | | | | |
|---|---|---|---|---|---|---|---|---|---|---|---|---|---|---|---|---|---|---|
| 251~300 | 829 | 786 | 53 | 773 | 66 | 57 | 782 | 748 | 83 | 756 | 106 | 733 | 731 | 108 | 666 | 173 | 201 | 638 |
| | 161 | 678 | 121 | 704 | 135 | 143 | 696 | 132 | 707 | 623 | 216 | 227 | 612 | 611 | 228 | 270 | 598 | 241 |
| | 569 | 584 | 255 | 424 | 415 | 374 | 465 | 461 | 378 | 400 | 439 | 448 | 391 | 289 | | | | |
| 301~350 | 550 | 306 | 533 | 495 | 344 | 351 | 488 | 500 | 339 | 493 | 346 | 8 | 831 | 823 | 16 | 64 | 775 | 101 |
| | 738 | 655 | 184 | 642 | 197 | 718 | 141 | 690 | 149 | 582 | 257 | 254 | 585 | 245 | 594 | 588 | 251 | 412 |
| | 427 | 372 | 467 | 450 | 389 | 545 | 294 | 542 | 297 | 311 | 528 | 345 | 494 | 508 | | | | |
| 351~400 | 331 | 325 | 514 | 321 | 518 | 832 | 7 | 826 | 13 | 26 | 813 | 790 | 49 | 47 | 792 | 59 | 780 | 71 |
| | 768 | 104 | 735 | 98 | 741 | 757 | 82 | 169 | 87 | 752 | 665 | 174 | 675 | 164 | 631 | 208 | 191 | 648 |
| | 698 | 695 | 144 | 152 | 687 | 621 | 218 | 269 | 570 | 566 | 273 | 557 | 282 | 436 | | | | |
| 401~450 | 403 | 464 | 375 | 443 | 396 | 401 | 447 | 392 | 438 | 457 | 382 | 538 | 301 | 318 | 521 | 833 | 6 | 822 |
| | 17 | 789 | 50 | 774 | 65 | 99 | 740 | 100 | 739 | 758 | 81 | 732 | 107 | 88 | 751 | 670 | 669 | 170 |
| | 171 | 668 | 175 | 187 | 664 | 652 | 681 | 663 | 119 | 720 | 158 | 176 | 677 | 640 | | | | |
| 451~500 | 162 | 199 | 211 | 685 | 154 | 701 | 134 | 138 | 705 | 624 | 215 | 234 | 605 | 601 | 238 | 239 | 600 | 249 |
| | 590 | 248 | 591 | 431 | 371 | 408 | 468 | 469 | 370 | 366 | 473 | 300 | 539 | 353 | 486 | 343 | 496 | 497 |
| | 342 | 350 | 340 | 489 | 498 | 499 | 341 | 501 | 338 | 492 | 330 | 347 | 509 | 834 | | | | |
| 501~550 | 5 | 33 | 806 | 788 | 51 | 785 | 54 | 777 | 62 | 764 | 75 | 762 | 77 | 743 | 96 | 97 | 742 | 673 |
| | 166 | 172 | 667 | 163 | 676 | 185 | 639 | 654 | 200 | 114 | 725 | 650 | 115 | 189 | 724 | 194 | 645 | 195 |
| | 192 | 657 | 644 | 647 | 157 | 182 | 682 | 156 | 683 | 628 | 124 | 715 | 716 | 123 | | | | |
| 551~600 | 700 | 686 | 627 | 212 | 139 | 153 | 213 | 626 | 150 | 689 | 221 | 618 | 615 | 224 | 602 | 237 | 244 | 595 |
| | 596 | 243 | 564 | 275 | 561 | 277 | 278 | 589 | 250 | 246 | 417 | 593 | 422 | 445 | 394 | 446 | 442 | 445 |
| | 394 | 446 | 442 | 397 | 393 | 381 | 458 | 547 | 292 | 365 | 474 | 540 | 299 | 477 | 364 | 541 | 362 | 475 |
| 601~650 | 298 | 359 | 480 | 527 | 312 | 313 | 526 | 525 | 314 | 487 | 352 | 327 | 512 | 513 | 319 | 326 | 506 | 332 |
| | 507 | 348 | 491 | 520 | 333 | 322 | 517 | 836 | 3 | 4 | 835 | 828 | 11 | 19 | 820 | 18 | 821 | 817 |
| | 22 | 25 | 814 | 32 | 807 | 36 | 803 | 798 | 38 | 801 | 41 | 44 | 795 | 52 | | | | |
| 651~700 | 787 | 794 | 45 | 63 | 776 | 69 | 772 | 770 | 67 | 781 | 58 | 72 | 767 | 763 | 94 | 76 | 745 | 92 |
| | 747 | 737 | 102 | 90 | 749 | 754 | 85 | 79 | 760 | 167 | 672 | 109 | 730 | 674 | 165 | 728 | 111 | 186 |
| | 653 | 209 | 679 | 116 | 630 | 160 | 723 | 206 | 635 | 722 | 204 | 117 | 633 | 651 | | | | |
| 701~750 | 680 | 188 | 205 | 159 | 634 | 641 | 113 | 193 | 198 | 726 | 656 | 646 | 183 | 180 | 662 | 659 | 177 | 196 |
| | 643 | 155 | 684 | 214 | 713 | 625 | 126 | 692 | 147 | 712 | 127 | 708 | 131 | 219 | 620 | 220 | 619 | 617 |
| | 222 | 613 | 226 | 225 | 614 | 230 | 609 | 607 | 232 | 262 | 577 | 580 | 259 | 575 | | | | |
| 751~800 | 264 | 272 | 567 | 271 | 568 | 562 | 587 | 252 | 421 | 418 | 416 | 423 | 247 | 592 | 426 | 413 | 414 | 425 |
| | 411 | 428 | 281 | 558 | 376 | 407 | 463 | 432 | 410 | 462 | 429 | 395 | 377 | 444 | 283 | 556 | 369 | 470 |
| | 554 | 459 | 285 | 380 | 440 | 460 | 379 | 399 | 291 | 548 | 449 | 390 | 363 | 476 | | | | |
| 801~838 | 388 | 455 | 384 | 451 | 453 | 386 | 478 | 387 | 361 | 454 | 452 | 385 | 479 | 544 | 360 | 295 | 310 | 529 |
| | 485 | 354 | 511 | 328 | 315 | 524 | 337 | 490 | 502 | 349 | 334 | 505 | 504 | 335 | 519 | 324 | 515 | 320 |
| | 516 | 323 | | | | | | | | | | | | | | | | |

A plurality of sequences are divided into a plurality of sub-groups according to predetermined cyclic shift parameters Ncs, and ordered according to CM characteristics in each sub-group. The plurality of sub-groups may be ordered according to each corresponding cyclic shift parameter. The biggest peaks (or the smallest peaks) appearing at upper portions in the graph as shown in FIG. 11 indicate root indexes having a maximum CM (or a minimum CM) in each sub-group.

Each cell may use the consecutive logical indexes through the hybrid ordering according to the cyclic shift parameters and the CM characteristics regardless of a cell size, and CM-based cell planning can be possible according to characteristics of each cell. The base station may use the smallest logical index allocated to the base station itself for the user equipment in a particular power restricted environment in each cell. For example, the base station may use the smallest logical index as a dedicated preamble for a user equipment that performs handover. In the smallest cell size interval, a supportable cell size is very small and an index having a value smaller than 0 km may exist. Such index indicates an index that cannot use the restricted cyclic shift. In addition, the sections may be further divided for a simply index allocation. In FIG. 11, the first section is divided by 0~1.1 km, but the section may be divided into smaller parts and ordered on the basis of the CM. For example, the first section may be divided into two parts of 0~500 m and 500 m~1.1 km and can be ordered on the basis of the CM.

Table 5 shows physical indexes according to Ncs-configured sections.

TABLE 5

| No | $N_{CS}$ | Logical index | Physical root index | | | | | | | | | | | | | | | | |
|---|---|---|---|---|---|---|---|---|---|---|---|---|---|---|---|---|---|---|---|
| 0 | 13 | 1~37 | 1 | 838 | 2 | 837 | 769 | 70 | 93 | 746 | 105 | 734 | 755 | 84 | 168 | 671 | 629 | 210 | 120 |
| | | | 719 | 140 | 699 | 129 | 229 | 610 | 599 | 240 | 420 | 419 | 560 | 279 | 280 | 559 | 373 | 466 | 534 |
| | | | 305 | 336 | 503 | | | | | | | | | | | | | | |
| 1 | 26 | 38~77 | 804 | 35 | 799 | 40 | 797 | 42 | 783 | 56 | 779 | 60 | 73 | 766 | 80 | 759 | 727 | 112 | 146 |
| | | | 693 | 691 | 148 | 710 | 235 | 604 | 606 | 233 | 581 | 258 | 265 | 267 | 574 | 572 | 367 | 472 | 537 |
| | | | 302 | 543 | 296 | 530 | 309 | 355 | | | | | | | | | | | |
| 2 | 38 | 78~113 | 815 | 24 | 29 | 812 | 810 | 809 | 27 | 811 | 30 | 28 | 808 | 31 | 791 | 48 | 771 | 68 | 765 |
| | | | 74 | 178 | 661 | 136 | 703 | 236 | 603 | 433 | 406 | 404 | 435 | 434 | 405 | 287 | 536 | 303 | 484 |
| | | | 356 | 483 | | | | | | | | | | | | | | | |
| 3 | 52 | 114~155 | 818 | 819 | 21 | 20 | 39 | 800 | 796 | 43 | 78 | 761 | 753 | 86 | 181 | 658 | 137 | 702 | 714 |
| | | | 125 | 151 | 688 | 261 | 578 | 242 | 274 | 565 | 266 | 573 | 402 | 437 | 552 | 286 | 553 | 383 | 456 |
| | | | 307 | 532 | 357 | 482 | 329 | 510 | 317 | 522 | | | | | | | | | |

TABLE 5-continued

| No | $N_{CS}$ | Logical index | Physical root index | | | | | | | | | | | | | | | |
|---|---|---|---|---|---|---|---|---|---|---|---|---|---|---|---|---|---|---|
| 4 | 64 | 156~187 | 14 | 825 | 15 | 824 | 55 | 784 | 61 | 778 | 103 | 736 | 95 | 744 | 729 | 110 | 202 | 637 | 636 |
| | | | 203 | 190 | 649 | 717 | 122 | 128 | 711 | 622 | 217 | 256 | 583 | 597 | 253 | 471 | 368 | | |
| 5 | 76 | 188~227 | 12 | 827 | 23 | 816 | 805 | 34 | 37 | 802 | 793 | 46 | 89 | 750 | 721 | 118 | 179 | 660 | 142 |
| | | | 697 | 709 | 130 | 231 | 608 | 260 | 579 | 263 | 576 | 571 | 268 | 276 | 586 | 284 | 555 | 551 | 288 |
| | | | 304 | 535 | 546 | 293 | 358 | 481 | | | | | | | | | | | |
| 6 | 83 | 228~247 | 91 | 207 | 632 | 694 | 145 | 133 | 706 | 223 | 616 | 563 | 430 | 409 | 398 | 441 | 290 | 549 | 308 |
| | | | 531 | 316 | 523 | | | | | | | | | | | | | | |
| 7 | 104 | 248~311 | 9 | 830 | 10 | 829 | 786 | 53 | 773 | 66 | 57 | 782 | 748 | 83 | 756 | 106 | 733 | 731 | 108 |
| | | | 666 | 173 | 201 | 638 | 161 | 678 | 121 | 704 | 135 | 143 | 696 | 132 | 707 | 623 | 216 | 227 | 612 |
| | | | 611 | 228 | 270 | 598 | 241 | 569 | 584 | 255 | 424 | 415 | 374 | 465 | 461 | 378 | 400 | 439 | 448 |
| | | | 391 | 289 | 550 | 306 | 533 | 495 | 344 | 351 | 488 | 500 | 339 | 493 | 346 | | | | |
| 8 | 119 | 312~355 | 8 | 831 | 823 | 16 | 64 | 775 | 101 | 738 | 655 | 184 | 642 | 197 | 718 | 141 | 690 | 149 | 582 |
| | | | 257 | 254 | 585 | 245 | 594 | 588 | 251 | 412 | 427 | 372 | 467 | 450 | 389 | 545 | 294 | 542 | 297 |
| | | | 311 | 528 | 345 | 494 | 508 | 331 | 325 | 514 | 321 | 518 | | | | | | | |
| 9 | 139 | 356~415 | 832 | 7 | 826 | 13 | 26 | 813 | 790 | 49 | 47 | 792 | 59 | 780 | 71 | 768 | 104 | 735 | 98 |
| | | | 741 | 757 | 82 | 169 | 87 | 752 | 665 | 174 | 675 | 164 | 631 | 208 | 191 | 648 | 698 | 695 | 144 |
| | | | 152 | 687 | 621 | 218 | 269 | 570 | 566 | 273 | 557 | 282 | 436 | 403 | 464 | 375 | 443 | 396 | 401 |
| | | | 447 | 392 | 438 | 457 | 382 | 538 | 301 | 318 | 521 | | | | | | | | |
| 10 | 167 | 416~501 | 833 | 6 | 822 | 17 | 789 | 50 | 774 | 65 | 99 | 740 | 100 | 739 | 758 | 81 | 732 | 107 | 88 |
| | | | 751 | 670 | 669 | 170 | 171 | 668 | 175 | 187 | 664 | 652 | 681 | 663 | 119 | 720 | 158 | 176 | 677 |
| | | | 640 | 162 | 199 | 211 | 685 | 154 | 701 | 134 | 138 | 705 | 624 | 215 | 234 | 605 | 601 | 238 | 239 |
| | | | 600 | 249 | 590 | 248 | 591 | 431 | 371 | 408 | 468 | 469 | 370 | 366 | 473 | 300 | 539 | 353 | 486 |
| | | | 343 | 496 | 497 | 342 | 350 | 340 | 489 | 498 | 499 | 341 | 501 | 338 | 492 | 330 | 347 | 509 | |
| 11 | 209 | 500~625 | 834 | 5 | 33 | 806 | 788 | 51 | 785 | 54 | 777 | 62 | 764 | 75 | 762 | 77 | 743 | 96 | 97 |
| | | | 742 | 673 | 166 | 172 | 667 | 163 | 676 | 185 | 639 | 654 | 200 | 114 | 725 | 650 | 115 | 189 | 724 |
| | | | 194 | 645 | 195 | 192 | 657 | 644 | 647 | 157 | 182 | 682 | 156 | 683 | 628 | 124 | 715 | 716 | 123 |
| | | | 700 | 686 | 627 | 212 | 139 | 153 | 213 | 626 | 150 | 689 | 221 | 618 | 615 | 224 | 602 | 237 | 244 |
| | | | 595 | 596 | 243 | 564 | 275 | 561 | 277 | 278 | 589 | 250 | 246 | 417 | 593 | 422 | 445 | 394 | 446 |
| | | | 442 | 397 | 393 | 381 | 458 | 547 | 292 | 365 | 474 | 540 | 299 | 477 | 364 | 541 | 362 | 475 | 298 |
| | | | 359 | 480 | 527 | 312 | 313 | 526 | 525 | 314 | 487 | 352 | 327 | 512 | 513 | 319 | 326 | 506 | 332 |
| | | | 507 | 348 | 491 | 520 | 333 | 322 | 517 | | | | | | | | | | |
| 12 | 279 | 626~838 | 836 | 3 | 4 | 835 | 828 | 11 | 19 | 820 | 18 | 821 | 817 | 22 | 25 | 814 | 32 | 807 | 36 |
| | | | 803 | 798 | 38 | 801 | 41 | 44 | 795 | 52 | 787 | 794 | 45 | 63 | 776 | 69 | 772 | 770 | 67 |
| | | | 781 | 58 | 72 | 767 | 763 | 94 | 76 | 745 | 92 | 747 | 737 | 102 | 90 | 749 | 754 | 85 | 79 |
| | | | 760 | 167 | 672 | 109 | 730 | 674 | 165 | 728 | 111 | 186 | 653 | 209 | 679 | 116 | 630 | 160 | 723 |
| | | | 206 | 635 | 722 | 204 | 117 | 633 | 651 | 680 | 188 | 205 | 159 | 634 | 641 | 113 | 193 | 198 | 726 |
| | | | 656 | 646 | 183 | 180 | 662 | 659 | 177 | 196 | 643 | 155 | 684 | 214 | 713 | 625 | 126 | 692 | 147 |
| | | | 712 | 127 | 708 | 131 | 219 | 620 | 220 | 619 | 617 | 222 | 613 | 226 | 225 | 614 | 230 | 609 | 607 |
| | | | 232 | 262 | 577 | 580 | 259 | 575 | 264 | 272 | 567 | 271 | 568 | 562 | 587 | 252 | 421 | 418 | 416 |
| | | | 423 | 247 | 592 | 426 | 413 | 414 | 425 | 411 | 428 | 281 | 558 | 376 | 407 | 463 | 432 | 410 | 462 |
| | | | 429 | 395 | 377 | 444 | 283 | 556 | 369 | 470 | 554 | 459 | 285 | 380 | 440 | 460 | 379 | 399 | 291 |
| | | | 548 | 449 | 390 | 363 | 476 | 388 | 455 | 384 | 451 | 453 | 386 | 478 | 387 | 361 | 454 | 452 | 385 |
| | | | 479 | 544 | 360 | 295 | 310 | 529 | 485 | 354 | 511 | 328 | 315 | 524 | 337 | 490 | 502 | 349 | 334 |
| | | | 505 | 504 | 335 | 519 | 324 | 515 | 320 | 516 | 323 | | | | | | | | |

Table 5 shows that a plurality of physical root indexes are divided into a plurality of sub-groups according to predetermined cyclic shift parameters Ncs and consecutive logical indexes are allocated in each sub-group.

With such logical indexes set, a sequence can be easily selected according to a cell size in a high mobility cell. In addition, if a cell requires low CM characteristics, it may simply select front indexes among indexes that may be used in its cell size to thus use indexes having low CM characteristics. Table 5 does not mean that only the index values (physical indexes or logical indexes) related to the Ncs are used. An index, which may be suitable for the CM characteristics of a cell, may be selectively used regardless of a cell size in a low/middle mobility cell. In addition, An Ncs section table that can be used in the low/middle mobility cell may be separately set. In this case, a table to be applied by using a discrimination signal of a cell having the low/middle mobility cell and a cell having the high mobility cell may be selected.

Figure 12:
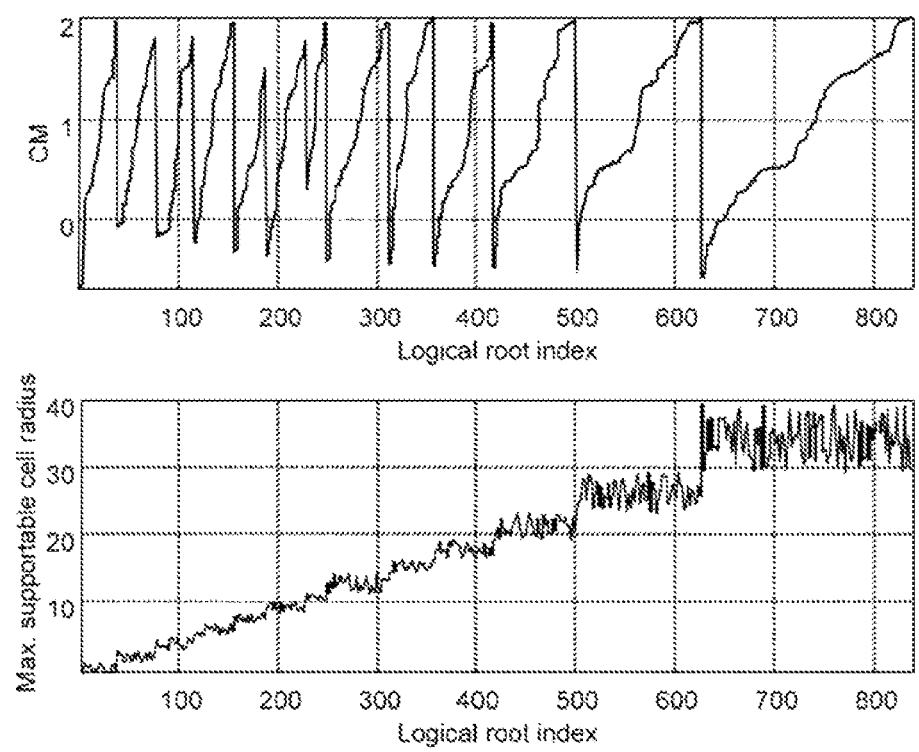

FIG. 12 is a graph showing CM characteristics and maximum supportable cell radius characteristics according to logical root indexes according to yet another exemplary embodiment of the present invention. Namely, FIG. 12 shows ordering based on the plurality of characteristics and pair allocation.

Referring to FIG. 12, ZC sequences have complex 0conjugate symmetry characteristics, based on which indexes having the complex conjugate symmetry can be pair-allocated consecutively.

The complex conjugate symmetry of the ZC sequences can be expressed as shown $$x_{u=a}(k)=x^*_{u=N-a}(k)$$ [Equation 5]

where (.)* indicates complex conjugate. The sum of two root indexes of two ZC sequences having complex conjugate symmetry is equal to the length of a ZC sequence. If only a single root index is used in a cell, such characteristics cannot be obtained, but in case of using a plurality of root indexes having complex conjugate symmetry characteristics, complexity of a detector of a receiver can be reduced to a half. The root indexes having complex conjugate symmetry characteristics can be consecutively allocated while applying the CM-based ordering, the maximum supportable cell radius-based ordering and the hybrid ordering, etc. thereto. When the indexes are pair-allocated, the base station signals only a single logical index and the user equipment naturally uses pair indexes while increasing the logical indexes as necessary.

In the above Table 5, each group includes the odd number of indexes, and in order to constitute the complex conjugate symmetry characteristics, one index of a higher group may be used by a lower group. This can be expressed as shown in Table 6.

TABLE 6

| No | $N_{CS}$ | Logical index | Physical root index | | | | | | | | | | | | | | | |
|---|---|---|---|---|---|---|---|---|---|---|---|---|---|---|---|---|---|---|
| 0 | 13 | 1~37 | 1 | 838 | 2 | 837 | 769 | 70 | 93 | 746 | 105 | 734 | 755 | 84 | 168 | 671 | 629 | 210 | 120 |
| | | | 719 | 140 | 699 | 129 | 710 | 229 | 610 | 599 | 240 | 420 | 419 | 560 | 279 | 280 | 559 | 373 | 466 |
| | | | 534 | 305 | 336 | 503 | | | | | | | | | | | | | |
| 1 | 26 | 38~77 | 804 | 35 | 799 | 40 | 797 | 42 | 783 | 56 | 779 | 60 | 73 | 766 | 80 | 759 | 727 | 112 | 146 |
| | | | 693 | 691 | 148 | 235 | 604 | 606 | 233 | 581 | 258 | 265 | 574 | 267 | 572 | 367 | 472 | 537 | 302 |
| | | | 543 | 296 | 530 | 309 | 355 | 484 | | | | | | | | | | | |
| 2 | 38 | 78~113 | 815 | 24 | 29 | 810 | 812 | 27 | 809 | 30 | 811 | 28 | 808 | 31 | 791 | 48 | 771 | 68 | 765 |
| | | | 74 | 178 | 661 | 136 | 703 | 236 | 603 | 433 | 406 | 404 | 435 | 434 | 405 | 287 | 552 | 536 | 303 |
| | | | 356 | 483 | | | | | | | | | | | | | | | |
| 3 | 52 | 114~155 | 818 | 21 | 819 | 20 | 39 | 800 | 796 | 43 | 78 | 761 | 753 | 86 | 181 | 658 | 137 | 702 | 714 |
| | | | 125 | 151 | 688 | 261 | 578 | 242 | 597 | 274 | 565 | 266 | 573 | 402 | 437 | 286 | 553 | 383 | 456 |
| | | | 307 | 532 | 357 | 482 | 329 | 510 | 317 | 522 | | | | | | | | | |
| 4 | 64 | 156~187 | 14 | 825 | 15 | 824 | 55 | 784 | 61 | 778 | 103 | 736 | 95 | 744 | 729 | 110 | 202 | 637 | 636 |
| | | | 203 | 190 | 649 | 717 | 122 | 128 | 711 | 622 | 217 | 256 | 583 | 253 | 586 | 471 | 368 | | |
| 5 | 76 | 188~227 | 12 | 827 | 23 | 816 | 805 | 34 | 37 | 802 | 793 | 46 | 89 | 750 | 721 | 118 | 179 | 660 | 142 |
| | | | 697 | 709 | 130 | 231 | 608 | 260 | 579 | 263 | 576 | 571 | 268 | 276 | 563 | 284 | 555 | 551 | 288 |
| | | | 304 | 535 | 546 | 293 | 358 | 481 | | | | | | | | | | | |
| 6 | 83 | 228~247 | 748 | 91 | 207 | 632 | 694 | 145 | 133 | 706 | 223 | 616 | 430 | 409 | 398 | 441 | 290 | 549 | 308 |
| | | | 531 | 316 | 523 | | | | | | | | | | | | | | |
| 7 | 104 | 248~311 | 9 | 830 | 10 | 829 | 786 | 53 | 773 | 66 | 57 | 782 | 83 | 756 | 106 | 733 | 731 | 108 | 666 |
| | | | 173 | 201 | 638 | 161 | 678 | 718 | 121 | 704 | 135 | 143 | 696 | 132 | 707 | 623 | 216 | 227 | 612 |
| | | | 611 | 228 | 270 | 569 | 241 | 598 | 584 | 255 | 424 | 415 | 374 | 465 | 461 | 378 | 400 | 439 | 448 |
| | | | 391 | 289 | 550 | 306 | 533 | 495 | 344 | 351 | 488 | 500 | 339 | 493 | 346 | | | | |
| 8 | 119 | 312~355 | 8 | 831 | 823 | 16 | 64 | 775 | 101 | 738 | 655 | 184 | 642 | 197 | 141 | 698 | 690 | 149 | 582 |
| | | | 257 | 254 | 585 | 245 | 594 | 588 | 251 | 412 | 427 | 372 | 467 | 450 | 389 | 545 | 294 | 542 | 297 |
| | | | 311 | 528 | 345 | 494 | 508 | 331 | 325 | 514 | 321 | 518 | | | | | | | |
| 9 | 139 | 356~415 | 832 | 7 | 826 | 13 | 26 | 813 | 790 | 49 | 47 | 792 | 59 | 780 | 71 | 768 | 104 | 735 | 98 |
| | | | 741 | 757 | 82 | 670 | 169 | 87 | 752 | 665 | 174 | 675 | 164 | 631 | 208 | 191 | 648 | 695 | 144 |
| | | | 152 | 687 | 621 | 218 | 269 | 570 | 566 | 273 | 557 | 282 | 436 | 403 | 464 | 375 | 443 | 396 | 401 |
| | | | 438 | 392 | 447 | 457 | 382 | 538 | 301 | 318 | 521 | | | | | | | | |
| 10 | 167 | 416~501 | 833 | 6 | 822 | 17 | 789 | 50 | 774 | 65 | 99 | 740 | 100 | 739 | 758 | 81 | 732 | 107 | 88 |
| | | | 751 | 669 | 170 | 171 | 668 | 175 | 664 | 187 | 652 | 681 | 158 | 119 | 720 | 663 | 176 | 677 | 162 |
| | | | 640 | 199 | 211 | 628 | 685 | 154 | 701 | 138 | 134 | 705 | 624 | 215 | 234 | 605 | 601 | 238 | 239 |
| | | | 600 | 249 | 590 | 248 | 591 | 431 | 408 | 371 | 468 | 469 | 370 | 366 | 473 | 300 | 539 | 353 | 486 |
| | | | 343 | 496 | 497 | 342 | 350 | 489 | 340 | 499 | 498 | 341 | 501 | 338 | 492 | 347 | 330 | 509 | |
| 11 | 209 | 500~625 | 834 | 5 | 33 | 806 | 788 | 51 | 785 | 54 | 777 | 62 | 764 | 75 | 762 | 77 | 743 | 96 | 97 |
| | | | 742 | 673 | 166 | 172 | 667 | 163 | 676 | 185 | 654 | 639 | 200 | 114 | 725 | 650 | 189 | 115 | 724 |
| | | | 194 | 645 | 195 | 644 | 647 | 192 | 657 | 182 | 157 | 682 | 156 | 683 | 124 | 715 | 716 | 123 | 700 |
| | | | 139 | 627 | 212 | 686 | 153 | 213 | 626 | 150 | 689 | 221 | 618 | 615 | 224 | 602 | 237 | 244 | 595 |
| | | | 596 | 243 | 564 | 275 | 562 | 277 | 561 | 278 | 589 | 250 | 246 | 593 | 417 | 422 | 445 | 394 | 446 |
| | | | 393 | 397 | 442 | 381 | 458 | 547 | 292 | 365 | 474 | 540 | 299 | 477 | 362 | 475 | 364 | 541 | 298 |
| | | | 359 | 480 | 527 | 312 | 313 | 526 | 525 | 314 | 487 | 352 | 327 | 512 | 513 | 326 | 319 | 520 | 332 |
| | | | 507 | 348 | 491 | 506 | 333 | 322 | 517 | | | | | | | | | | |
| 12 | 279 | 626~838 | 836 | 3 | 4 | 835 | 828 | 11 | 19 | 820 | 18 | 821 | 817 | 22 | 25 | 814 | 32 | 807 | 36 |
| | | | 803 | 798 | 41 | 801 | 38 | 44 | 795 | 52 | 787 | 794 | 45 | 63 | 776 | 69 | 770 | 772 | 67 |
| | | | 781 | 58 | 72 | 767 | 763 | 76 | 94 | 745 | 92 | 747 | 737 | 102 | 90 | 749 | 754 | 85 | 79 |
| | | | 760 | 167 | 672 | 109 | 730 | 674 | 165 | 728 | 111 | 186 | 653 | 209 | 630 | 160 | 679 | 116 | 723 |
| | | | 206 | 633 | 722 | 117 | 204 | 635 | 651 | 188 | 680 | 159 | 205 | 634 | 641 | 198 | 726 | 113 | 193 |
| | | | 646 | 656 | 183 | 180 | 659 | 662 | 177 | 196 | 643 | 155 | 684 | 214 | 625 | 713 | 126 | 692 | 147 |
| | | | 712 | 127 | 708 | 131 | 219 | 620 | 220 | 619 | 617 | 222 | 613 | 226 | 225 | 614 | 230 | 609 | 607 |
| | | | 232 | 262 | 577 | 580 | 259 | 575 | 264 | 272 | 567 | 271 | 568 | 587 | 252 | 421 | 418 | 416 | 423 |
| | | | 247 | 592 | 426 | 413 | 414 | 425 | 411 | 428 | 281 | 558 | 376 | 463 | 407 | 432 | 410 | 429 | 462 |
| | | | 377 | 395 | 444 | 283 | 556 | 369 | 470 | 554 | 285 | 459 | 380 | 440 | 399 | 379 | 460 | 291 | 548 |
| | | | 449 | 390 | 363 | 476 | 388 | 451 | 384 | 455 | 453 | 386 | 478 | 361 | 387 | 452 | 454 | 385 | 479 |
| | | | 360 | 544 | 295 | 310 | 529 | 485 | 354 | 511 | 328 | 315 | 524 | 337 | 502 | 490 | 349 | 334 | 505 |
| | | | 504 | 335 | 519 | 320 | 515 | 324 | 516 | 323 | | | | | | | | | |

The results of constituting the complex conjugate symmetry characteristics appear to be similar to those of hybrid ordering in FIG. 11. Namely, the indexes can be ordered such that they can be pair-allocated without degrading particular characteristics of them.

Figure 13:
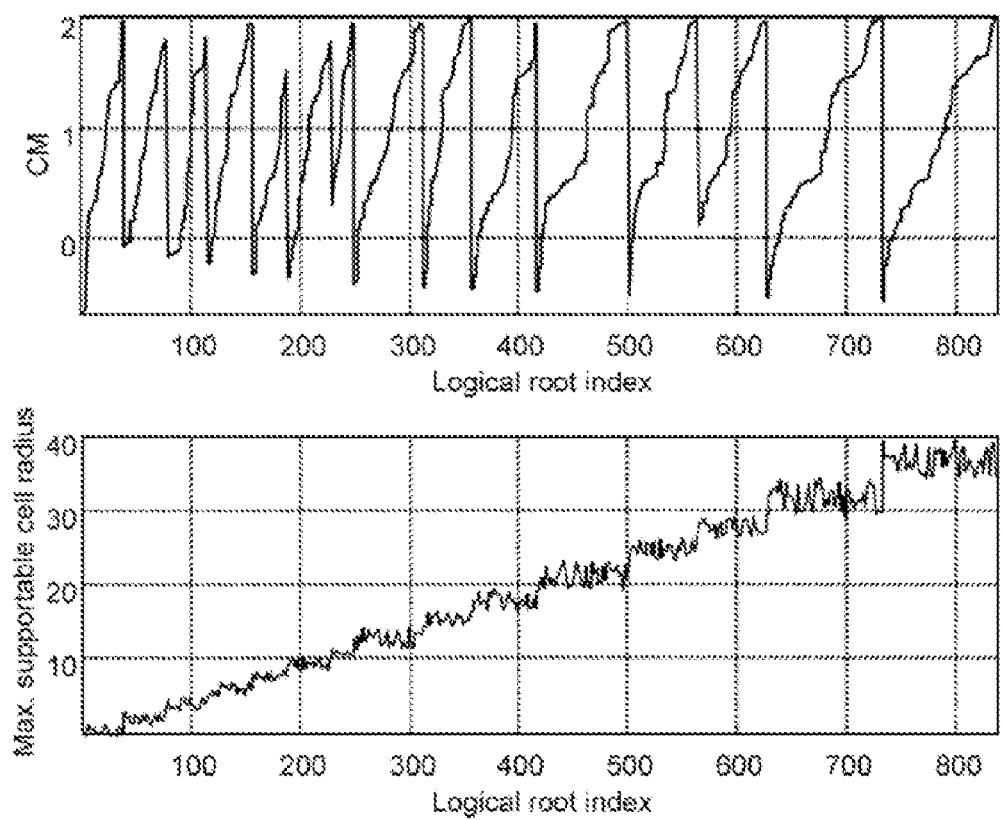

FIG. 13 is a graph showing CM characteristics and maximum supportable cell radius characteristics according to logical root indexes according to another exemplary embodiment of the present invention. Namely, FIG. 13 shows ordering based on the plurality of characteristics and pair allocation.

Referring to FIG. 13, the sections divided in FIG. 12 can be more minutely divided. For example, the sections of the configuration numbers 11 and 12 in Table 3 can be halved to use a wider maximum cell radius.

Table 7 is a mapping table showing physical indexes of respective sections when the 11-th and 12-th sections are halved.

TABLE 7

| No | $N_{CS}$ | Logical index | Physical root index | | | | | | | | | | | | | | | | |
|---|---|---|---|---|---|---|---|---|---|---|---|---|---|---|---|---|---|---|---|
| 0 | 13 | 1~37 | 1 | 838 | 2 | 837 | 769 | 70 | 93 | 746 | 105 | 734 | 755 | 84 | 168 | 671 | 629 | 210 | 120 |
| | | | 719 | 140 | 699 | 129 | 710 | 229 | 610 | 599 | 240 | 420 | 419 | 560 | 279 | 280 | 559 | 373 | 466 |
| | | | 534 | 305 | 336 | 503 | | | | | | | | | | | | | |
| 1 | 26 | 38~77 | 804 | 35 | 799 | 40 | 797 | 42 | 783 | 56 | 779 | 60 | 73 | 766 | 80 | 759 | 727 | 112 | 146 |
| | | | 693 | 691 | 148 | 235 | 604 | 606 | 233 | 581 | 258 | 265 | 574 | 267 | 572 | 367 | 472 | 537 | 302 |
| | | | 543 | 296 | 530 | 309 | 355 | 484 | | | | | | | | | | | |
| 2 | 38 | 78~113 | 815 | 24 | 29 | 810 | 812 | 27 | 809 | 30 | 811 | 28 | 808 | 31 | 791 | 48 | 771 | 68 | 765 |
| | | | 74 | 178 | 661 | 136 | 703 | 236 | 603 | 433 | 406 | 404 | 435 | 434 | 405 | 287 | 552 | 536 | 303 |
| | | | 356 | 483 | | | | | | | | | | | | | | | |
| 3 | 52 | 114~155 | 818 | 21 | 819 | 20 | 39 | 800 | 796 | 43 | 78 | 761 | 753 | 86 | 181 | 658 | 137 | 702 | 714 |
| | | | 125 | 151 | 688 | 261 | 578 | 242 | 597 | 274 | 565 | 266 | 573 | 402 | 437 | 286 | 553 | 383 | 456 |
| | | | 307 | 532 | 357 | 482 | 329 | 510 | 317 | 522 | | | | | | | | | |
| 4 | 64 | 156~187 | 14 | 825 | 15 | 824 | 55 | 784 | 61 | 778 | 103 | 736 | 95 | 744 | 729 | 110 | 202 | 637 | 636 |
| | | | 203 | 190 | 649 | 717 | 122 | 128 | 711 | 622 | 217 | 256 | 583 | 253 | 586 | 471 | 368 | | |
| 5 | 76 | 188~227 | 12 | 827 | 23 | 816 | 805 | 34 | 37 | 802 | 793 | 46 | 89 | 750 | 721 | 118 | 179 | 660 | 142 |
| | | | 697 | 709 | 130 | 231 | 608 | 260 | 579 | 263 | 576 | 571 | 268 | 276 | 563 | 284 | 555 | 551 | 288 |
| | | | 304 | 535 | 546 | 293 | 358 | 481 | | | | | | | | | | | |
| 6 | 83 | 228~247 | 748 | 91 | 207 | 632 | 694 | 145 | 133 | 706 | 223 | 616 | 430 | 409 | 398 | 441 | 290 | 549 | 308 |
| | | | 531 | 316 | 523 | | | | | | | | | | | | | | |
| 7 | 104 | 248~311 | 9 | 830 | 10 | 829 | 786 | 53 | 773 | 66 | 57 | 782 | 83 | 756 | 106 | 733 | 731 | 108 | 666 |
| | | | 173 | 201 | 638 | 161 | 678 | 718 | 121 | 704 | 135 | 143 | 696 | 132 | 707 | 623 | 216 | 227 | 612 |
| | | | 611 | 228 | 270 | 569 | 241 | 598 | 584 | 255 | 424 | 415 | 374 | 465 | 461 | 378 | 400 | 439 | 448 |
| | | | 391 | 289 | 550 | 306 | 533 | 495 | 344 | 351 | 488 | 500 | 339 | 493 | 346 | | | | |
| 8 | 119 | 312~355 | 8 | 831 | 823 | 16 | 64 | 775 | 101 | 738 | 655 | 184 | 642 | 197 | 141 | 698 | 690 | 149 | 582 |
| | | | 257 | 254 | 585 | 245 | 594 | 588 | 251 | 412 | 427 | 372 | 467 | 450 | 389 | 545 | 294 | 542 | 297 |
| | | | 311 | 528 | 345 | 494 | 508 | 331 | 325 | 514 | 321 | 518 | | | | | | | |
| 9 | 139 | 356~415 | 832 | 7 | 826 | 13 | 26 | 813 | 790 | 49 | 47 | 792 | 59 | 780 | 71 | 768 | 104 | 735 | 98 |
| | | | 741 | 757 | 82 | 670 | 169 | 87 | 752 | 665 | 174 | 675 | 164 | 631 | 208 | 191 | 648 | 695 | 144 |
| | | | 152 | 687 | 621 | 218 | 269 | 570 | 566 | 273 | 557 | 282 | 436 | 403 | 464 | 375 | 443 | 396 | 401 |
| | | | 438 | 392 | 447 | 457 | 382 | 538 | 301 | 318 | 521 | | | | | | | | |
| 10 | 167 | 416~501 | 833 | 6 | 822 | 17 | 789 | 50 | 774 | 65 | 99 | 740 | 100 | 739 | 758 | 81 | 732 | 107 | 88 |
| | | | 751 | 669 | 170 | 171 | 668 | 175 | 664 | 187 | 652 | 681 | 158 | 119 | 720 | 663 | 176 | 677 | 162 |
| | | | 640 | 199 | 211 | 628 | 685 | 154 | 701 | 138 | 134 | 705 | 624 | 215 | 234 | 605 | 601 | 238 | 239 |
| | | | 600 | 249 | 590 | 248 | 591 | 431 | 408 | 371 | 468 | 469 | 370 | 366 | 473 | 300 | 539 | 353 | 486 |
| | | | 343 | 496 | 497 | 342 | 350 | 489 | 340 | 499 | 498 | 341 | 501 | 338 | 492 | 347 | 330 | 509 | |
| 11 | 209 | 500~563 | 834 | 5 | 33 | 806 | 788 | 51 | 764 | 75 | 97 | 742 | 673 | 166 | 163 | 676 | 639 | 200 | 114 |
| | | | 725 | 650 | 189 | 194 | 645 | 195 | 644 | 157 | 682 | 700 | 139 | 627 | 212 | 686 | 153 | 150 | 689 |
| | | | 602 | 237 | 596 | 243 | 564 | 275 | 561 | 278 | 417 | 422 | 445 | 394 | 365 | 474 | 540 | 299 | 541 |
| | | | 298 | 525 | 314 | 487 | 352 | 513 | 326 | 332 | 507 | 348 | 491 | 322 | 517 | | | | |
| | | 564-625 | 785 | 54 | 777 | 62 | 762 | 77 | 743 | 96 | 172 | 667 | 185 | 654 | 115 | 724 | 192 | 647 | 657 |
| | | | 182 | 156 | 683 | 124 | 715 | 716 | 123 | 213 | 626 | 221 | 618 | 615 | 224 | 244 | 595 | 562 | 277 |
| | | | 589 | 250 | 246 | 593 | 446 | 393 | 397 | 442 | 381 | 458 | 547 | 292 | 477 | 362 | 364 | 475 | 359 |
| | | | 480 | 527 | 312 | 313 | 526 | 327 | 512 | 319 | 520 | 506 | 333 | | | | | | |
| 12 | 279 | 626~731 | 4 | 835 | 828 | 11 | 18 | 821 | 25 | 814 | 32 | 807 | 36 | 803 | 52 | 787 | 69 | 770 | 781 |
| | | | 58 | 94 | 745 | 92 | 747 | 754 | 85 | 79 | 760 | 167 | 672 | 674 | 165 | 186 | 653 | 679 | 160 |
| | | | 116 | 723 | 206 | 633 | 651 | 188 | 205 | 634 | 193 | 646 | 656 | 183 | 662 | 177 | 196 | 643 | 692 |
| | | | 147 | 712 | 127 | 220 | 619 | 225 | 614 | 580 | 259 | 575 | 264 | 272 | 567 | 271 | 568 | 416 | 423 |
| | | | 247 | 592 | 414 | 425 | 281 | 558 | 407 | 432 | 410 | 429 | 462 | 377 | 369 | 470 | 459 | 380 | 440 |
| | | | 399 | 291 | 548 | 454 | 385 | 544 | 295 | 485 | 354 | 511 | 328 | 337 | 502 | 490 | 349 | 334 | 505 |
| | | | 519 | 320 | 516 | 323 | | | | | | | | | | | | | |
| | | 732-838 | 836 | 3 | 19 | 820 | 817 | 22 | 798 | 41 | 801 | 38 | 44 | 795 | 794 | 45 | 63 | 776 | 772 |
| | | | 67 | 72 | 767 | 763 | 76 | 737 | 102 | 90 | 749 | 109 | 730 | 728 | 111 | 209 | 630 | 635 | 204 |
| | | | 722 | 117 | 680 | 159 | 641 | 198 | 113 | 726 | 180 | 659 | 155 | 684 | 214 | 625 | 713 | 126 | 708 |
| | | | 131 | 219 | 620 | 617 | 222 | 613 | 226 | 230 | 609 | 607 | 232 | 262 | 577 | 587 | 252 | 421 | 418 |
| | | | 426 | 413 | 411 | 428 | 376 | 463 | 395 | 444 | 283 | 556 | 554 | 285 | 460 | 379 | 449 | 390 | 363 |
| | | | 476 | 388 | 451 | 384 | 455 | 453 | 386 | 478 | 361 | 387 | 452 | 479 | 360 | 310 | 529 | 315 | 524 |
| | | | 504 | 335 | 324 | 515 | | | | | | | | | | | | | |

The maximum cell radius can be increased from 29.14 km to 34.15 km so as to be used by applying Table 7. Here, particular sections are halved and re-ordered, but it is merely an example. That is, the size of particular sections can be divided in various manners. For example, in order to support a particular maximum cell radius, sections may be divided based on the particular maximum cell radius. Alternatively, sections may be divided such that the number of indexes used in a particular section is doubled. Sections having a small number of indexes can be grouped into one section, to which the second ordering may be applied. In addition, a section having a large number of indexes can be divided into two (or more) sections, to which the second ordering may be applied.

Figure 14:
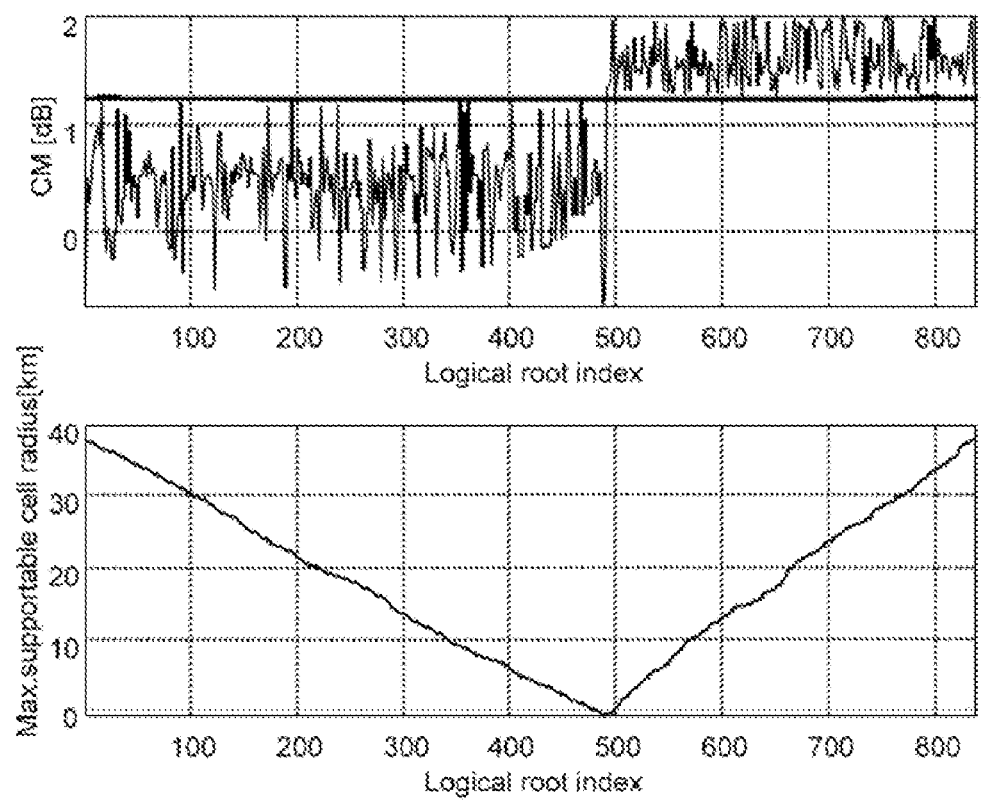

FIG. 14 is a graph showing CM characteristics and maximum supportable cell radius characteristics according to logical root indexes according to another exemplary embodiment of the present invention. Namely, FIG. 13 shows that indexes are divided into groups based on the CM characteristics and are ordered according to a maximum supportable cell size in each group.

Referring to FIG. 14, first, the indexes may be ordered according to the CM characteristics, divided into a group having a CM higher than 1.2 dB, namely, a QPSK CM, and a group having a lower CM, and then ordered according to the maximum supportable cell radius in each group. The indexes in the group having the CM lower than QPSK may be ordered according to the order that the maximum supportable cell size is reduced, and the indexes in the group having the CM higher than QPSK may be ordered in the order that the maximum supportable cell size is increased.

Table 8 is a mapping table of physical indexes by section in case where the indexes are ordered according to the CM characteristics, divided into groups based on 1.2 dB, a single CM value, and then ordered according to the maximum supportable cell size in each group.

TABLE 8

| No | Logical index | Physical root index | | | | | | | | | | | | | | | | | |
|---|---|---|---|---|---|---|---|---|---|---|---|---|---|---|---|---|---|---|---|
| 0 | 1~50 | 3 | 836 | 209 | 630 | 76 | 763 | 180 | 659 | 126 | 713 | 219 | 620 | 226 | 613 | 131 | 708 | 262 | 577 |
|   |      | 72 | 767 | 22 | 817 | 44 | 795 | 41 | 798 | 19 | 820 | 38 | 801 | 232 | 607 | 67 | 772 | 45 | 794 |
|   |      | 90 | 749 | 230 | 609 | 111 | 728 | 222 | 617 | 102 | 737 | 204 | 635 | 109 | 730 | | | | |
| 1 | 51~100 | 63 | 776 | 117 | 722 | 198 | 641 | 155 | 684 | 159 | 680 | 214 | 625 | 113 | 726 | 196 | 643 | 183 | 656 |
|   |      | 52 | 787 | 94 | 745 | 188 | 651 | 165 | 674 | 177 | 662 | 32 | 807 | 25 | 814 | 147 | 692 | 18 | 821 |
|   |      | 36 | 803 | 69 | 770 | 259 | 580 | 11 | 828 | 92 | 747 | 85 | 754 | 220 | 619 | | | | |
| 2 | 101~150 | 206 | 633 | 79 | 760 | 205 | 634 | 225 | 614 | 127 | 712 | 58 | 781 | 116 | 723 | 160 | 679 | 193 | 646 |
|   |      | 186 | 653 | 167 | 672 | 4 | 835 | 77 | 762 | 224 | 615 | 221 | 618 | 62 | 777 | 124 | 715 | 54 | 785 |
|   |      | 96 | 743 | 192 | 647 | 172 | 667 | 156 | 683 | 115 | 724 | 185 | 654 | 213 | 626 | | | | |
| 3 | 151~200 | 123 | 716 | 182 | 657 | 166 | 673 | 212 | 627 | 195 | 644 | 114 | 725 | 189 | 650 | 51 | 788 | 75 | 764 |
|   |      | 150 | 689 | 33 | 806 | 237 | 602 | 163 | 676 | 97 | 742 | 194 | 645 | 200 | 639 | 157 | 682 | 153 | 686 |
|   |      | 139 | 700 | 5 | 834 | 211 | 628 | 187 | 652 | 239 | 600 | 175 | 664 | 99 | 740 | | | | |
| 4 | 201~250 | 215 | 624 | 154 | 685 | 171 | 668 | 199 | 640 | 158 | 681 | 170 | 669 | 138 | 701 | 50 | 789 | 100 | 739 |
|   |      | 107 | 732 | 17 | 822 | 234 | 605 | 81 | 758 | 162 | 677 | 134 | 705 | 88 | 751 | 176 | 663 | 65 | 774 |
|   |      | 119 | 720 | 238 | 601 | 6 | 833 | 169 | 670 | 152 | 687 | 49 | 790 | 98 | 741 | | | | |
| 5 | 251~300 | 87 | 752 | 174 | 665 | 144 | 695 | 82 | 757 | 164 | 675 | 71 | 768 | 13 | 826 | 26 | 813 | 59 | 780 |
|   |      | 218 | 621 | 47 | 792 | 191 | 648 | 104 | 735 | 208 | 631 | 7 | 832 | 141 | 698 | 64 | 775 | 197 | 642 |
|   |      | 184 | 655 | 101 | 738 | 149 | 690 | 8 | 831 | 16 | 823 | 121 | 718 | 57 | 782 | | | | |
| 6 | 301~350 | 108 | 731 | 216 | 623 | 161 | 678 | 173 | 666 | 201 | 638 | 53 | 786 | 106 | 733 | 9 | 830 | 228 | 611 |
|   |      | 83 | 756 | 66 | 773 | 132 | 707 | 143 | 696 | 135 | 704 | 227 | 612 | 10 | 829 | 91 | 748 | 133 | 706 |
|   |      | 145 | 694 | 223 | 616 | 207 | 632 | 179 | 660 | 34 | 805 | 23 | 816 | 46 | 793 | | | | |
| 7 | 351~400 | 130 | 709 | 260 | 579 | 12 | 827 | 231 | 608 | 37 | 802 | 263 | 576 | 89 | 750 | 142 | 697 | 118 | 721 |
|   |      | 203 | 636 | 55 | 784 | 110 | 729 | 14 | 825 | 128 | 711 | 217 | 622 | 103 | 736 | 15 | 824 | 61 | 778 |
|   |      | 122 | 717 | 202 | 637 | 95 | 744 | 190 | 649 | 181 | 658 | 151 | 688 | 137 | 702 | | | | |
| 8 | 401~450 | 125 | 714 | 261 | 578 | 39 | 800 | 78 | 761 | 20 | 819 | 21 | 818 | 43 | 796 | 86 | 753 | 68 | 771 |
|   |      | 136 | 703 | 24 | 815 | 48 | 791 | 74 | 765 | 178 | 661 | 236 | 603 | 27 | 812 | 28 | 811 | 29 | 810 |
|   |      | 30 | 809 | 31 | 808 | 235 | 604 | 35 | 804 | 73 | 766 | 146 | 693 | 40 | 799 | | | | |
| 9 | 451~500 | 80 | 759 | 42 | 797 | 233 | 606 | 148 | 691 | 56 | 783 | 112 | 727 | 60 | 779 | 129 | 710 | 258 | 581 |
|   |      | 70 | 769 | 229 | 610 | 84 | 755 | 93 | 746 | 105 | 734 | 120 | 719 | 140 | 699 | 168 | 671 | 210 | 629 |
|   |      | 1 | 838 | 2 | 837 | 419 | 420 | 279 | 560 | 280 | 559 | 336 | 503 | 240 | 599 | | | | |
| 10 | 501~550 | 373 | 466 | 305 | 534 | 367 | 472 | 296 | 543 | 265 | 574 | 309 | 530 | 267 | 572 | 302 | 537 | 355 | 484 |
|   |      | 404 | 435 | 405 | 434 | 406 | 433 | 356 | 483 | 303 | 536 | 287 | 552 | 266 | 573 | 307 | 532 | 286 | 553 |
|   |      | 317 | 522 | 383 | 456 | 357 | 482 | 402 | 437 | 274 | 565 | 329 | 510 | 242 | 597 | | | | |
| 11 | 551~600 | 368 | 471 | 256 | 583 | 253 | 586 | 293 | 546 | 284 | 555 | 288 | 551 | 304 | 535 | 268 | 571 | 358 | 481 |
|   |      | 276 | 563 | 316 | 523 | 398 | 441 | 308 | 531 | 409 | 430 | 290 | 549 | 374 | 465 | 306 | 533 | 400 | 439 |
|   |      | 270 | 569 | 289 | 550 | 378 | 461 | 415 | 424 | 241 | 598 | 346 | 493 | 351 | 488 | | | | |
| 12 | 601~650 | 339 | 500 | 344 | 495 | 255 | 584 | 391 | 448 | 372 | 467 | 345 | 494 | 254 | 585 | 331 | 508 | 389 | 450 |
|   |      | 257 | 582 | 325 | 514 | 412 | 427 | 245 | 594 | 297 | 542 | 321 | 518 | 311 | 528 | 251 | 588 | 294 | 545 |
|   |      | 282 | 557 | 392 | 447 | 382 | 457 | 318 | 521 | 396 | 443 | 273 | 566 | 403 | 436 | | | | |
| 13 | 651~700 | 269 | 570 | 301 | 538 | 375 | 464 | 401 | 438 | 338 | 501 | 408 | 431 | 371 | 468 | 366 | 473 | 330 | 509 |
|   |      | 340 | 499 | 249 | 590 | 341 | 498 | 342 | 497 | 248 | 591 | 343 | 496 | 370 | 469 | 347 | 492 | 350 | 489 |
|   |      | 353 | 486 | 300 | 539 | 417 | 422 | 278 | 561 | 314 | 525 | 352 | 487 | 326 | 513 | | | | |
| 14 | 701~750 | 348 | 491 | 365 | 474 | 275 | 564 | 394 | 445 | 243 | 596 | 298 | 541 | 322 | 517 | 332 | 507 | 299 | 540 |
|   |      | 364 | 475 | 393 | 446 | 246 | 593 | 319 | 520 | 313 | 526 | 333 | 506 | 327 | 512 | 244 | 595 | 362 | 477 |
|   |      | 250 | 589 | 312 | 527 | 292 | 547 | 397 | 442 | 381 | 458 | 359 | 480 | 277 | 562 | | | | |
| 15 | 751~800 | 281 | 558 | 334 | 505 | 323 | 516 | 247 | 592 | 320 | 519 | 369 | 470 | 272 | 567 | 295 | 544 | 410 | 429 |
|   |      | 291 | 548 | 380 | 459 | 399 | 440 | 271 | 568 | 377 | 462 | 414 | 425 | 385 | 454 | 264 | 575 | 407 | 432 |
|   |      | 354 | 485 | 349 | 490 | 337 | 502 | 416 | 423 | 328 | 511 | 363 | 476 | 324 | 515 | | | | |
| 16 | 801~838 | 411 | 428 | 310 | 529 | 361 | 478 | 283 | 556 | 388 | 451 | 390 | 449 | 413 | 426 | 379 | 460 | 384 | 455 |
|   |      | 285 | 554 | 386 | 453 | 376 | 463 | 387 | 452 | 252 | 587 | 395 | 444 | 360 | 479 | 315 | 524 | 335 | 504 |
|   |      | 418 | 421 | | | | | | | | | | | | | | | | |

<Comparison with a Reuse Factor in a Large Cell>

Figure 15:
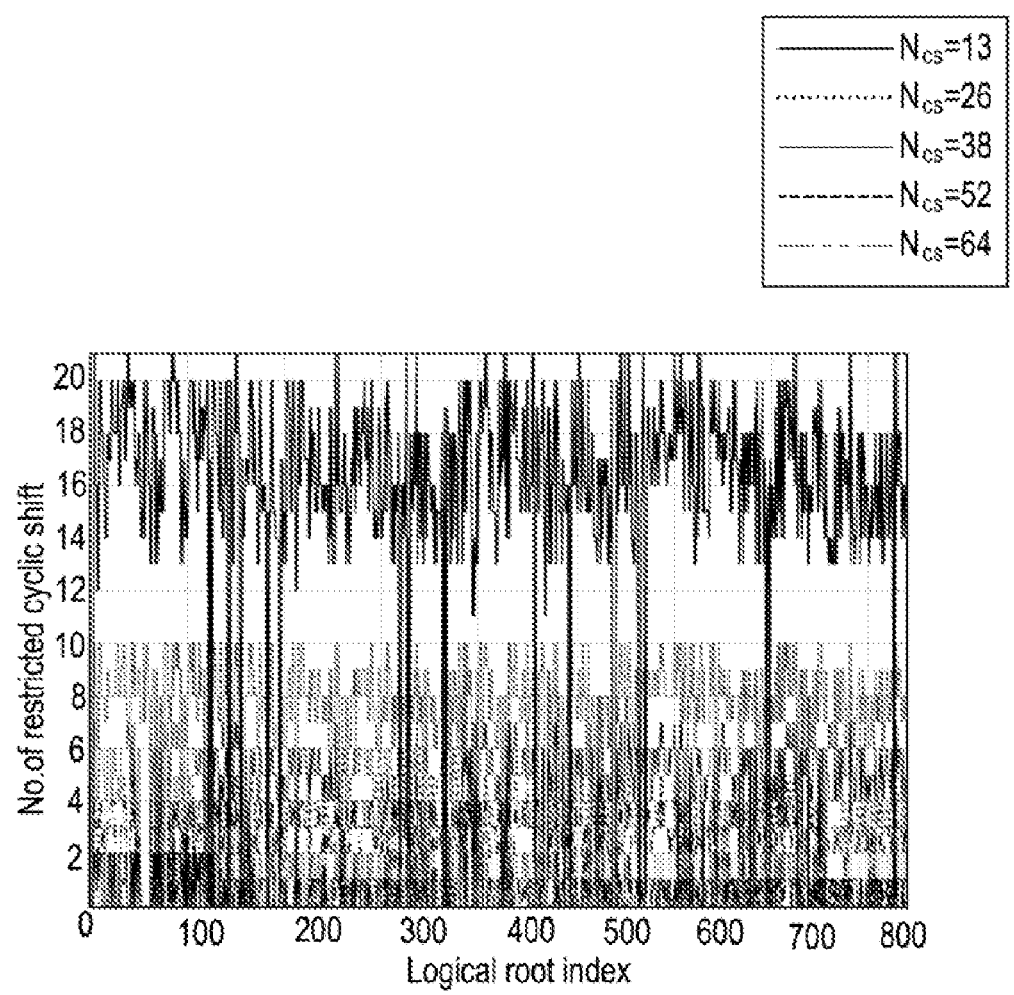
FIG. 15 is a graph showing the number of restricted cyclic shifts that can be used per logical root index according to Ncs with respect to CM mapping according to one exemplary embodiment of the present invention.
Figure 16:
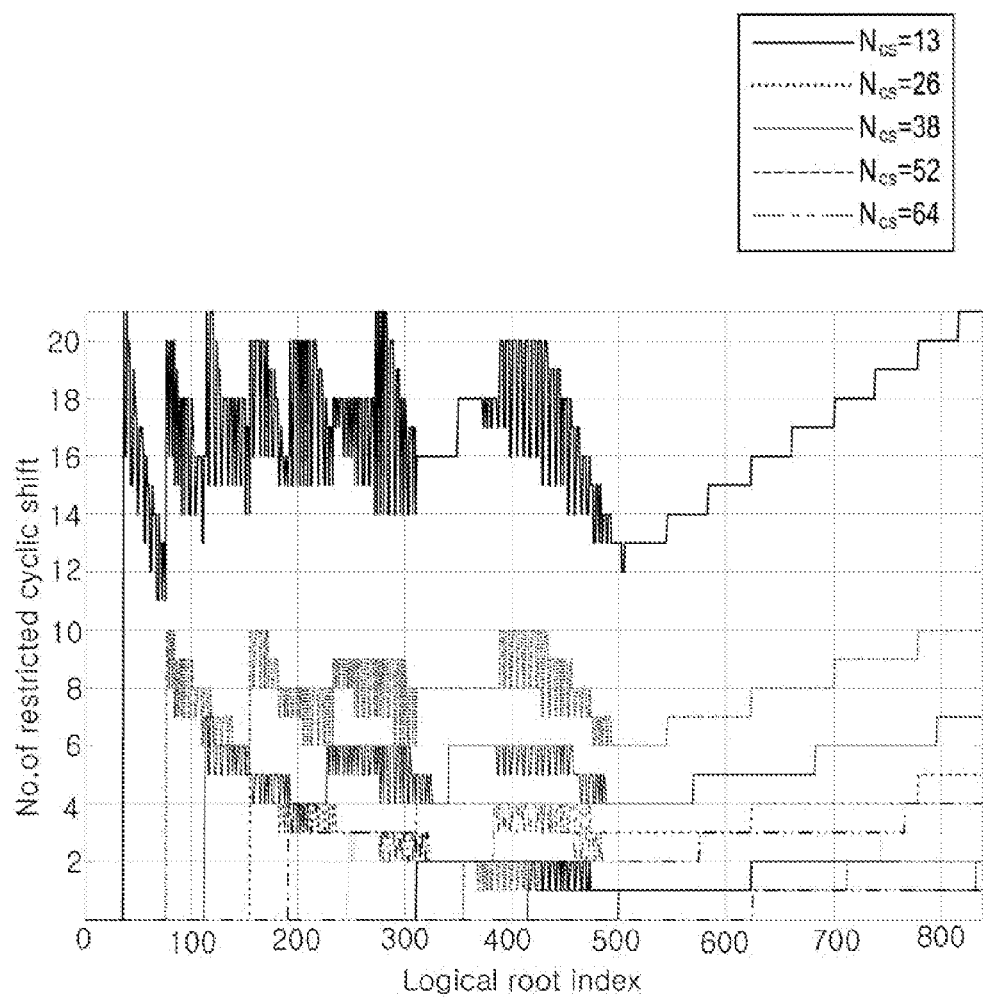
FIG. 16 is a graph showing the number of restricted cyclic shifts that can be used per logical root index according to Ncs with respect to maximum supportable cell size mapping according to one exemplary embodiment of the present invention.
Figure 17:
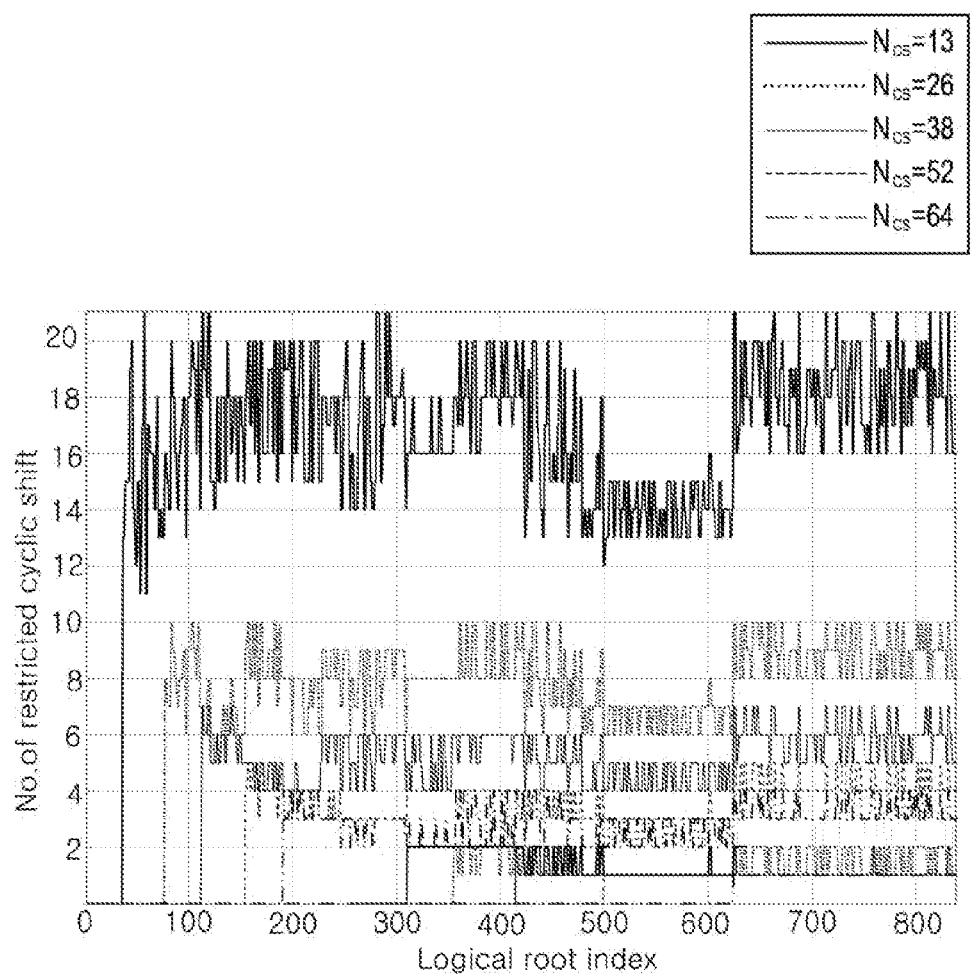
FIG. 17 is a graph showing the number of restricted cyclic shifts that can be used per logical root index according to Ncs with respect to hybrid mapping according to one exemplary embodiment of the present invention.

FIG. 15 is a graph showing the number of restricted cyclic shifts available per logical index according to an Ncs with respect to CM mapping according to one exemplary embodiment of the present invention. FIG. 16 is a graph showing the number of restricted cyclic shifts available per logical index according to the Ncs with respect to maximum supportable cell size mapping according to one exemplary embodiment of the present invention. FIG. 17 is a graph showing the number of restricted cyclic shifts available per logical index according to the Ncs with respect to hybrid mapping according to one exemplary embodiment of the present invention.

Referring to FIGS. 15 to 17, compared with the CM mapping, the maximum supportable cell size mapping and the hybrid mapping may use consecutive indexes in a high speed cell. For example, it is assumed that there are twenty cells, the cyclic shift parameter Ncs of a first cell is 13, the Ncs of the subsequent two cells (i.e., second and third cells) are 26, those of the subsequent three cells are 38, those of the subsequent four cells are 38, those of the subsequent four cells are 52, and those of the subsequent four cells are 64. In this case, pair index allocation is applied to each mapping. The Ncs indicates the number of cyclic shifts according to cell sizes. Referring to FIG. 13, it is noted that a middle portion is 0 and any available restricted cyclic shift does not appear. On the contrary, Referring to FIGS. 15 and 16, any available restricted cyclic shift does not appear. Namely, the consecutive indexes cannot be used in the CM mapping but can be used in the maximum supportable cell size mapping and hybrid mapping.

Figure 18:
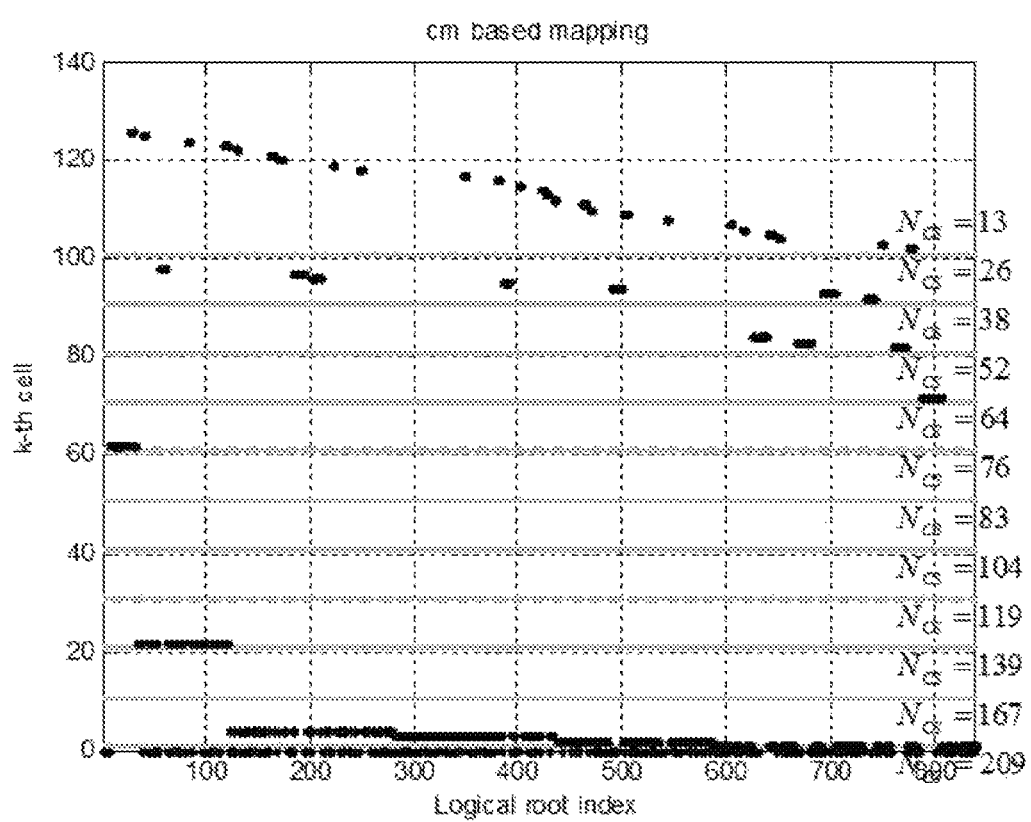
FIG. 18 is a graph showing examples of logical root indexes allocated to cells with respect to CM mapping according to one exemplary embodiment of the present invention.
Figure 19:
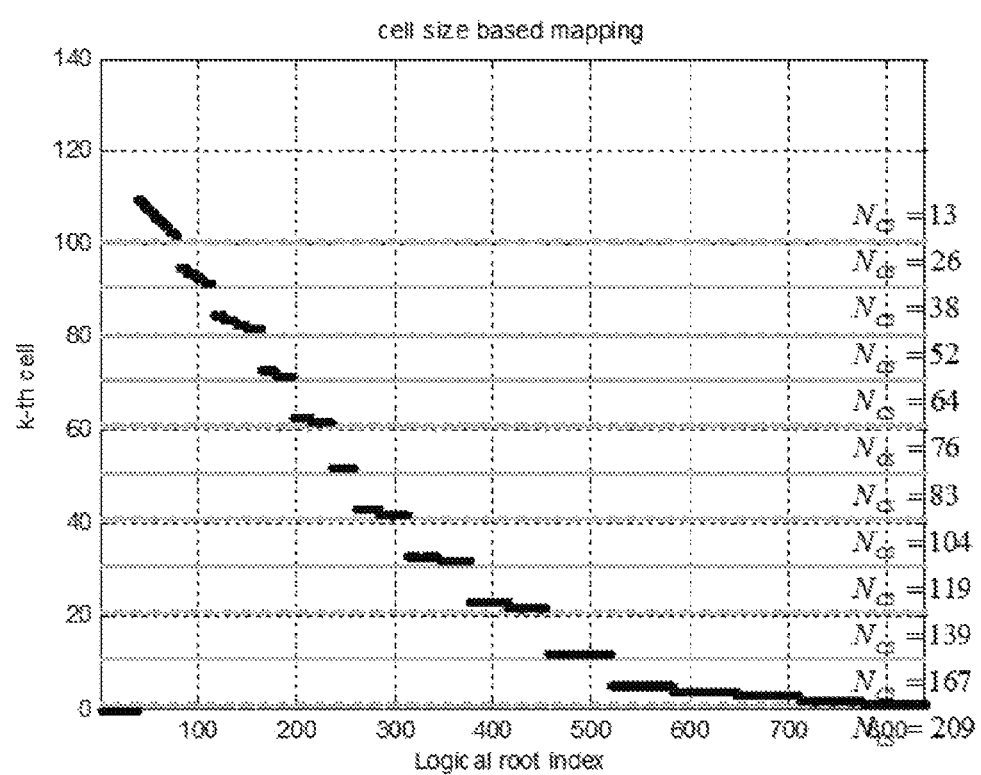
FIG. 19 is a graph showing examples of logical root indexes allocated to cells with respect to maximum supportable cell size mapping according to one exemplary embodiment of the present invention.
Figure 20:
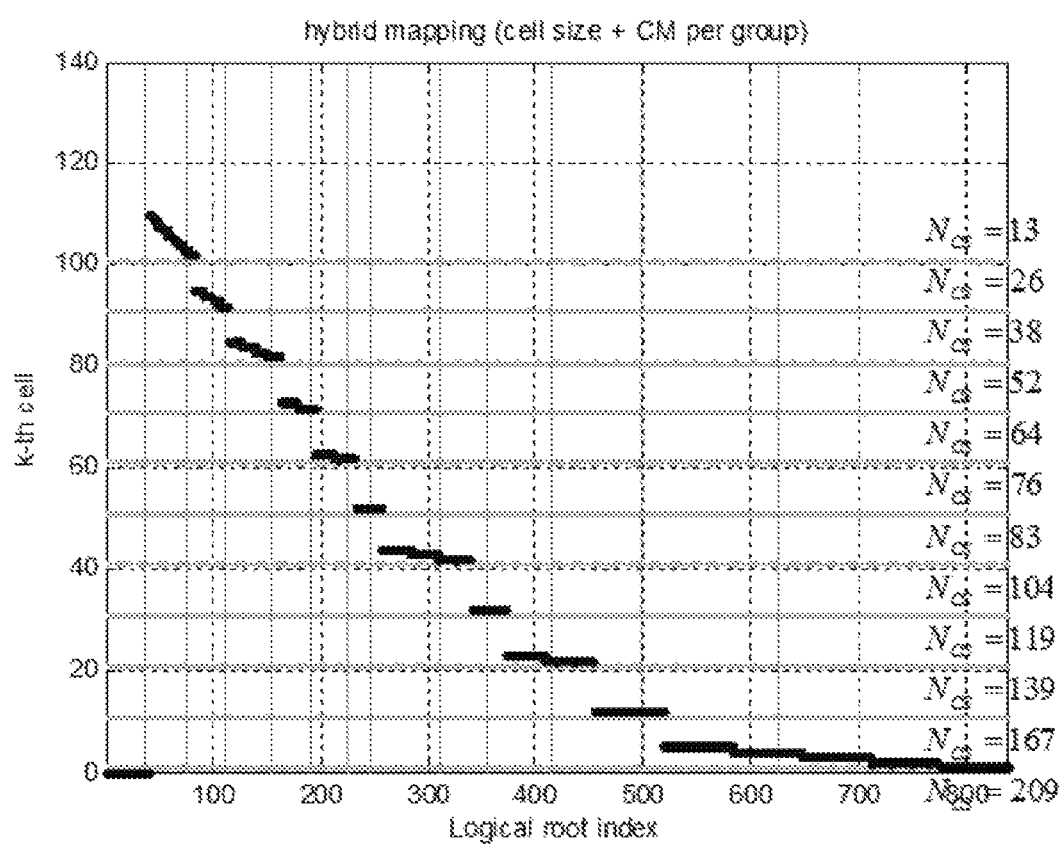
FIG. 20 is a graph showing examples of logical root indexes allocated to cells with respect to maximum supportable cell size mapping according to one exemplary embodiment of the present invention.

FIG. 18 is a graph showing examples of logical root indexes allocated to cells with respect to the CM mapping according to one exemplary embodiment of the present invention. FIG. 19 is a graph showing examples of logical root indexes allocated to cells with respect to the maximum supportable cell size mapping according to one exemplary embodiment of the present invention. FIG. 20 is a graph showing examples of logical root indexes allocated to cells with respect to the maximum supportable cell size mapping according to one exemplary embodiment of the present invention. Namely, FIGS. 18 to 20 show which indexes are allocated to cells based on the assumption in FIGS. 15 to 17.

Referring to FIGS. 18 to 20, it is assumed that every cell has high speed mobility. Referring to FIG. 18, it is noted that consecutive indexes are not used in a large cell. In comparison, Referring to FIGS. 19 and 20, it is noted that consecutive indexes can be used in a large cell. In FIGS. 19 and 20, if a cell has the Ncs of 209 (Ncs=209), four cells having the Ncs of 167 (Ncs=167) can be constructed. The reason is because, in FIG. 18, consecutive indexes cannot be used. More importantly, in FIG. 18, it is noted that, if a cell has the Ncs of 209 and three cells have the Ncs of 167, any of cells having NCS=139, Ncs=104, Ncs=83, and Ncs=76 cannot be constructed. In comparison, in FIGS. 19 and 20, cells of various sizes can be constructed. Also, in FIG. 18, it is noted that a plurality of indexes has a value 0 at the y axis and are not used in a high mobility cell. If those indexes can be used when the high mobility cell is mixed with only a low mobility cell, but such indexes drastically degrade the cell construction capabilities. Thus, failing to use the consecutive indexes much degrades the re-use factor when a plurality of large cells exists. That is, by using the consecutive indexes, a different cell may use an extra space. The use of the consecutive indexes may not make much difference in a network including only small cells, but as far as a network including a plurality of large cells concerned, the support of the use of the consecutive indexes can increase the re-use factor. FIGS. 18 to 20 consider the case where every cell has high speed mobility, but even in a case where cells having low speed mobility or middle speed mobility exist, the re-use factor is restricted if the consecutive indexes are not used for the same reasons. Also, if the consecutive indexes are used in a cell having low speed mobility or middle speed mobility, the re-use factor of the cell having high speed mobility is further restricted.

The accurate indexes of each mapping as used are as shown in Table 9, Table 10, and Table 11. Table 9 shows the indexes used for the CM mapping, Table 10 shows indexes used for the maximum support cell size mapping, and Table 11 shows the indexes used for the hybrid mapping. In Table 9 and Table 10, physical root indexes with respect to logical indexes 1 to 838 are arranged in sequence.

TABLE 9

| Logical index | Physical root index | | | | | | | | | | | | | | | | | |
|---|---|---|---|---|---|---|---|---|---|---|---|---|---|---|---|---|---|---|
| 1~838 | 1 | 838 | 2 | 837 | 3 | 836 | 4 | 835 | 5 | 834 | 6 | 833 | 7 | 832 | 8 | 831 | 9 | 830 |
| | 10 | 829 | 11 | 828 | 12 | 827 | 13 | 826 | 14 | 825 | 15 | 824 | 16 | 823 | 17 | 822 | 19 | 820 |
| | 18 | 821 | 21 | 818 | 20 | 819 | 23 | 816 | 22 | 817 | 26 | 813 | 24 | 815 | 25 | 814 | 29 | 810 |
| | 27 | 812 | 30 | 809 | 28 | 811 | 31 | 808 | 34 | 805 | 35 | 804 | 32 | 807 | 33 | 806 | 40 | 799 |
| | 36 | 803 | 42 | 797 | 41 | 798 | 38 | 801 | 37 | 802 | 39 | 800 | 43 | 796 | 49 | 790 | 44 | 795 |
| | 50 | 789 | 52 | 787 | 51 | 788 | 46 | 793 | 48 | 791 | 47 | 792 | 53 | 786 | 45 | 794 | 64 | 775 |
| | 65 | 774 | 54 | 785 | 55 | 784 | 63 | 776 | 56 | 783 | 69 | 770 | 70 | 769 | 60 | 779 | 67 | 772 |
| | 66 | 773 | 68 | 771 | 59 | 780 | 61 | 778 | 62 | 777 | 57 | 782 | 58 | 781 | 71 | 768 | 93 | 746 |
| | 72 | 767 | 75 | 764 | 104 | 735 | 76 | 763 | 94 | 745 | 105 | 734 | 73 | 766 | 92 | 747 | 103 | 736 |
| | 74 | 765 | 95 | 744 | 102 | 737 | 101 | 738 | 91 | 748 | 99 | 740 | 90 | 749 | 77 | 762 | 98 | 741 |
| | 84 | 755 | 96 | 743 | 100 | 739 | 82 | 757 | 78 | 761 | 83 | 756 | 106 | 733 | 168 | 671 | 85 | 754 |
| | 86 | 753 | 97 | 742 | 89 | 750 | 81 | 758 | 107 | 732 | 88 | 751 | 80 | 759 | 79 | 760 | 167 | 672 |
| | 169 | 670 | 87 | 752 | 108 | 731 | 170 | 669 | 166 | 673 | 109 | 730 | 171 | 668 | 165 | 674 | 172 | 667 |
| | 111 | 728 | 174 | 665 | 186 | 653 | 110 | 729 | 164 | 675 | 175 | 664 | 187 | 652 | 173 | 666 | 163 | 676 |
| | 209 | 630 | 160 | 679 | 112 | 727 | 116 | 723 | 185 | 654 | 208 | 631 | 200 | 639 | 184 | 655 | 207 | 632 |
| | 118 | 721 | 206 | 633 | 204 | 635 | 117 | 722 | 188 | 651 | 201 | 638 | 159 | 680 | 205 | 634 | 158 | 681 |
| | 119 | 720 | 176 | 663 | 114 | 725 | 161 | 678 | 189 | 650 | 198 | 641 | 113 | 726 | 115 | 724 | 202 | 637 |
| | 193 | 646 | 162 | 677 | 194 | 645 | 203 | 636 | 199 | 640 | 183 | 656 | 210 | 629 | 197 | 642 | 195 | 644 |
| | 120 | 719 | 192 | 647 | 180 | 659 | 190 | 649 | 182 | 657 | 179 | 660 | 177 | 662 | 191 | 648 | 157 | 682 |
| | 196 | 643 | 181 | 658 | 178 | 661 | 121 | 718 | 156 | 683 | 122 | 717 | 211 | 628 | 154 | 685 | 124 | 715 |
| | 123 | 716 | 140 | 699 | 155 | 684 | 145 | 694 | 135 | 704 | 139 | 700 | 137 | 702 | 212 | 627 | 153 | 686 |
| | 141 | 698 | 138 | 701 | 134 | 705 | 125 | 714 | 144 | 695 | 142 | 697 | 143 | 696 | 146 | 693 | 213 | 626 |
| | 136 | 703 | 133 | 706 | 152 | 687 | 151 | 688 | 214 | 625 | 126 | 713 | 128 | 11 | 147 | 692 | 132 | 707 |
| | 215 | 624 | 127 | 712 | 150 | 689 | 130 | 709 | 148 | 691 | 149 | 690 | 129 | 710 | 216 | 623 | 131 | 708 |
| | 217 | 622 | 218 | 621 | 219 | 620 | 220 | 619 | 223 | 616 | 221 | 618 | 222 | 617 | 224 | 615 | 226 | 613 |
| | 227 | 612 | 225 | 614 | 228 | 611 | 229 | 610 | 230 | 609 | 231 | 608 | 236 | 603 | 232 | 607 | 235 | 604 |
| | 233 | 606 | 234 | 605 | 237 | 602 | 238 | 601 | 262 | 577 | 261 | 578 | 239 | 600 | 260 | 579 | 259 | 580 |
| | 258 | 581 | 263 | 576 | 257 | 582 | 240 | 599 | 269 | 570 | 256 | 583 | 268 | 571 | 241 | 598 | 264 | 575 |
| | 270 | 569 | 272 | 567 | 242 | 597 | 274 | 565 | 244 | 595 | 273 | 566 | 243 | 596 | 265 | 574 | 275 | 564 |
| | 267 | 572 | 276 | 563 | 271 | 568 | 255 | 584 | 277 | 562 | 278 | 561 | 419 | 420 | 266 | 573 | 253 | 586 |
| | 279 | 560 | 254 | 585 | 252 | 587 | 245 | 594 | 418 | 421 | 250 | 589 | 251 | 588 | 249 | 590 | 246 | 593 |
| | 417 | 422 | 416 | 423 | 280 | 559 | 248 | 591 | 415 | 424 | 247 | 592 | 373 | 466 | 413 | 426 | 414 | 425 |
| | 412 | 427 | 411 | 428 | 281 | 558 | 374 | 465 | 376 | 463 | 409 | 430 | 407 | 432 | 372 | 467 | 410 | 429 |
| | 282 | 557 | 377 | 462 | 403 | 436 | 375 | 464 | 406 | 433 | 395 | 444 | 408 | 431 | 283 | 556 | 402 | 437 |
| | 371 | 468 | 404 | 435 | 396 | 443 | 369 | 470 | 394 | 445 | 368 | 471 | 378 | 461 | 397 | 442 | 405 | 434 |
| | 393 | 446 | 284 | 555 | 370 | 469 | 401 | 438 | 392 | 447 | 285 | 554 | 398 | 441 | 367 | 472 | 380 | 459 |
| | 400 | 439 | 287 | 552 | 286 | 553 | 399 | 440 | 379 | 460 | 381 | 458 | 288 | 551 | 291 | 548 | 391 | 448 |
| | 290 | 549 | 302 | 537 | 366 | 473 | 292 | 547 | 289 | 550 | 382 | 457 | 303 | 536 | 383 | 456 | 390 | 449 |
| | 365 | 474 | 304 | 535 | 363 | 476 | 300 | 539 | 293 | 546 | 305 | 534 | 301 | 538 | 299 | 540 | 389 | 450 |
| | 362 | 477 | 364 | 475 | 384 | 455 | 388 | 451 | 298 | 541 | 386 | 453 | 361 | 478 | 387 | 452 | 385 | 454 |
| | 294 | 545 | 360 | 479 | 297 | 542 | 295 | 544 | 296 | 543 | 306 | 533 | 307 | 532 | 308 | 531 | 309 | 530 |
| | 359 | 480 | 358 | 481 | 310 | 529 | 357 | 482 | 312 | 527 | 355 | 484 | 311 | 528 | 354 | 485 | 356 | 483 |
| | 313 | 526 | 314 | 525 | 353 | 486 | 352 | 487 | 343 | 496 | 344 | 495 | 351 | 488 | 342 | 497 | 328 | 511 |
| | 345 | 494 | 329 | 510 | 327 | 512 | 315 | 524 | 350 | 489 | 340 | 499 | 341 | 498 | 318 | 521 | 339 | 500 |
| | 316 | 523 | 326 | 513 | 346 | 493 | 338 | 501 | 331 | 508 | 317 | 522 | 319 | 520 | 332 | 507 | 337 | 502 |

TABLE 9-continued

| Logical index | Physical root index | | | | | | | | | | | | | | | | | |
|---|---|---|---|---|---|---|---|---|---|---|---|---|---|---|---|---|---|---|
| | 333 | 506 | 348 | 491 | 349 | 490 | 325 | 514 | 347 | 492 | 330 | 509 | 334 | 505 | 336 | 503 | 335 | 504 |
| | 321 | 518 | 324 | 515 | 320 | 519 | 322 | 517 | 323 | 516 | | | | | | | | |

TABLE 10

| Logical index | Physical root index | | | | | | | | | | | | | | | | | |
|---|---|---|---|---|---|---|---|---|---|---|---|---|---|---|---|---|---|---|
| 1~838 | 1 | 838 | 2 | 837 | 419 | 420 | 279 | 560 | 280 | 559 | 210 | 629 | 168 | 671 | 336 | 503 | 140 | 699 | 120 |
| | 719 | 240 | 599 | 105 | 734 | 93 | 746 | 373 | 466 | 84 | 755 | 229 | 610 | 305 | 534 | 70 | 769 | 129 | 710 |
| | 258 | 581 | 60 | 779 | 56 | 783 | 112 | 727 | 367 | 472 | 148 | 691 | 296 | 543 | 233 | 606 | 265 | 574 | 309 |
| | 530 | 42 | 797 | 40 | 799 | 80 | 759 | 267 | 572 | 73 | 766 | 146 | 693 | 35 | 804 | 235 | 604 | 302 | 537 |
| | 355 | 484 | 31 | 808 | 404 | 435 | 30 | 809 | 29 | 810 | 405 | 434 | 28 | 811 | 27 | 812 | 406 | 433 | 236 |
| | 603 | 178 | 661 | 356 | 483 | 74 | 765 | 24 | 815 | 48 | 791 | 303 | 536 | 68 | 771 | 136 | 703 | 287 | 552 |
| | 43 | 796 | 86 | 753 | 21 | 818 | 266 | 573 | 307 | 532 | 20 | 819 | 39 | 800 | 78 | 761 | 286 | 553 | 261 |
| | 578 | 317 | 522 | 383 | 456 | 125 | 714 | 357 | 482 | 402 | 437 | 137 | 702 | 274 | 565 | 151 | 688 | 181 | 658 |
| | 329 | 510 | 242 | 597 | 95 | 744 | 190 | 649 | 202 | 637 | 61 | 778 | 122 | 717 | 15 | 824 | 103 | 736 | 368 |
| | 471 | 217 | 622 | 128 | 711 | 256 | 583 | 14 | 825 | 55 | 784 | 110 | 729 | 203 | 636 | 253 | 586 | 293 | 546 |
| | 118 | 721 | 142 | 697 | 284 | 555 | 89 | 750 | 263 | 576 | 288 | 551 | 37 | 802 | 231 | 608 | 304 | 535 | 12 |
| | 827 | 130 | 709 | 260 | 579 | 268 | 571 | 23 | 816 | 46 | 793 | 34 | 805 | 179 | 660 | 358 | 481 | 276 | 563 |
| | 207 | 632 | 316 | 523 | 398 | 441 | 223 | 616 | 308 | 531 | 409 | 430 | 145 | 694 | 290 | 549 | 133 | 706 | 91 |
| | 748 | 374 | 465 | 10 | 829 | 227 | 612 | 306 | 533 | 400 | 439 | 135 | 704 | 270 | 569 | 143 | 696 | 66 | 773 |
| | 132 | 707 | 289 | 550 | 83 | 756 | 378 | 461 | 228 | 611 | 9 | 830 | 415 | 424 | 241 | 598 | 53 | 786 | 106 |
| | 733 | 201 | 638 | 173 | 666 | 346 | 493 | 351 | 488 | 161 | 678 | 339 | 500 | 344 | 495 | 108 | 731 | 216 | 623 |
| | 255 | 584 | 57 | 782 | 391 | 448 | 121 | 718 | 8 | 831 | 16 | 823 | 372 | 467 | 149 | 690 | 345 | 494 | 101 |
| | 738 | 254 | 585 | 331 | 508 | 389 | 450 | 257 | 582 | 325 | 514 | 412 | 427 | 245 | 594 | 297 | 542 | 184 | 655 |
| | 197 | 642 | 321 | 518 | 311 | 528 | 251 | 588 | 294 | 545 | 64 | 775 | 141 | 698 | 282 | 557 | 7 | 832 | 104 |
| | 735 | 208 | 631 | 392 | 447 | 191 | 648 | 382 | 457 | 318 | 521 | 47 | 792 | 396 | 443 | 273 | 566 | 218 | 621 |
| | 403 | 436 | 59 | 780 | 13 | 826 | 26 | 813 | 71 | 768 | 269 | 570 | 301 | 538 | 375 | 464 | 82 | 757 | 164 |
| | 675 | 144 | 695 | 87 | 752 | 174 | 665 | 401 | 438 | 49 | 790 | 98 | 741 | 152 | 687 | 169 | 670 | 338 | 501 |
| | 6 | 833 | 119 | 720 | 238 | 601 | 65 | 774 | 88 | 751 | 176 | 663 | 134 | 705 | 81 | 758 | 162 | 677 | 408 |
| | 431 | 234 | 605 | 371 | 468 | 17 | 822 | 107 | 732 | 366 | 473 | 330 | 509 | 50 | 789 | 100 | 739 | 138 | 701 |
| | 170 | 669 | 340 | 499 | 158 | 681 | 249 | 590 | 341 | 498 | 199 | 640 | 171 | 668 | 342 | 497 | 154 | 685 | 248 |
| | 591 | 343 | 496 | 215 | 624 | 99 | 740 | 370 | 469 | 347 | 492 | 175 | 664 | 350 | 489 | 353 | 486 | 239 | 600 |
| | 300 | 539 | 187 | 652 | 211 | 628 | 417 | 422 | 5 | 834 | 139 | 700 | 278 | 561 | 153 | 686 | 157 | 682 | 314 |
| | 525 | 200 | 639 | 97 | 742 | 194 | 645 | 352 | 487 | 163 | 676 | 326 | 513 | 348 | 491 | 237 | 602 | 365 | 474 |
| | 33 | 806 | 75 | 764 | 150 | 689 | 275 | 564 | 51 | 788 | 394 | 445 | 189 | 650 | 243 | 596 | 298 | 541 | 114 |
| | 725 | 195 | 644 | 322 | 517 | 212 | 627 | 166 | 673 | 332 | 507 | 299 | 540 | 182 | 657 | 364 | 475 | 393 | 446 |
| | 123 | 716 | 246 | 593 | 319 | 520 | 213 | 626 | 313 | 526 | 333 | 506 | 185 | 654 | 327 | 512 | 244 | 595 | 115 |
| | 724 | 362 | 477 | 250 | 589 | 156 | 683 | 312 | 527 | 172 | 667 | 96 | 743 | 192 | 647 | 54 | 785 | 62 | 777 |
| | 124 | 715 | 292 | 547 | 221 | 618 | 397 | 442 | 224 | 615 | 77 | 762 | 381 | 458 | 359 | 480 | 277 | 562 | 281 |
| | 558 | 4 | 835 | 167 | 672 | 334 | 505 | 186 | 653 | 193 | 646 | 323 | 516 | 247 | 592 | 160 | 679 | 320 | 519 |
| | 369 | 470 | 58 | 781 | 116 | 723 | 127 | 712 | 272 | 567 | 295 | 544 | 225 | 614 | 205 | 634 | 410 | 429 | 291 |
| | 548 | 79 | 760 | 380 | 459 | 206 | 633 | 220 | 619 | 399 | 440 | 271 | 568 | 85 | 754 | 377 | 462 | 92 | 747 |
| | 11 | 828 | 414 | 425 | 259 | 580 | 69 | 770 | 385 | 454 | 264 | 575 | 18 | 821 | 36 | 803 | 147 | 692 | 25 |
| | 814 | 407 | 432 | 32 | 807 | 177 | 662 | 354 | 485 | 349 | 490 | 165 | 674 | 337 | 502 | 416 | 423 | 94 | 745 |
| | 188 | 651 | 52 | 787 | 183 | 656 | 328 | 511 | 196 | 643 | 113 | 726 | 363 | 476 | 324 | 515 | 214 | 625 | 411 |
| | 428 | 159 | 680 | 155 | 684 | 310 | 529 | 198 | 641 | 117 | 722 | 361 | 478 | 283 | 556 | 63 | 776 | 388 | 451 |
| | 109 | 730 | 102 | 737 | 204 | 635 | 390 | 449 | 111 | 728 | 222 | 617 | 413 | 426 | 230 | 609 | 379 | 460 | 384 |
| | 455 | 45 | 794 | 90 | 749 | 285 | 554 | 67 | 772 | 386 | 453 | 232 | 607 | 19 | 820 | 38 | 801 | 41 | 798 |
| | 22 | 817 | 44 | 795 | 72 | 767 | 131 | 708 | 262 | 577 | 376 | 463 | 226 | 613 | 387 | 452 | 219 | 620 | 126 |
| | 713 | 252 | 587 | 395 | 444 | 180 | 659 | 360 | 479 | 76 | 763 | 209 | 630 | 315 | 524 | 335 | 504 | 3 | 836 |
| | 418 | 421 | | | | | | | | | | | | | | | | | |

TABLE 11

| No | $N_{CS}$ | Logical index | Physical root index | | | | | | | | | | | | | | | | |
|---|---|---|---|---|---|---|---|---|---|---|---|---|---|---|---|---|---|---|---|
| 0 | 13 | 1~36 | 1 | 838 | 2 | 837 | 70 | 769 | 93 | 746 | 105 | 734 | 84 | 755 | 168 | 671 | 210 | 629 | 120 |
| | | | 719 | 140 | 699 | 229 | 610 | 240 | 599 | 419 | 420 | 279 | 560 | 280 | 559 | 373 | 466 | 305 | 534 |
| | | | 336 | 503 | | | | | | | | | | | | | | | |
| 1 | 26 | 37~76 | 35 | 804 | 40 | 799 | 42 | 797 | 56 | 783 | 60 | 779 | 73 | 766 | 80 | 759 | 112 | 727 | 146 |
| | | | 693 | 148 | 691 | 129 | 710 | 235 | 604 | 233 | 606 | 258 | 581 | 265 | 574 | 267 | 572 | 367 | 472 |
| | | | 302 | 537 | 296 | 543 | 309 | 530 | | | | | | | | | | | |
| 2 | 38 | 77~112 | 24 | 815 | 29 | 810 | 27 | 812 | 30 | 809 | 28 | 811 | 31 | 808 | 48 | 791 | 68 | 771 | 74 |
| | | | 765 | 178 | 661 | 136 | 703 | 236 | 603 | 406 | 433 | 404 | 435 | 405 | 434 | 303 | 536 | 355 | 484 |
| | | | 356 | 483 | | | | | | | | | | | | | | | |
| 3 | 52 | 113~154 | 21 | 818 | 20 | 819 | 39 | 800 | 43 | 796 | 78 | 761 | 86 | 753 | 181 | 658 | 137 | 702 | 125 |
| | | | 714 | 151 | 688 | 261 | 578 | 274 | 565 | 266 | 573 | 402 | 437 | 287 | 552 | 286 | 553 | 383 | |
| | | | 456 | 307 | 532 | 357 | 482 | 329 | 510 | 317 | 522 | | | | | | | | | |

TABLE 11-continued

| No | $N_{CS}$ | Logical index | Physical root index | | | | | | | | | | | | | | | |
|----|----------|---------------|------|-----|-----|-----|-----|-----|-----|-----|-----|-----|-----|-----|-----|-----|-----|-----|-----|
| 4 | 64 | 155~190 | 14 | 825 | 15 | 824 | 55 | 784 | 61 | 778 | 103 | 736 | 95 | 744 | 110 | 729 | 202 | 637 | 203 |
|   |    |         | 636 | 190 | 649 | 122 | 717 | 128 | 711 | 217 | 622 | 256 | 583 | 242 | 597 | 253 | 586 | 368 | |
|   |    |         | 471 | 293 | 546 | | | | | | | | | | | | | | |
| 5 | 76 | 191~226 | 12 | 827 | 23 | 816 | 34 | 805 | 37 | 802 | 46 | 793 | 89 | 750 | 118 | 721 | 179 | 660 | 142 |
|   |    |         | 697 | 130 | 709 | 231 | 608 | 260 | 579 | 263 | 576 | 268 | 571 | 284 | 555 | 288 | 551 | 304 | |
|   |    |         | 535 | 358 | 481 | | | | | | | | | | | | | | |
| 6 | 83 | 227~246 | 207 | 632 | 145 | 694 | 133 | 706 | 223 | 616 | 276 | 563 | 409 | 430 | 398 | 441 | 290 | 549 | |
|   |    |         | 308 | 531 | 316 | 523 | | | | | | | | | | | | | |
| 7 | 104 | 247~310 | 9 | 830 | 10 | 829 | 53 | 786 | 66 | 773 | 57 | 782 | 91 | 748 | 83 | 756 | 106 | 733 | 108 |
|   |    |         | 731 | 173 | 666 | 201 | 638 | 161 | 678 | 135 | 704 | 143 | 696 | 132 | 707 | 216 | 623 | 227 | 612 |
|   |    |         | 228 | 611 | 241 | 598 | 270 | 569 | 255 | 584 | 415 | 424 | 374 | 465 | 378 | 461 | 400 | 439 | |
|   |    |         | 391 | 448 | 289 | 550 | 306 | 533 | 344 | 495 | 351 | 488 | 339 | 500 | 346 | 493 | | | |
| 8 | 119 | 311~354 | 8 | 831 | 16 | 823 | 64 | 775 | 101 | 738 | 184 | 655 | 197 | 642 | 121 | 718 | 149 | 690 | 257 |
|   |    |         | 582 | 254 | 585 | 245 | 594 | 251 | 588 | 412 | 427 | 372 | 467 | 389 | 450 | 294 | 545 | 297 | |
|   |    |         | 542 | 311 | 528 | 345 | 494 | 331 | 508 | 325 | 514 | 321 | 518 | | | | | | |
| 9 | 139 | 355~414 | 7 | 832 | 13 | 826 | 26 | 813 | 49 | 790 | 47 | 792 | 59 | 780 | 71 | 768 | 104 | 735 | 98 |
|   |    |         | 741 | 82 | 757 | 87 | 752 | 174 | 665 | 164 | 675 | 208 | 631 | 191 | 648 | 141 | 698 | 144 | 695 |
|   |    |         | 152 | 687 | 218 | 621 | 269 | 570 | 273 | 566 | 282 | 557 | 403 | 436 | 375 | 464 | 396 | 443 | 401 |
|   |    |         | 438 | 392 | 447 | 382 | 457 | 301 | 538 | 318 | 521 | | | | | | | | |
| 10 | 167 | 415~498 | 6 | 833 | 17 | 822 | 50 | 789 | 65 | 774 | 99 | 740 | 100 | 739 | 81 | 758 | 107 | 732 | 88 |
|   |    |         | 751 | 169 | 670 | 170 | 669 | 171 | 668 | 175 | 664 | 187 | 652 | 158 | 681 | 119 | 720 | 176 | 663 |
|   |    |         | 162 | 677 | 199 | 640 | 154 | 685 | 138 | 701 | 134 | 705 | 215 | 624 | 234 | 605 | 238 | 601 | |
|   |    |         | 239 | 600 | 249 | 590 | 248 | 591 | 408 | 431 | 371 | 468 | 370 | 469 | 366 | 473 | 300 | 539 | |
|   |    |         | 353 | 486 | 343 | 496 | 342 | 497 | 350 | 489 | 340 | 499 | 341 | 498 | 338 | 501 | 347 | 492 | |
|   |    |         | 330 | 509 | | | | | | | | | | | | | | | |
| 11 | 209 | 499~624 | 5 | 834 | 33 | 806 | 51 | 788 | 54 | 785 | 62 | 777 | 75 | 764 | 77 | 762 | 96 | 743 | 97 |
|   |    |         | 742 | 166 | 673 | 172 | 667 | 163 | 676 | 185 | 654 | 200 | 639 | 114 | 725 | 189 | 650 | 115 | 724 |
|   |    |         | 194 | 645 | 195 | 644 | 192 | 647 | 182 | 657 | 157 | 682 | 156 | 683 | 211 | 628 | 124 | 715 | |
|   |    |         | 123 | 716 | 139 | 700 | 212 | 627 | 153 | 686 | 213 | 626 | 150 | 689 | 221 | 618 | 224 | 615 | |
|   |    |         | 237 | 602 | 244 | 595 | 243 | 596 | 275 | 564 | 278 | 561 | 250 | 589 | 246 | 593 | 417 | 422 | |
|   |    |         | 394 | 445 | 397 | 442 | 393 | 446 | 381 | 458 | 292 | 547 | 365 | 474 | 299 | 540 | 362 | 477 | |
|   |    |         | 364 | 475 | 298 | 541 | 359 | 480 | 312 | 527 | 313 | 526 | 314 | 525 | 352 | 487 | 327 | 512 | |
|   |    |         | 326 | 513 | 319 | 520 | 332 | 507 | 333 | 506 | 348 | 491 | 322 | 517 | | | | | |
| 12 | 279 | 625~838 | 3 | 836 | 4 | 835 | 11 | 828 | 19 | 820 | 18 | 821 | 22 | 817 | 25 | 814 | 32 | 807 | 36 |
|   |    |         | 803 | 41 | 798 | 38 | 801 | 44 | 795 | 52 | 787 | 45 | 794 | 63 | 776 | 69 | 770 | 67 | 772 |
|   |    |         | 58 | 781 | 72 | 767 | 76 | 763 | 94 | 745 | 92 | 747 | 102 | 737 | 90 | 749 | 85 | 754 | 79 |
|   |    |         | 760 | 167 | 672 | 109 | 730 | 165 | 674 | 111 | 728 | 186 | 653 | 209 | 630 | 160 | 679 | 116 | 723 |
|   |    |         | 206 | 633 | 204 | 635 | 117 | 722 | 188 | 651 | 159 | 680 | 205 | 634 | 198 | 641 | 113 | 726 | 193 |
|   |    |         | 646 | 183 | 656 | 180 | 659 | 177 | 662 | 196 | 643 | 155 | 684 | 214 | 625 | 126 | 713 | 147 | 692 |
|   |    |         | 127 | 712 | 131 | 708 | 219 | 620 | 220 | 619 | 222 | 617 | 226 | 613 | 225 | 614 | 230 | 609 | |
|   |    |         | 232 | 607 | 262 | 577 | 259 | 580 | 264 | 575 | 272 | 567 | 271 | 568 | 277 | 562 | 252 | 587 | |
|   |    |         | 418 | 421 | 416 | 423 | 247 | 592 | 413 | 426 | 414 | 425 | 411 | 428 | 281 | 558 | 376 | 463 | |
|   |    |         | 407 | 432 | 410 | 429 | 377 | 462 | 395 | 444 | 283 | 556 | 369 | 470 | 285 | 554 | 380 | 459 | |
|   |    |         | 399 | 440 | 379 | 460 | 291 | 548 | 390 | 449 | 363 | 476 | 384 | 455 | 388 | 451 | 386 | 453 | |
|   |    |         | 361 | 478 | 387 | 452 | 385 | 454 | 360 | 479 | 295 | 544 | 310 | 529 | 354 | 485 | 328 | 511 | |
|   |    |         | 315 | 524 | 337 | 502 | 349 | 490 | 334 | 505 | 335 | 504 | 324 | 515 | 320 | 519 | 323 | 516 | |

<Supportable Cell Size Ordering and CM Classification>

Figure 21:
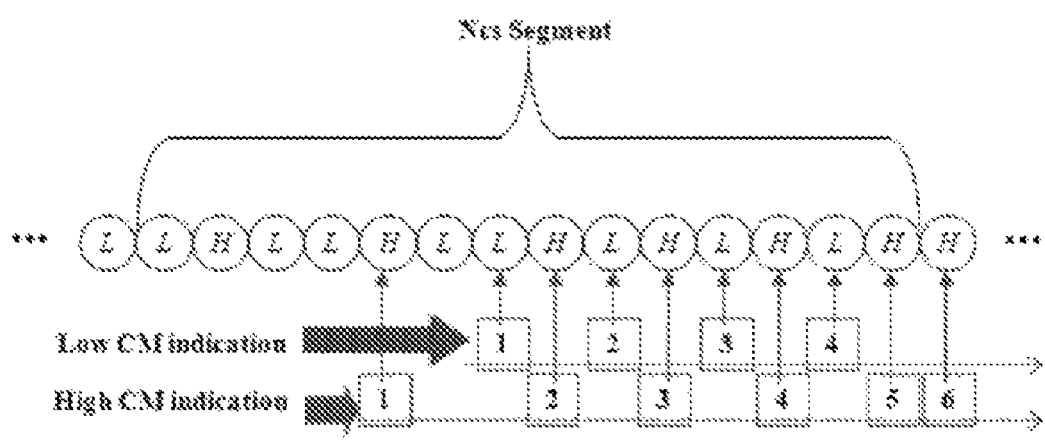
FIG. 21 is a view illustrating a method of searching logical root indexes according to CM characteristics according to one exemplary embodiment of the present invention.
Figure 22:
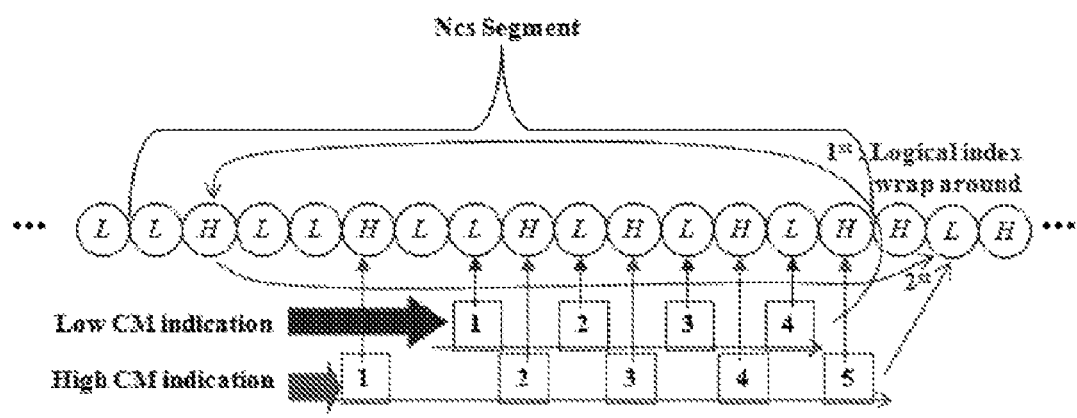
FIG. 22 is a view illustrating a method of searching logical root indexes according to CM characteristics according to another exemplary embodiment of the present invention.
Figure 23:
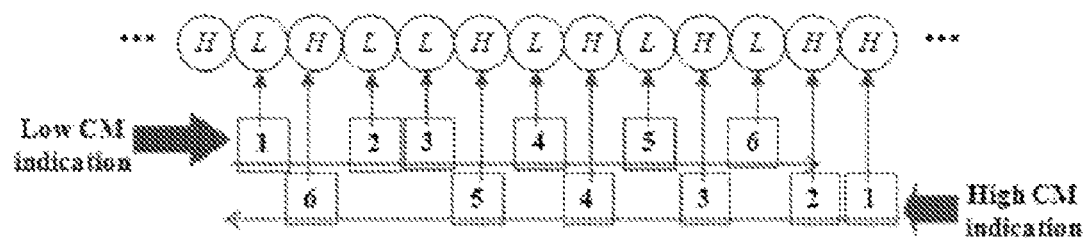
FIG. 23 is a view illustrating a method of searching logical root indexes according to CM characteristics according to still another exemplary embodiment of the present invention.

FIG. 21 is a view illustrating a method of searching logical root indexes according to the CM characteristics according to one exemplary embodiment of the present invention. FIG. 22 is a view illustrating a method of searching logical root indexes according to the CM characteristics according to another exemplary embodiment of the present invention. FIG. 23 is a view illustrating a method of searching logical root indexes according to the CM characteristics according to still another exemplary embodiment of the present invention.

Referring to FIGS. 21 to 23, the physical indexes are first ordered according to a supportable cell size. Thereafter, a method of using available indexes in each cell vary according to characteristics of a single transmitted index. Allocation of logical indexes may be formed according to one logical index+Ncs. It can be performed by the following two methods.

In one method, each cell uses only a single sequence class (See FIG. 20). It is divided into a low CM index and a high CM index.

If a transmitted logical index has CM characteristics which are lower than or the same as the QPSK CM (1.2 dB) of the SC-FDMA, the closest adjacent logical indexes having the CM characteristics which are lower than or the same as the QPSK CM of the SC-FDMA are searched and used in sequence. If a transmitted logical index has CM characteristics which are higher than the QPSK CM of the SC-FDMA, the closest adjacent logical indexes having the CM characteristics which are higher than the QPSK CM of the SC-FDMA are searched and used in sequence.

In another method, a single cell may use either sequence class (lower CM or higher CM) (See FIGS. 20 and 21). It is divided into a lower CM index, a higher CM index and a mixed CM index.

If a transmitted logical index has CM characteristics which are lower than or the same as the QPSK CM (1.2 dB) of the SC-FDMA, the closest adjacent logical indexes having the CM characteristics which are lower than or the same as the QPSK CM of the SC-FDMA are searched and used in sequence. In this case, when it reaches the end of an Ncs segment, the index is reset as an index having a first higher CM of a next Ncs segment. If a transmitted logical index has CM characteristics which are higher than the QPSK CM (1.2 dB) of the SC-FDMA, the closest adjacent logical indexes having the CM characteristics which are higher than the QPSK CM of the SC-FDMA are searched and used in sequence. In this case, if it reaches the end of an Ncs segment, the index is reset as an index having a first lower CM of a next Ncs segment.

The directions (+/−, direction in which indexes are increased/decreased) for searching indexes having the same characteristics may be the same or different. The direction for searching indexes does not affect the proposed technique, like the ordering direction (ascent/descent) of indexes as mentioned above.

Figure 24:
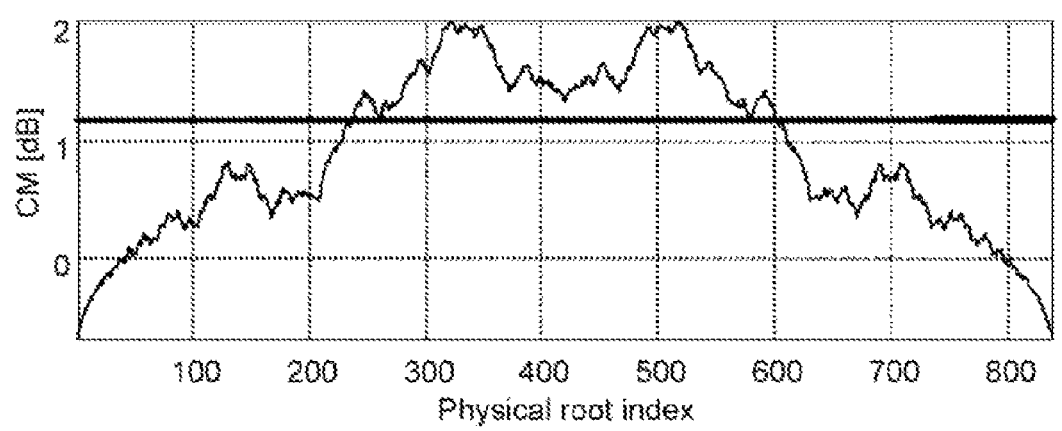
FIG. 24 is a graph showing CM characteristics according to physical root indexes according to one exemplary embodiment of the present invention.

FIG. 24 is a graph showing CM characteristics according to physical root indexes according to one exemplary embodiment of the present invention.

Referring to FIG. 24, the sequence class may be defined according to physical indexes. The physical root indexes may be classified by setting a CM classification threshold value. The classification of the physical root indexes may be simply performed by checking whether or not a selected physical index belongs to a high CM region or a low CM region. For example, it can be noted that, if a CM classification threshold value is 1.2 dB, a high CM region may be determined as [238, $N_{ZC}-238$]. The use of such method allows generation of indexes through a simple numerical formula to order the indexes (or index mapping) without the necessity of a complicated table.

Mapping to a physical index $u_{phy}(u_{log})$ in response to a logical index $u_{log}$ based on the maximum supportable cell size (or Ncs) can be expressed as shown $$u_{phy}(6 \cdot (i-1) + 2 \cdot j - 1) = \quad \text{[Equation 6]}$$

$$\begin{cases} u'(\alpha_{i,j}), & j=1,2,3, \quad i=1,2,\ldots,139 \\ u'(\alpha_{i,j+1}), & j=1,2, \quad i=140 \end{cases}$$

$$u_{phy}(2 \cdot i) = N_{ZC} - u_{phy}(2 \cdot i - 1), \quad i=1,2,\ldots,(N_{ZC}-1)/2$$

where $\alpha_{i,1}=(N_{ZC}+1)$, $\alpha_{i,2}=2i-1$, $\alpha_{i,3}=2i$ and $u'(r)=(-1/r) \mod N_{ZC}$.

One example of selecting an adjacent available index when a plurality of indexes are used in a cell can be expressed as shown $$u = \begin{cases} u_{phy}(u_{\log}++), & \text{if } I_t < u_{phy}(u_{\log}++) < N - I_t \\ & \text{and } I_t < u_{phy}(u_{\log}) < N - I_t \\ u_{phy}(u_{\log}++), & \text{if } \begin{bmatrix} u_{phy}(u_{\log}++) \leq I_t \text{ or} \\ u_{phy}(u_{\log}++) \geq N - I_t \end{bmatrix} \\ & \text{and } [u_{phy}(u_{\log}) \leq I_t \text{ or } u_{phy}(u_{\log}) \geq I_t] \end{cases} \quad \text{[Equation 7]}$$

where, $u_{log}$++ indicates the next logical indexes (e.g., $u_{log}$+1, $u_{log}$+2, $u_{log}$+3, . . . ) associated with $u_{log}$ and $I_t=238$. In this case, all the indexes are searched in a positive (+) direction (namely, in a direction that indexes increase). If a mixed CM index is not allowed, a searching procedure is simple. When a low CM sequence reaches a boundary of $N_{ZC}-1$ through the $u_{log}$++ procedure, it is set with a first logical index of $u_{log}$++. If, however, the mixed CM index is allowed, some conditions are necessary. If $u_{log}$++ reaches a boundary of an Ncs sequence, it is reset with a first logical index in a $u_{log}$++ Ncs segment. If $u_{log}$++ reaches a boundary of the Ncs segment in the $u_{log}$++ process for a higher CM, $u_{log}$++ is reset with a first logical index of a next Ncs segment. In this case, as for the CM characteristics when $u_{log}$++ is reset, if the mixed CM index is not allowed, $u_{log}$++ can be reset with a first index having the same characteristics as those of a transmitted index, and if the mixed CM index is allowed, $u_{log}$++ can be reset with a higher CM or a lower CM which has been previously determined according to the characteristics of a transmitted index.

Another example of selecting an adjacent available index when a plurality of indexes are used in a cell can be expressed as shown $$u = \begin{cases} u_{phy}(u_{\log}--), & \text{if } I_t < u_{phy}(u_{\log}--) < N - I_t \\ & \text{and } I_t < u_{phy}(u_{\log}) < N - I_t \\ u_{phy}(u_{\log}++), & \text{if } \begin{bmatrix} u_{phy}(u_{\log}++) \leq I_t \text{ or} \\ u_{phy}(u_{\log}++) \geq N - I_t \end{bmatrix} \\ & \text{and } [u_{phy}(u_{\log}) \leq I_t \text{ or } u_{phy}(u_{\log}) \geq I_t] \end{cases} \quad \text{[Equation 8]}$$

where, $u_{log}$++ indicates the next logical indexes (e.g., $u_{log}$+1, $u_{log}$+2, $u_{log}$+3, . . . ) associated with $u_{log}$ and $I_t=238$. In this case, indexes are searched in positive (+) and negative (−) directions (namely, in a direction that indexes increase or decrease).

If it is difficult to express the ordering of indexes in numerical formula, each base station and each user equipment should have a large ordering table of 838*10 bits (1~838)=8,380 bits. However, if Equation 6 is given, each base station and each user equipment can use the maximum supportable cell size ordering without such an ordering table. Table 12 shows mapping from physical indexes to logical indexes based on the maximum supportable cell size using Equation 6.

TABLE 12

| No | Logical index | Physical root index | | | | | | | | | | | | | | | | | |
|---|---|---|---|---|---|---|---|---|---|---|---|---|---|---|---|---|---|---|---|
| 0 | 1~50 | 2 | 837 | 838 | 1 | 419 | 420 | 560 | 279 | 559 | 280 | 269 | 210 | 336 | 503 | 671 | 168 | 699 | 140 |
| | | 240 | 599 | 719 | 120 | 734 | 105 | 746 | 93 | 466 | 373 | 755 | 84 | 229 | 610 | 305 | 534 | 769 | 70 |
| | | 581 | 258 | 129 | 710 | 779 | 60 | 112 | 727 | 783 | 56 | 367 | 472 | 543 | 296 | | | | |
| 1 | 51~100 | 148 | 691 | 233 | 606 | 530 | 309 | 574 | 265 | 797 | 42 | 80 | 759 | 799 | 40 | 572 | 267 | 146 | 693 |
| | | 766 | 73 | 804 | 35 | 235 | 604 | 302 | 537 | 484 | 355 | 808 | 31 | 435 | 404 | 809 | 30 | 29 | 810 |
| | | 405 | 434 | 811 | 28 | 812 | 27 | 433 | 406 | 603 | 236 | 356 | 483 | 661 | 178 | | | | |
| 2 | 101~150 | 74 | 765 | 48 | 791 | 815 | 24 | 536 | 303 | 703 | 136 | 68 | 771 | 287 | 552 | 753 | 86 | 43 | 796 |
| | | 818 | 21 | 307 | 532 | 266 | 573 | 819 | 20 | 761 | 78 | 39 | 800 | 286 | 553 | 317 | 522 | 261 | 578 |
| | | 383 | 456 | 125 | 714 | 357 | 482 | 402 | 437 | 274 | 565 | 702 | 137 | 151 | 688 | | | | |
| 3 | 151~200 | 181 | 658 | 329 | 510 | 242 | 597 | 190 | 649 | 744 | 95 | 637 | 202 | 717 | 122 | 61 | 778 | 824 | 15 |
| | | 736 | 103 | 471 | 368 | 622 | 217 | 256 | 583 | 711 | 128 | 825 | 14 | 729 | 110 | 55 | 784 | 636 | 203 |
| | | 586 | 253 | 546 | 293 | 721 | 118 | 284 | 555 | 697 | 142 | 750 | 89 | 263 | 576 | | | | |
| 4 | 201~250 | 288 | 551 | 37 | 802 | 608 | 231 | 535 | 304 | 827 | 12 | 260 | 579 | 709 | 130 | 268 | 571 | 46 | 793 |
| | | 816 | 23 | 34 | 805 | 358 | 481 | 660 | 179 | 563 | 276 | 632 | 207 | 523 | 316 | 441 | 398 | 616 | 223 |
| | | 531 | 308 | 409 | 430 | 549 | 290 | 145 | 694 | 133 | 706 | 91 | 748 | 374 | 465 | | | | |

TABLE 12-continued

| No | Logical index | Physical root index | | | | | | | | | | | | | | | | | |
|---|---|---|---|---|---|---|---|---|---|---|---|---|---|---|---|---|---|---|---|
| 5 | 251~300 | 829 | 10 | 612 | 227 | 533 | 306 | 439 | 400 | 569 | 270 | 135 | 704 | 143 | 696 | 132 | 707 | 773 | 66 |
| | | 550 | 289 | 83 | 756 | 378 | 461 | 611 | 228 | 830 | 9 | 424 | 415 | 598 | 241 | 106 | 733 | 786 | 53 |
| | | 201 | 638 | 346 | 493 | 666 | 173 | 351 | 488 | 678 | 161 | 500 | 339 | 495 | 344 | | | | |
| 6 | 301~350 | 216 | 623 | 731 | 108 | 584 | 255 | 782 | 57 | 448 | 391 | 121 | 718 | 16 | 823 | 831 | 8 | 372 | 467 |
| | | 149 | 690 | 345 | 494 | 738 | 101 | 331 | 508 | 254 | 585 | 450 | 389 | 514 | 325 | 582 | 257 | 412 | 427 |
| | | 594 | 245 | 542 | 297 | 655 | 184 | 197 | 642 | 321 | 518 | 311 | 528 | 251 | 588 | | | | |
| 7 | 351~400 | 294 | 545 | 775 | 64 | 557 | 282 | 141 | 698 | 832 | 7 | 631 | 208 | 104 | 735 | 447 | 392 | 382 | 457 |
| | | 648 | 191 | 318 | 521 | 47 | 792 | 396 | 443 | 273 | 566 | 403 | 436 | 218 | 621 | 780 | 59 | 813 | 26 |
| | | 13 | 826 | 768 | 71 | 538 | 301 | 570 | 269 | 375 | 464 | 675 | 164 | 82 | 757 | | | | |
| 8 | 401~450 | 144 | 695 | 665 | 174 | 87 | 752 | 438 | 401 | 98 | 741 | 790 | 49 | 687 | 152 | 501 | 338 | 169 | 670 |
| | | 833 | 6 | 601 | 238 | 119 | 720 | 774 | 65 | 663 | 176 | 88 | 751 | 134 | 705 | 677 | 162 | 81 | 758 |
| | | 408 | 431 | 371 | 468 | 234 | 605 | 17 | 822 | 107 | 732 | 366 | 473 | 330 | 509 | | | | |
| 9 | 451~500 | 739 | 100 | 50 | 789 | 701 | 138 | 340 | 499 | 669 | 170 | 681 | 158 | 498 | 341 | 590 | 249 | 640 | 199 |
| | | 497 | 342 | 171 | 668 | 685 | 154 | 343 | 496 | 248 | 591 | 624 | 215 | 740 | 99 | 469 | 370 | 492 | 347 |
| | | 489 | 350 | 175 | 664 | 486 | 353 | 239 | 600 | 300 | 539 | 187 | 652 | 417 | 422 | | | | |
| 10 | 501~550 | 211 | 628 | 834 | 5 | 561 | 278 | 139 | 700 | 686 | 153 | 525 | 314 | 157 | 682 | 639 | 200 | 194 | 645 |
| | | 742 | 97 | 487 | 352 | 513 | 326 | 163 | 676 | 491 | 348 | 365 | 474 | 237 | 602 | 806 | 33 | 150 | 689 |
| | | 764 | 75 | 275 | 564 | 51 | 788 | 394 | 445 | 189 | 650 | 243 | 596 | 298 | 541 | | | | |
| 11 | 551~600 | 725 | 114 | 644 | 195 | 517 | 322 | 212 | 627 | 507 | 332 | 166 | 673 | 299 | 540 | 475 | 364 | 182 | 657 |
| | | 393 | 446 | 246 | 593 | 716 | 123 | 520 | 319 | 626 | 213 | 526 | 313 | 333 | 506 | 654 | 185 | 512 | 327 |
| | | 595 | 244 | 115 | 724 | 362 | 477 | 250 | 589 | 312 | 527 | 683 | 156 | 667 | 172 | | | | |
| 12 | 601~650 | 647 | 192 | 96 | 743 | 785 | 54 | 124 | 715 | 777 | 62 | 292 | 547 | 397 | 442 | 221 | 618 | 224 | 615 |
| | | 762 | 77 | 458 | 381 | 480 | 359 | 277 | 562 | 281 | 558 | 835 | 4 | 505 | 334 | 167 | 672 | 186 | 653 |
| | | 646 | 193 | 516 | 323 | 592 | 247 | 320 | 519 | 679 | 160 | 369 | 470 | 116 | 723 | | | | |
| 13 | 651~700 | 781 | 58 | 127 | 712 | 295 | 544 | 272 | 567 | 225 | 614 | 429 | 410 | 205 | 634 | 291 | 548 | 760 | 79 |
| | | 459 | 380 | 206 | 633 | 399 | 440 | 220 | 619 | 271 | 568 | 754 | 85 | 462 | 377 | 747 | 92 | 11 | 828 |
| | | 414 | 425 | 580 | 259 | 770 | 69 | 454 | 385 | 575 | 264 | 803 | 36 | 18 | 821 | | | | |
| 14 | 701~750 | 147 | 692 | 25 | 814 | 407 | 432 | 807 | 32 | 485 | 354 | 177 | 662 | 490 | 349 | 165 | 674 | 337 | 502 |
| | | 416 | 423 | 188 | 651 | 745 | 94 | 52 | 787 | 183 | 656 | 328 | 511 | 643 | 196 | 726 | 113 | 476 | 363 |
| | | 324 | 515 | 428 | 411 | 625 | 214 | 159 | 680 | 310 | 529 | 684 | 155 | 198 | 641 | | | | |
| 15 | 751~800 | 117 | 722 | 361 | 478 | 556 | 283 | 776 | 63 | 451 | 388 | 109 | 730 | 204 | 635 | 737 | 102 | 390 | 449 |
| | | 222 | 617 | 728 | 111 | 426 | 413 | 460 | 379 | 609 | 230 | 384 | 455 | 749 | 90 | 45 | 794 | 285 | 554 |
| | | 67 | 772 | 386 | 453 | 607 | 232 | 38 | 801 | 820 | 19 | 41 | 798 | 44 | 795 | | | | |
| 16 | 801~838 | 817 | 22 | 72 | 767 | 262 | 577 | 708 | 131 | 463 | 376 | 387 | 452 | 226 | 613 | 219 | 620 | 587 | 252 |
| | | 126 | 713 | 395 | 444 | 479 | 360 | 180 | 659 | 763 | 76 | 209 | 630 | 315 | 524 | 504 | 335 | 421 | 418 |
| | | 836 | 3 | | | | | | | | | | | | | | | | |

In all the exemplary embodiments as described above, when indexes are ordered based on certain characteristics, the order of values having the same characteristics does not affect the order of ordering. Also, the order of pair indexes does not affect the order of ordering. In the ordering (mapping) method according to all the exemplary embodiments, as the indexes increase, they are ordered in an ascending order that the CM or the maximum supportable cell size increases, but it is merely an example. That is, as the indexes increase, they may be ordered in the ascending order that the CM or the maximum supportable cell size is increased or in a descending order that the CM or the maximum supportable cell size is decreased in each group. In addition, the indexes may be ordered in the shape of a mountaintop (^) or in the shape of a mountain valley (v). And, the directionality of the CM or the maximum supportable cell size can be determined to be different in each group.

Figure 25:
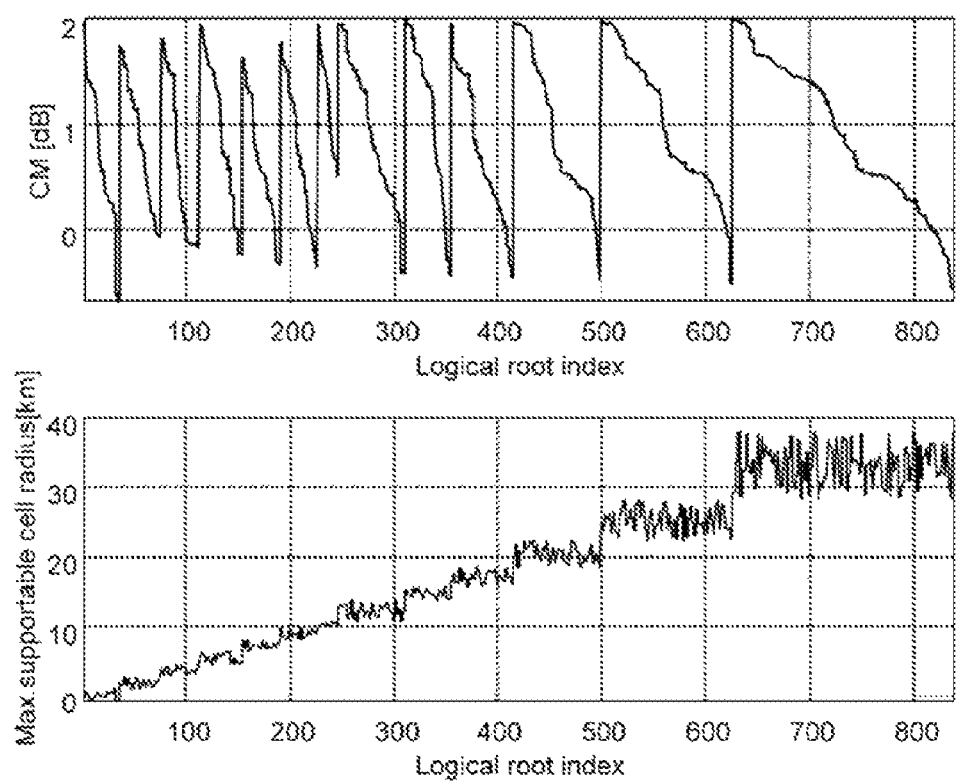
FIG. 25 is a graph showing CM characteristics and maximum supportable cell radius characteristics according to logical root indexes according to another exemplary embodiment of the present invention.
Figure 26:
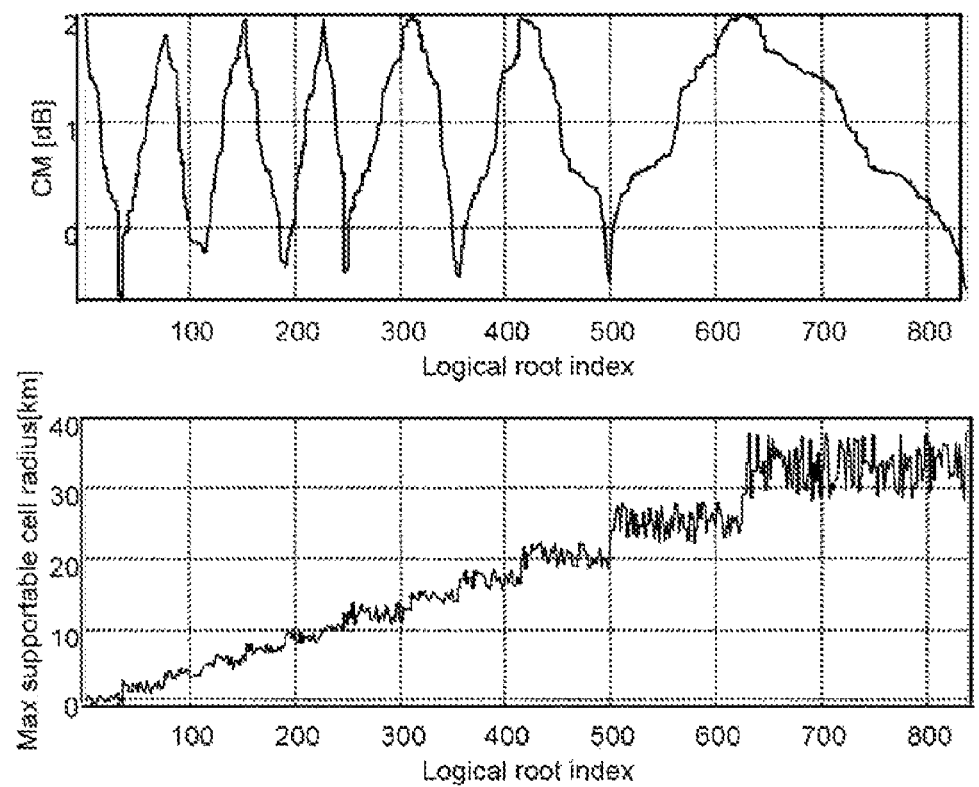
FIG. 26 is a graph showing CM characteristics and maximum supportable cell radius characteristics according to logical root indexes according to another exemplary embodiment of the present invention.

FIG. 25 is a graph showing CM characteristics and maximum supportable cell radius characteristics according to logical root indexes according to another exemplary embodiment of the present invention. As the logical indexes increase, they may be ordered in the ascending order that the maximum supportable cell size increases and in the descending order that the CM decreases. FIG. 26 is a graph showing the CM characteristics and the maximum supportable cell radius characteristics according to logical root indexes according to another exemplary embodiment of the present invention. Respective CM groups have been grouped based on the cyclic shift parameter Ncs. As the logical indexes increase, they are ordered in the ascending order that the maximum supportable cell radius size increases, in the descending order that the odd number groups of the CM decrease, and in the ascending order that the even number groups of the CM increase.

Referring to FIGS. 25 and 26, the directionality of the CM or the maximum supportable cell size may be determined to be different in each group. After the indexes are ordered in the ascending order that the maximum supportable cell size increases, when the indexes are ordered in the descending order that the CM decreases, the results appear as shown in FIG. 25. When the odd number groups are ordered in the descending order that the CM decreases and the even number groups are ordered in the ascending order that the CM increases, the results appear as shown in FIG. 26. By making the ordering in adjacent (consecutive) groups different, a larger number of adjacent (consecutive) indexes having low CM can be used in a low mobility cell regardless of the maximum supportable cell radius.

In all the exemplary embodiments as described above, if a single index is allocated in each cell in the ordering (mapping) method, each user equipment may use indexes by adding 1 to or subtracting 1 from a transmitted index, namely, by increasing or decreasing 1 at a time as necessary in order to meet the required number of random access preambles per cell. In case of using indexes by adding 1 at a time, when the largest index 838 is used, it may return to the smallest index 1 to use it. In case of using indexes by subtracting 1 at a time, when the smallest index 1 is used, it may return to the largest index 838 to use it. In addition, the ascending direction (+/−) may be used differently according to each characteristics (e.g., a lower CM/a higher CM). When the indexes are ordered in the ascending direction that the maximum supportable cell size increases as the indexes increase, because available indexes are limited in a large cell, it would be preferred to allocate indexes starting from a large cell. In this case, the simplest method of cell planning is to allocate the largest index to the largest cell and then use indexes by stages by subtracting 1 at a time.

Embodiment of Hybrid Ordering

Figure 27:
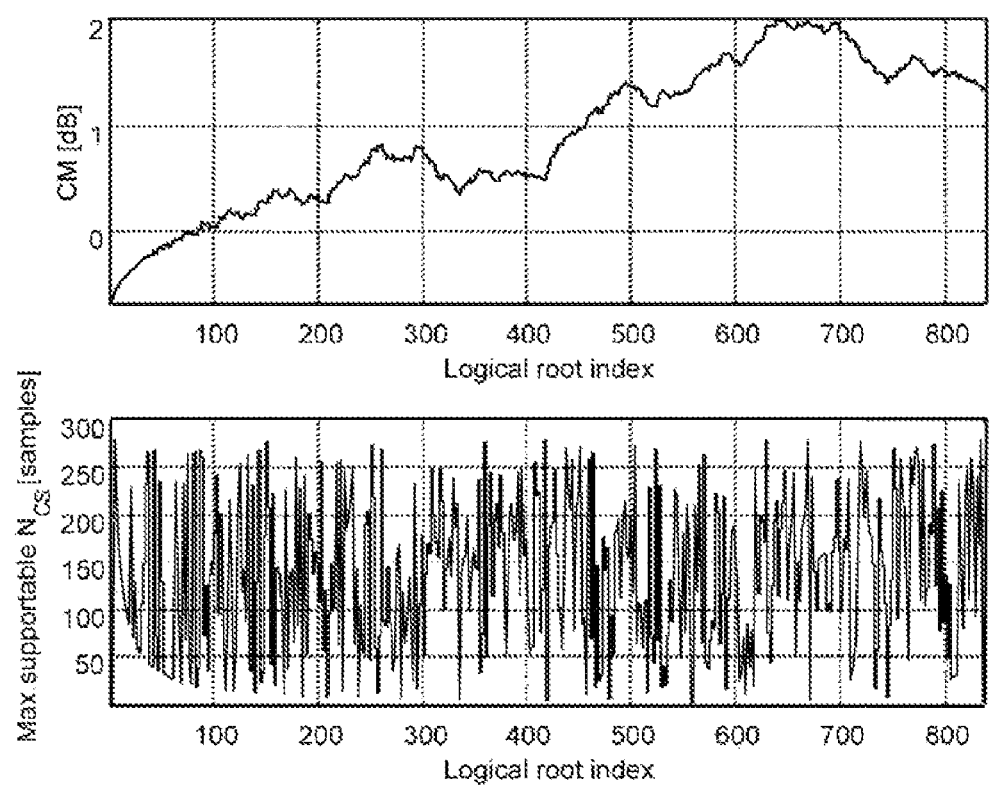
FIG. 27 is a graph showing a process of grouping CM ordering into two groups.
Figure 28:
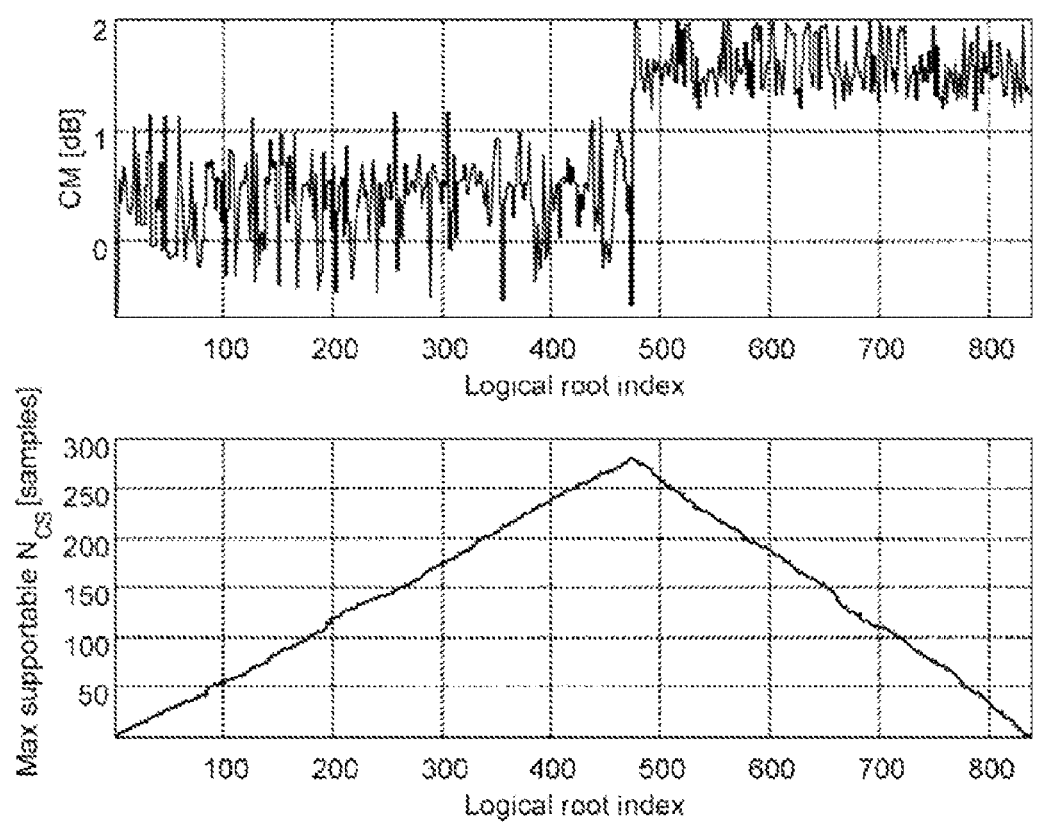
FIG. 28 is a graph showing a process of grouping indexes ordered according to maximum supportable Ncs characteristics into Ncs groups in each group.
Figure 29:
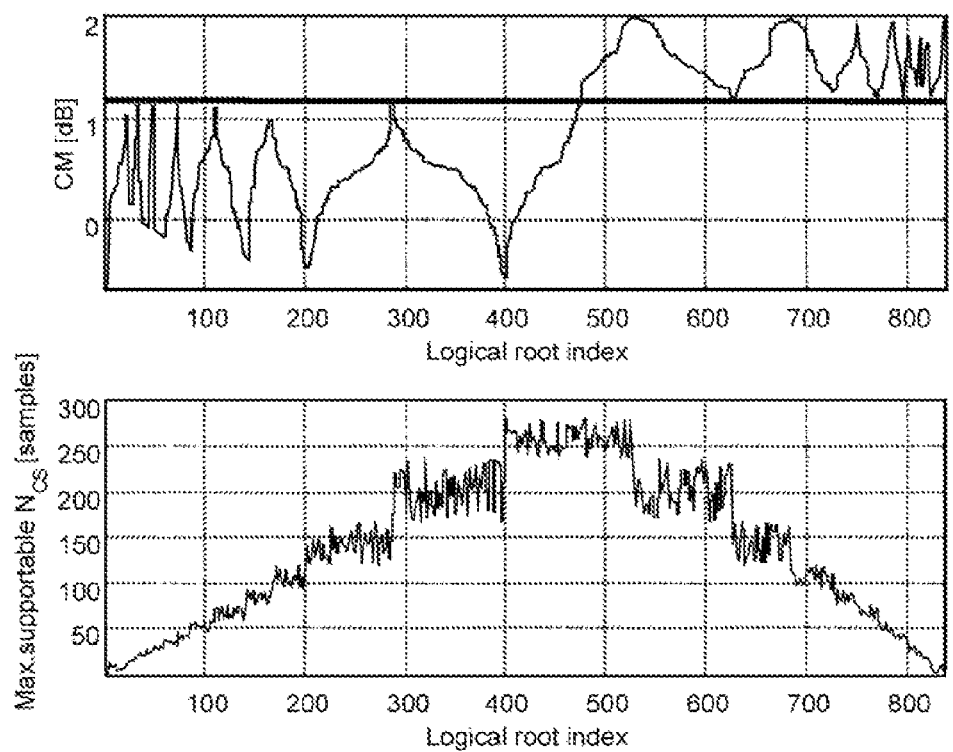
FIG. 29 is a graph showing a process of ordering indexes according to the CM characteristics in each Ncs group.

FIG. 27 is a graph showing a process of grouping CM ordering into two groups. FIG. 28 is a graph showing a process of grouping indexes ordered according to maximum supportable Ncs characteristics into Ncs groups in each group. FIG. 29 is a graph showing a process of ordering indexes according to the CM characteristics in each Ncs group.

Referring to FIGS. 27 to 29, (1) the indexes are ordered according to the CM characteristics. The indexes are divided into a group higher than 1.2 dB, the QPSK CM of the SC-FDMA, and a group lower than 1.2 dB as shown in FIG. 27.

(2) After the entire indexes are ordered according to the maximum cell radius, they are divided into sections according to the Ncs value (or the maximum supportable cell radius value). After the respective groups are ordered according to the maximum supportable cell radius, they are divided into sections with a maximum supportable cell radius value with respect to the Ncs. In this case, the groups may be all divided into different groups according to the Ncs value, several particular Ncs values can be divisionally grouped, or a particular Ncs value can be further divided. Here, the case of using the groups corresponding to every Ncs value is used, and the divided sections are as shown in FIG. 28.

(3) The indexes are ordered according to the CM characteristics in each divided section as shown in FIG. 29. Here, as the Ncs sample values, 13, 15, 18, 22, 26, 32, 38, 46, 59, 76, 119, 167, 237, 279, and 419 were used. Table 13 shows the relationship between the physical indexes and the logical indexes according to the results of FIG. 29.

TABLE 13

| No | Logical index | Physical index | | | | | | | | | | | | | | | | | |
|---|---|---|---|---|---|---|---|---|---|---|---|---|---|---|---|---|---|---|---|
| 0 | 1~24 | 1 | 838 | 2 | 837 | 70 | 769 | 93 | 746 | 105 | 734 | 84 | 755 | 168 | 671 | 210 | 629 | 120 | 719 | 140 |
|   |      | 699 | 129 | 710 | 229 | 610 | | | | | | | | | | | | | | |
| 1 | ~28 | 60 | 779 | 56 | 783 | | | | | | | | | | | | | | | |
| 2 | ~34 | 112 | 727 | 148 | 691 | 233 | 606 | | | | | | | | | | | | | |
| 3 | ~42 | 80 | 759 | 73 | 766 | 42 | 797 | 40 | 799 | | | | | | | | | | | |
| 4 | ~50 | 31 | 808 | 35 | 804 | 146 | 693 | 235 | 604 | | | | | | | | | | | |
| 5 | ~60 | 236 | 603 | 28 | 811 | 30 | 809 | 27 | 812 | 29 | 810 | | | | | | | | | |
| 6 | ~74 | 24 | 815 | 43 | 796 | 48 | 791 | 68 | 771 | 74 | 765 | 178 | 661 | 136 | 703 | | | | | |
| 7 | ~86 | 125 | 714 | 86 | 753 | 78 | 761 | 39 | 800 | 20 | 819 | 21 | 818 | | | | | | | |
| 8 | ~110 | 15 | 824 | 61 | 778 | 103 | 736 | 95 | 744 | 202 | 637 | 190 | 649 | 181 | 658 | 122 | 717 | 137 | 702 | 151 |
|   |      | 688 | 128 | 711 | 217 | 622 | | | | | | | | | | | | | | |
| 9 | ~142 | 231 | 608 | 130 | 709 | 142 | 697 | 179 | 660 | 203 | 636 | 118 | 721 | 207 | 632 | 110 | 729 | 89 | 750 | 55 |
|   |      | 784 | 46 | 793 | 37 | 802 | 34 | 805 | 23 | 816 | 14 | 825 | 12 | 827 | | | | | | |
| 10 | ~168 | 9 | 830 | 10 | 829 | 66 | 773 | 91 | 748 | 83 | 756 | 145 | 694 | 135 | 704 | 143 | 696 | 133 | 706 | 132 |
|   |      | 707 | 223 | 616 | 227 | 612 | 228 | 611 | | | | | | | | | | | | |
| 11 | ~202 | 216 | 623 | 149 | 690 | 141 | 698 | 121 | 718 | 197 | 642 | 161 | 678 | 201 | 638 | 184 | 655 | 173 | 666 | |
|   |      | 108 | 731 | 106 | 733 | 101 | 738 | 57 | 782 | 64 | 775 | 53 | 786 | 16 | 823 | 8 | 831 | | | |
| 12 | ~288 | 6 | 833 | 7 | 832 | 13 | 826 | 17 | 822 | 26 | 813 | 49 | 790 | 50 | 789 | 47 | 792 | 65 | 774 | 59 |
|   |      | 780 | 71 | 768 | 104 | 735 | 99 | 740 | 98 | 741 | 100 | 739 | 82 | 757 | 81 | 758 | 107 | 732 | 88 | 751 |
|   |      | 169 | 670 | 87 | 752 | 170 | 669 | 171 | 668 | 174 | 665 | 164 | 675 | 175 | 664 | 187 | 652 | 208 | 631 | 158 |
|   |      | 681 | 119 | 720 | 176 | 663 | 162 | 677 | 199 | 640 | 191 | 648 | 211 | 628 | 154 | 685 | 138 | 701 | 134 | 705 |
|   |      | 144 | 695 | 152 | 687 | 215 | 624 | 218 | 621 | 234 | 605 | | | | | | | | | |
| 13 | ~400 | 237 | 602 | 225 | 614 | 224 | 615 | 221 | 618 | 220 | 619 | 150 | 689 | 127 | 712 | 147 | 692 | 213 | 626 | |
|   |      | 153 | 686 | 212 | 627 | 139 | 700 | 123 | 716 | 124 | 715 | 156 | 683 | 157 | 682 | 177 | 662 | 182 | 657 | |
|   |      | 192 | 647 | 195 | 644 | 194 | 645 | 193 | 646 | 115 | 724 | 189 | 650 | 114 | 725 | 205 | 634 | 206 | 633 | |
|   |      | 200 | 639 | 185 | 654 | 116 | 723 | 160 | 679 | 163 | 676 | 186 | 653 | 172 | 667 | 166 | 673 | 167 | 672 | |
|   |      | 79 | 760 | 97 | 742 | 85 | 754 | 96 | 743 | 77 | 762 | 92 | 747 | 75 | 764 | 58 | 781 | 62 | 777 | 69 |
|   |      | 770 | 54 | 785 | 51 | 788 | 36 | 803 | 33 | 806 | 32 | 807 | 25 | 814 | 18 | 821 | 11 | 828 | 5 | 834 |
|   |      | 4 | 835 | | | | | | | | | | | | | | | | | |
| 14 | ~474 | 3 | 836 | 19 | 820 | 22 | 817 | 41 | 798 | 38 | 801 | 44 | 795 | 52 | 787 | 45 | 794 | 63 | 776 | 67 |
|   |      | 772 | 72 | 767 | 76 | 763 | 94 | 745 | 102 | 737 | 90 | 749 | 109 | 730 | 165 | 674 | 111 | 728 | 209 | 630 |
|   |      | 204 | 635 | 117 | 722 | 188 | 651 | 159 | 680 | 198 | 641 | 113 | 726 | 183 | 656 | 180 | 659 | 196 | 643 | 155 |
|   |      | 684 | 214 | 625 | 126 | 713 | 131 | 708 | 219 | 620 | 222 | 617 | 226 | 613 | 230 | 609 | 232 | 607 | | |
| 15 | ~528 | 262 | 577 | 252 | 587 | 418 | 421 | 416 | 423 | 413 | 426 | 411 | 428 | 376 | 463 | 395 | 444 | 283 | 556 | |
|   |      | 285 | 554 | 379 | 460 | 390 | 449 | 363 | 476 | 384 | 455 | 388 | 451 | 386 | 453 | 361 | 478 | 387 | 452 | |
|   |      | 360 | 479 | 310 | 529 | 354 | 485 | 328 | 511 | 315 | 524 | 337 | 502 | 349 | 490 | 335 | 504 | 324 | 515 | |
| 16 | ~626 | 323 | 516 | 322 | 517 | 320 | 519 | 334 | 505 | 348 | 491 | 333 | 506 | 332 | 507 | 319 | 520 | 326 | 513 | |
|   |      | 327 | 512 | 352 | 487 | 314 | 525 | 313 | 526 | 312 | 527 | 359 | 480 | 295 | 544 | 385 | 454 | 298 | 541 | |
|   |      | 364 | 475 | 362 | 477 | 299 | 540 | 365 | 474 | 292 | 547 | 291 | 548 | 381 | 458 | 399 | 440 | 380 | 459 | |
|   |      | 393 | 446 | 397 | 442 | 394 | 445 | 369 | 470 | 377 | 462 | 410 | 429 | 407 | 432 | 281 | 558 | 414 | 425 | |
|   |      | 247 | 592 | 417 | 422 | 246 | 593 | 250 | 589 | 278 | 561 | 277 | 562 | 271 | 568 | 275 | 564 | 243 | 596 | |
|   |      | 244 | 595 | 272 | 567 | 264 | 575 | 259 | 580 | | | | | | | | | | | |
| 17 | ~684 | 238 | 601 | 239 | 600 | 269 | 570 | 273 | 566 | 249 | 590 | 248 | 591 | 282 | 557 | 403 | 436 | 375 | 464 | |
|   |      | 408 | 431 | 371 | 468 | 396 | 443 | 370 | 469 | 401 | 438 | 392 | 447 | 366 | 473 | 382 | 457 | 300 | 539 | |
|   |      | 301 | 538 | 353 | 486 | 343 | 496 | 342 | 497 | 350 | 489 | 340 | 499 | 341 | 498 | 318 | 521 | 338 | 501 | |
|   |      | 347 | 492 | 330 | 509 | | | | | | | | | | | | | | | |
| 18 | ~728 | 321 | 518 | 325 | 514 | 331 | 508 | 346 | 493 | 339 | 500 | 345 | 494 | 351 | 488 | 344 | 495 | 311 | 528 | |
|   |      | 297 | 542 | 294 | 545 | 389 | 450 | 391 | 448 | 372 | 467 | 412 | 427 | 415 | 424 | 251 | 588 | 245 | 594 | |
|   |      | 254 | 585 | 255 | 584 | 241 | 598 | 257 | 582 | | | | | | | | | | | |
| 19 | ~752 | 270 | 569 | 276 | 563 | 374 | 465 | 409 | 430 | 378 | 461 | 398 | 441 | 400 | 439 | 290 | 549 | 289 | 550 | |
|   |      | 306 | 533 | 308 | 531 | 316 | 523 | | | | | | | | | | | | | |
| 20 | ~772 | 358 | 481 | 293 | 546 | 304 | 535 | 288 | 551 | 284 | 555 | 253 | 586 | 268 | 571 | 256 | 583 | 263 | 576 | |
|   |      | 260 | 579 | | | | | | | | | | | | | | | | | |

TABLE 13-continued

| No | Logical index | Physical index | | | | | | | | | | | | |
|---|---|---|---|---|---|---|---|---|---|---|---|---|---|---|
| 21 | ~786 | 242 | 597 | 274 | 565 | 402 | 437 | 368 | 471 | 383 | 456 | 357 | 482 | 329 | 510 |
| 22 | ~798 | 317 | 522 | 307 | 532 | 286 | 553 | 287 | 552 | 266 | 573 | 261 | 578 | | |
| 23 | ~802 | 303 | 536 | 356 | 483 | | | | | | | | | | |
| 24 | ~810 | 355 | 484 | 405 | 434 | 404 | 435 | 406 | 433 | | | | | | |
| 25 | ~814 | 267 | 572 | 302 | 537 | | | | | | | | | | |
| 26 | ~816 | 265 | 574 | | | | | | | | | | | | |
| 27 | ~822 | 367 | 472 | 296 | 543 | 309 | 530 | | | | | | | | |
| 28 | ~824 | 258 | 581 | | | | | | | | | | | | |
| 29 | ~838 | 240 | 599 | 419 | 420 | 279 | 560 | 280 | 559 | 373 | 466 | 305 | 534 | 336 | 503 |

In Table 13, there are groups having only a smaller number of indexes. Such groups having only a smaller number of indexes may be united with an adjacent group to constitute a single group.

In all the exemplary embodiments as described above, in case of pair allocation, relative positions of two adjacent pair indexes do not affect the proposed technique. In addition, when the indexes are ordered according to certain characteristics (e.g., the CM, the maximum supportable cell size (or Ncs, etc.)), the order of indexes having similar characteristics does not affect the proposed technique.

In use the above-described method, the user equipment and the base station should have a mapping table showing the relationship between the physical indexes and the logical indexes in each memory. In this case, the entire 838 indexes may be stored in each memory or only a half of them may be stored according to pair allocation. If only the half is stored, it may be assumed that (N−i)-th index is present after the i-th index, for processing.

When the indexes are ordered by using the above-described method and indexes available in a cell are informed to the base station, a method of informing about the number of Ncs configurations and a single logical index may be used. In this case, a single logical index can be informed by logical indexes 1 to 838 by using 10 bits. Alternatively, indexes 1 to 419 may be informed by using only one value of pair allocation with 9 bits. In this case, for the separate use of the pair allocation, an additional 1 bit may be used to indicate whether the used indexes are the front indexes 1 to 419 or the rear indexes 420 to 838 in the pair allocation. When indexes are informed with only 9 bits, they can be processed on the assumption that the (N−i)-th index follows the i-th index.

Figure 30:
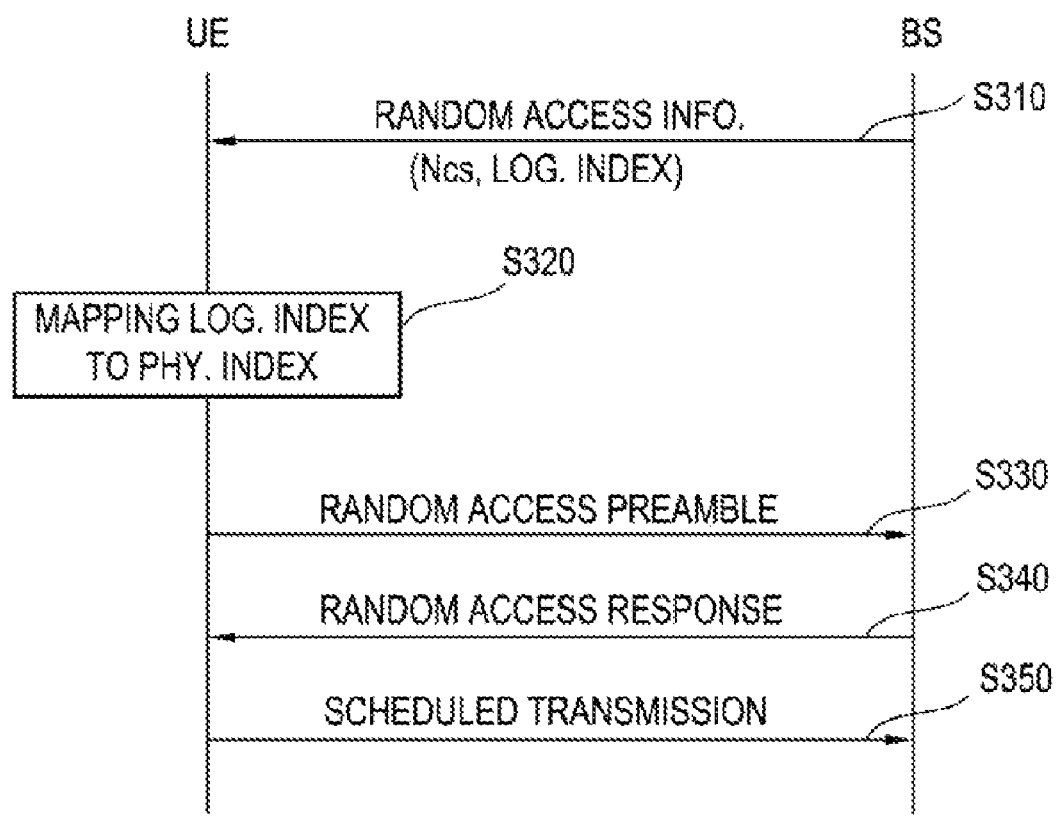
FIG. 30 is a flow chart illustrating the random access procedure according to one exemplary embodiment of the present invention.

FIG. 30 is a flow chart illustrating the random access procedure according to one exemplary embodiment of the present invention.

Referring to FIG. 30, a user equipment (UE) receives random access information from the base station (BS) (S310). The random access information includes information about a cyclic shift parameter Ncs and information about generation of a plurality of random access preambles. The cyclic shift parameter Ncs is used to obtain the value of cyclic shift of a root ZC sequence. The information about generation of a random access preamble is information regarding a logical index. The logical index is an index to which a physical root index of a root ZC sequence is mapped. The logical index becomes a source index for generating a set of random access preambles.

The information about the cyclic shift parameter Ncs and the logical index may be broadcasted as part of system information or transmitted on a downlink control channel. The method or format of transmitting the cyclic shift parameter Ncs or the logical index is not limited.

The user equipment acquires mapped physical root indexes from the logical index (S320). There are 64 preambles available in each cell. The set of 64 preamble sequences in a cell is found by including first, in the order of increasing cyclic shift, all the available cyclic shifts of a root Zadoff-Chu sequence with the logical index. Additional preamble sequences, in case 64 random access preambles cannot be generated from a single root Zadoff-Chu sequence, are obtained from the root sequences with the consecutive logical indexes until all the 64 sequences are found. The logical root sequence order is cyclic: the logical index 0 is consecutive to 837 when Nzc=838. Thus, the user equipment can find every available random access preamble through the single logical index.

Even if the base station informs the user equipment about only a single logical index, the user equipment can find the available 64 random access preambles. In addition, the root ZC sequences corresponding to the consecutive logical indexes have similar characteristics, all the generated sequences have substantially similar characteristics. Also, the root ZC sequences corresponding to the consecutive logical indexes may have complex conjugate symmetry which means the sum of two root index of the root ZC sequences corresponding to the two consecutive logical indexes is equal to the length of a root ZC sequence.

The logical indexes can be mapped to the physical root indexes of the root ZC sequence in sequence, after the physical root indexes are ordered according to the CM by subgroup. The subgroups have been obtained by grouping the ZC sequences by the predetermined cyclic shift parameter. Even if a consecutive logical index is selected, root ZC sequences having similar characteristics as those of the existing logical index can be obtained. Thus, only with a single logical index, the user equipment can acquire the 64 preamble sequences required for selecting the random access preamble.

As mentioned above, the logical index is the index to which the physical indexes are mapped in a state that the ZC sequences have been grouped into subgroups according to the predetermined cyclic shift parameter and ordered by the CM in each subgroup. Thus, the logical sequences belonging to a single subgroup have the same cyclic shift parameter. Although the base station allocates only the logical sequences in consideration of mobility of the user equipment, the user equipment can acquire the plurality of ZC sequences having the same cyclic shift parameter Ncs and similar CM characteristics.

The user equipment transmits a selected random access preamble to the base station on the RACH (Random Access Channel) (S330). That is, the user equipment randomly selects one of the 64 available random access preambles and transmits the selected random access preamble.

The base station transmits a random access response, a response to the random access preamble (S340). The random access response may be a MAC message configured in a MAC, a higher layer of a physical layer. The random access response is transmitted on a DL-SCH (Downlink Shared Channel). The random access response is addressed by an RA-RNTI (Random Access-Radio Network Temporary Identifier) transmitted on a PDCCH (Physical Downlink Control Channel). The RA-RNTI is a identifier to identify the used time/frequency resource for random access. The random access response may include timing alignment information, an initial uplink grant, and a temporary C-RNTI (Cell-Radio Network Temporary Identifier). The timing alignment information is timing correction information for uplink transmission. The initial uplink grant is ACK/NACK information with respect to the uplink transmission. The temporary C-RNTI refers to a user equipment's identifier that may not be permanent until collision is resolved.

The user equipment performs scheduled uplink transmission on a UL-SCH (S350). If there is data to be transmitted additionally as necessary, the user equipment performs uplink transmission to the base station and performs a collision settlement procedure.

If an error occurs in the transmission of the random access preamble, the random access procedure is delayed. Since the random access procedure is performed at an initial access to the base station or in a handover process to the base station, the delay of the random access procedure may cause an access delay or a service delay. A user equipment can obtain 64 preamble sequences suitable for the high speed environment, whereby the user equipment can reliably transmit the random access preamble in the high speed environment.

By using consecutive logical indexes, a set of random access preambles having similar physical characteristics can be generated. Control signaling to generate random access preambles can be minimized. Random access failure can be reduced under high speed environment and efficient cell planning can be performed.

Figure 31:
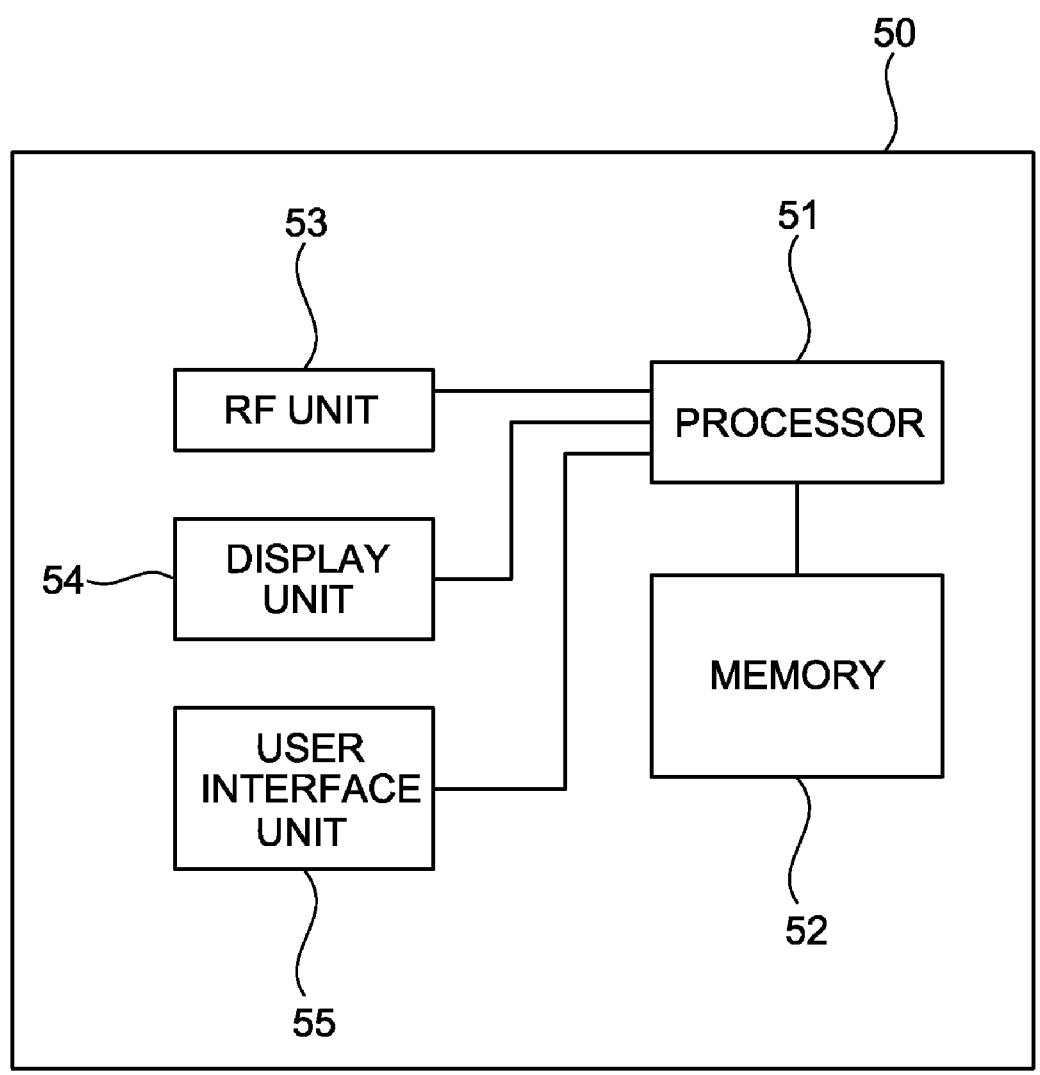
FIG. 31 is a schematic block diagram of elements of a user equipment to which the exemplary embodiments are applied.

FIG. 31 is a schematic block diagram of elements of a user equipment to which the exemplary embodiments are applied.

A user equipment 50 may include a processor 51, a memory 52, an RF unit 53, a display unit 54, and a user interface unit 55. The processor 51 may handle generation and mapping of sequences and implement functions regarding the various exemplary embodiments as described above. The memory 52 may be connected to the processor 51 and store an operating system, applications and files. The display unit 54 may display various information and use the known elements such as an LCD (Liquid Crystal Display), OLEDs (Organic Light Emitting Diodes), etc. The user interface unit 55 may be formed by combining user interfaces such as a keypad, a touch screen, or the like. The RF unit 53 is coupled to the processor 51 and transmits or receives radio signals.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method of transmitting a signal for a random access procedure, the method comprising:
   receiving, by a radio frequency (RF) unit of a user equipment (UE), a first logical index from a base station, wherein the first logical index is one of consecutive logical indexes which are mapped to physical root indexes of a root Zadoff-Chu (ZC) sequence, the physical root indexes of the root ZC sequence are divided into subgroups according to cyclic shift parameters, and each of the subgroups includes at least one physical root index;
   receiving, by the RF unit of the UE, information regarding a cyclic shift parameter from the base station; and
   transmitting, by the RF unit of the UE, a random access preamble of a predetermined number of random access preambles,
   wherein the predetermined number of random access preambles are obtained, at a processor of the UE, by generating random access preambles in the order of increasing cyclic shift from a first root ZC sequence with a first physical root index mapped to the first logical index in a memory of the UE and by generating additional random access preambles in an order of increasing cyclic shift from a second root ZC sequence with a second physical root index mapped to a second logical index in the memory of the UE when the predetermined number of random access preambles cannot be generated from the first root ZC sequence, wherein the second logical index is consecutive to the first logical index, and
   wherein a sum of the first physical root index and the second physical root index is equal to a length of the root ZC sequence, and
   wherein a value of the cyclic shift is obtained from the cyclic shift parameter.

2. The method of claim 1, wherein the physical root indexes are ordered such that a sequence of the physical root indexes is different from a sequence of the logical indexes.

3. The method of claim 1, wherein the predetermined number of the random access preambles is 64.

4. The method of 1, wherein the first logical index is broadcast.

5. The method of 1,
   wherein a k-th element c(k) of the root ZC sequence is defined by $$c(k) = \exp\left\{-\frac{j\pi Mk(k+1)}{N}\right\}, \text{ for } N \text{ odd}$$

$$c(k) = \exp\left\{-\frac{j\pi Mk^2}{N}\right\}, \text{ for } N \text{ even}$$

wherein N is the length of the root ZC sequence, and
   wherein M is a physical root index and relatively prime to N.

6. A user equipment (UE) for transmitting a signal for a random access procedure, the UE comprising:
   a radio frequency (RF) unit for:
      receiving a first logical index from a base station, wherein the first logical index is one of consecutive logical indexes which are mapped to physical root indexes of a root Zadoff-Chu (ZC) sequence, the physical root indexes of the root ZC sequence are divided into subgroups according to cyclic shift parameters, and each of the subgroups includes at least one physical root index;

receiving information regarding a cyclic shift parameter from the base station; and transmitting a random access preamble of a predetermined number of random access preambles;

a memory for storing the first logical index; and a processor for obtaining the predetermined number of random access preambles by generating random access preambles in an order of increasing cyclic shift from a first root ZC sequence with a first physical root index mapped to the first logical index in the memory and by generating additional random access preambles in the order of increasing cyclic shift from a second root ZC sequence with a second physical root index mapped to a second logical index in the memory when the predetermined number of random access preambles cannot be generated from the first root ZC sequence, wherein the second logical index is consecutive to the first logical index, wherein a sum of the first physical root index and the second physical root index is equal to a length of the root ZC sequence, and wherein a value of the cyclic shift is obtained from the cyclic shift parameter.

* * * * *